US008264421B2

(12) United States Patent
Yamada et al.

(10) Patent No.: US 8,264,421 B2
(45) Date of Patent: Sep. 11, 2012

(54) MULTI-SCREEN VIDEO PLAYBACK SYSTEM

(75) Inventors: Norihiko Yamada, Okaya (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1402 days.

(21) Appl. No.: 11/048,786

(22) Filed: Feb. 3, 2005

(65) Prior Publication Data

US 2005/0168630 A1    Aug. 4, 2005

(30) Foreign Application Priority Data

Feb. 4, 2004  (JP) ................................. 2004-028201
Nov. 15, 2004 (JP) ................................. 2004-330082

(51) Int. Cl.
    *G09G 5/00* (2006.01)
(52) U.S. Cl. ............. 345/1.1; 345/1.3; 345/55; 345/204
(58) Field of Classification Search .................. 345/1.1, 345/1.3, 55, 204
    See application file for complete search history.

(56) References Cited

U.S. PATENT DOCUMENTS

| 4,760,471 | A  | * | 7/1988  | Brush et al. ..................... 386/78 |
| 6,611,241 | B1 |   | 8/2003  | Firester et al. |
| 6,829,664 | B2 |   | 12/2004 | Nomizo et al. |
| 2004/0078504 | A1 | * | 4/2004  | Law et al. ..................... 710/100 |
| 2004/0131340 | A1 | * | 7/2004  | Antoun et al. ................. 386/125 |
| 2006/0116187 | A1 | * | 6/2006  | Johnson et al. ................. 463/16 |

FOREIGN PATENT DOCUMENTS

| JP | A-06-214534   | 8/1994  |
| JP | A-06-332439   | 12/1994 |
| JP | 2000-305553 A | 11/2000 |
| JP | A 2001-061136 | 3/2001  |
| JP | A-2001-117544 | 4/2001  |
| JP | 2002-369163 A | 12/2002 |
| JP | 2003-198994 A | 7/2003  |
| JP | 2003-235027 A | 8/2003  |
| JP | A 2005-086592 | 3/2005  |

* cited by examiner

Primary Examiner — William Boddie
Assistant Examiner — Leonid Shapiro
(74) Attorney, Agent, or Firm — Oliff & Berridge, PLC

(57) ABSTRACT

Exemplary embodiments of the invention provide a multi-screen video playback system which enables synchronized video playback, and at the same time enables irregular playback such as color processing, contents change. According to exemplary embodiments, a multi-screen video playback system includes a plurality of rendering units RU1 through RU4 which are connected to LAN as a network and output video data to a plurality of display devices D1 through D4; a function which is connected to LAN and distributes timing information to the rendering units RU1 through RU4 by simultaneous transmission; a timing server TS which generates the irregular playback control information to enable irregular playback, such as color correction and contents change to the video data, in a plurality of rendering units RU1 through RU4 which output video data to each corresponding display device of the plurality of display devices D1 through D4; and video data storage devices S1 through S4 to store video data to be reproduced.

6 Claims, 33 Drawing Sheets

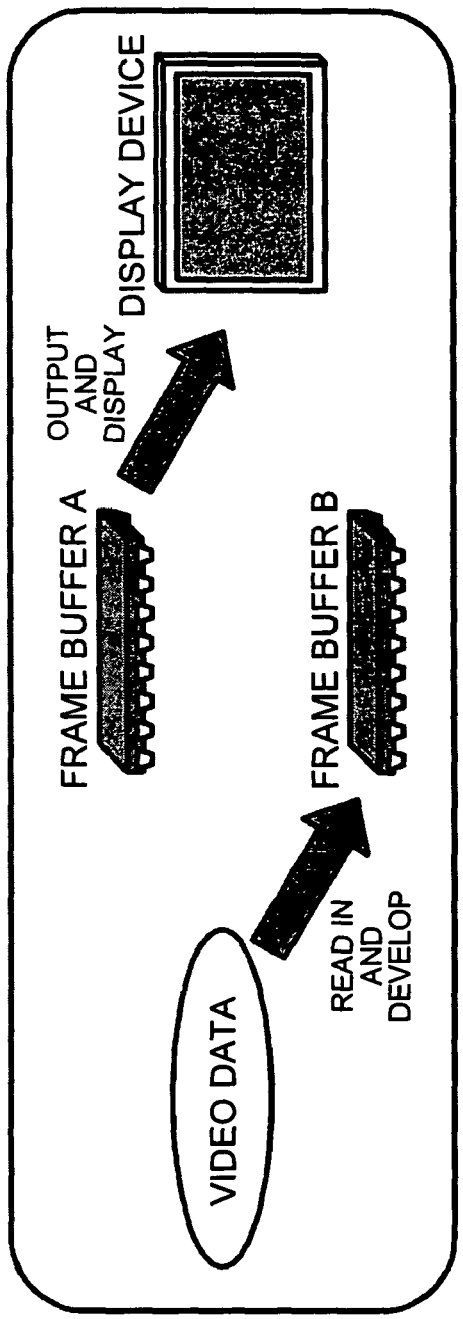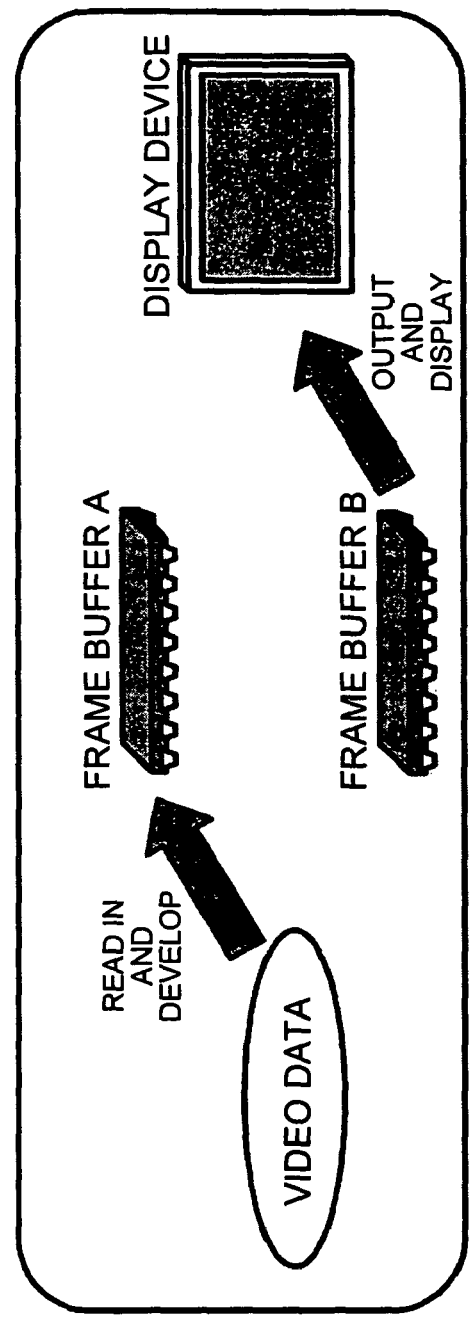

MULTI-SCREEN VIDEO PLAYBACK SYSTEM

BACKGROUND

Exemplary embodiments of the present invention relate to a multi-screen video playback system suitable as a video playback device in a large multi-screen display, and the like, to a video playback method in a multi-screen video playback system, to a timing server, a video distribution server V and a rendering unit used in a multi-screen video playback system, and to a display device to constitute a multi-screen display.

FIG. 30 is a schematic showing a multi-screen display. This multi-screen display D is a display device which constitutes one large screen by combining a plurality of display devices D1 through D4, such as a monitor and a projector, as shown in FIG. 30. The multi-screen video playback system is a video playback device to output a video signal which is inputted to each of the display devices D1 through D4, respectively, in such a multi-screen display D.

In this multi-screen video playback system, as disclosed in the related art, a large screen display is realized, by converting a video signal (a video signal corresponding to the original video (a video signal)) corresponding to a large screen, to each video signal (each video signal corresponding to each unit video (a video signal)) corresponding to each of the display devices D1 through D4 using a scan converter, and by inputting each of these video signals to each of the display devices D1 through D4.

In the related art, the digitization of a video signal has progressed. Further, a demand of wanting to handle the video signal in a digital signal format is also increasing in such multi-screen video playback system.

However, when handling a video signal in a digital signal format this way, since, unlike the case where the scan converter is used, the video signal cannot be automatically synchronized between each of the display devices D1 through D4, it is necessary to provide some synchronized playback device to establish synchronization of the video signal.

Namely, when providing such synchronized playback device, because it is possible to establish synchronization of the video signal between each of the display devices D1 through D4, a unit video, which each of the display devices displays respectively, can be reproduced at right timing, as shown in FIG. 31a. Accordingly, a smooth and natural video can be reproduced as a whole screen, while not providing the synchronized playback device such as the above one. That is, it is difficult to establish synchronization of the video signal between each of the display devices D1 through D4, the unit video which each of the display devices displays respectively is no longer reproduced at right timing, and it is impossible to reproduce a smooth and natural video, as the whole screen, as shown in FIG. 31b.

Japanese Laid Open Patent Publication No. 2002-369163 and "3D Interactive Processor for 3D moving images", Takaaki Kudo, and Yasuhiro Takaki; Proceedings of 3D Image Conference 2003; and Executive Committee of 3D Image Conference 2003, PP 125-128 (hereinafter "Kudo") disclose synchronized playback devices to establish synchronization of a plurality of video display, or for establishing synchronization of video and audio, this way.

FIG. 32 is a schematic showing the synchronized playback device disclosed in Japanese Laid Open Patent Publication No. 2002-369163. In the synchronized playback device disclosed in Japanese Laid Open Patent Publication No. 2002-369163, as shown in this FIG. 32, when transmitting a plurality of video signals and the like (a stream) through the Internet, the synchronization of the video signal and the like between each display device is established by absorbing the fluctuation of time produced due to the congestion conditions of a network 9 from a transmission side system shown in FIG. 32a to a receiving side system shown in 32b of this view, and the variation and the like of the processing time required for the compression and the expansion of streams 1 and 2.

Namely, in the transmission side system, a time code at the time of distribution is attached to a plurality of streams to be distributed, and is sent out to the network. In the receiving side system, a plurality of streams are received at a plurality of receiving devices 11 and 14, respectively, to output as a stream. Then, regarding each outputted stream, the difference between a time code of the absolute reference time at the receiving side system and a distribution time code attached to the stream is measured, and the output delay of each stream is controlled so as to set the difference of each time code of each stream to be constant. Thus, the synchronization of the video signal and the like is established between each display device.

FIG. 33 is a schematic showing the synchronized playback device disclosed in Kudo. In the synchronized playback device disclosed in Kudo, as shown in FIG. 33, by connecting a host PC which generates the video playback timing to each cluster PC (PC1, PC2, PC3, ..., PCN) which outputs each video signal (video 1, video 2, video 3, ..., video N) to each display device by LAN (Local Area Network), and by distributing simultaneously a broadcast packet as the synchronized signal from a host PC to each PC, the synchronization of the video signal between each display device is established. Consequently, it is possible to suppress the deviation of frame between each display device to less than one frame.

Moreover, Japanese Laid Open Patent Publication No. 2003-235027 discloses a technique to establish synchronization between each display device.

When a plurality of members receive and reproduce a common video data from a distribution server in a plurality of terminal devices, if there is produced a deviation in the receiving time at each terminal device, the scene viewed and listened to at each terminal device will deviate and an inconvenience will occur in the communication between each member. Therefore, Japanese Laid Open Patent Publication No. 2003-235027 discloses a technique which ensures the synchronization of the video playback in a plurality of terminal devices in order to reduce or prevent this.

In Japanese Laid Open Patent Publication No. 2003-235027, first, the time of the video distribution server and each terminal device is unified by a time distribution server which exists on the network. Next, the video distribution server distributes a multicast packet including the video data and the information that indicates the distribution time to each terminal device. Each terminal device receives the distributed multicast packet, and by distributing the information regarding the transmission time and the receiving time to any one terminal device, the information on the difference of receiving time is collected to one place. Then, the maximum transmission delay time is calculated from this time information, and on the basis of this time, a playback timing control section of each terminal device adjusts the playback timing of the video data, and thereby, the synchronization is secured.

SUMMARY

However, in the synchronized playback device disclosed in Japanese Laid Open Patent Publication No. 2002-369163, the generation of an accurate time code is needed at both the transmission side system and the receiving side system. For this reason, it is necessary for both the transmission side system and the receiving side system to know the absolute time. Accordingly, both the transmission side system and the receiving side system need to contain an extremely accurate internal clock, to receive the time signal distributed from GPS (Global Positioning System) satellite, or to communicate with an external time server based on NTP (Network Time Protocol). For this reason, there are problems that the system becomes on a large scale, the handling thereof also becomes complicated, and the cost reduction thereof is not easy.

Moreover, in the synchronized playback device disclosed in the Kudo, since all the video data to be reproduced is developed to a memory as a frame buffer, a large capacity of memory is needed. The memory is generally expensive, and even for video data of several minutes, it will be expensive to develop all of them to the memory. Further, when it comes to video data of a movie which lasts for several hours, it is not easy to develop all of them to the memory.

Moreover, also in the synchronized playback method disclosed in Japanese Laid Open Patent Publication No. 2003-235027, since it is necessary to communicate with the time server like the above-described in Japanese Laid Open Patent Publication No. 2002-369163, there are problems that the system becomes on a large scale, its handling becomes also complicated, and its cost reduction is not easy.

Then, exemplary embodiments of the present invention have been made to address and/or solve these and/or other problems. Further, exemplary embodiments provide a multi-screen video playback system, which is a simple system which does not need to acquire the absolute time, can perform a synchronized and long hours of video playback easily, and also enables various video processing, such as color processing and resolution conversion, through the network. Exemplary embodiments further provide a video playback method in the multi-screen video playback system; a timing server, a video distribution server V and a rendering unit used for a multi-screen video playback system; and a display device to constitute a multi-screen display.

(1) A multi-screen video playback system according to exemplary embodiments of the present invention includes a network; a video data storage device to store video data to be reproduced; a plurality of rendering units connected to the network to output video data read in from the video data storage device and being developed to a frame buffer in advance, to each corresponding display device of a plurality of display devices, and to carry out video processing to enable irregular playback of the video data; a timing server connected to the network to distribute timing information, with which the plurality of rendering units output the video data synchronized with the corresponding display device to the plurality of rendering units by simultaneous transmission, and generates, when an irregular playback instruction is given, the irregular playback control information of video data based on this irregular playback instruction, and can output this irregular playback control information to the rendering unit.

Thus, the multi-screen video playback system of exemplary embodiments of the present invention, includes a device to generate the irregular playback control information to enable irregular playback of the video data, and distribute this irregular playback control information to the rendering unit; and a device to receive the irregular playback control information from the timing server at each rendering unit side and carry out video processing based on the received irregular playback control information. Therefore, the irregular playback (for example, irregular playback to carry out a color processing, a resolution conversion, and the like) which needs the video processing, can be made.

Moreover, any one of the timing servers which is the distribution side and each rendering unit which is the receiving side can carry out synchronized playback of the video in each display device without carrying out the acquisition of the absolute time. For this reason, it is not necessary for any one of the timing server at the distribution side and each rendering unit at the receiving side to contain an extremely accurate internal clock, nor to receive a time signal distributed from a GPS satellite, nor to carry out communication with an external time server based on NTP, and thus, with a simple system easy to handle and reduce cost, a synchronized video playback can be carried out.

Moreover, the multi-screen video playback system of exemplary embodiments of the present invention are suitable when carrying out the video playback on the multi-screen display like a tiling display. However, exemplary embodiments can be applicable, for example, for a plurality of users in places apart from each other to play the same game, while looking at each display.

(2) In the multi-screen video playback system according to the above (1), the timing server includes a timing information generation section that generates the timing information; an irregular playback control information generation section that generates the irregular playback control information; and a transmission section that can distribute, by simultaneous transmission, the timing information to the plurality of rendering units, and at the same time, can distribute the irregular playback control information to the plurality of rendering units by simultaneous transmission or to a certain rendering unit by unicast communication. The rendering unit includes a receiving section that can receive the timing information or the irregular playback control information distributed by the transmission section; and an output section that outputs the video data being developed to a frame buffer in advance, to the corresponding display device, based on the timing information from the timing server; and a video processing section that carries out video processing based on the irregular playback control information received in the receiving section, to the video data.

By constituting this way, the multi-screen video playback system according to (1) can be realized easily. In addition, in the multi-screen video playback system of exemplary embodiments of the present invention, "developing" the video data to the frame buffer includes expanding or decrypting the compressed or encrypted video data to store to the frame buffer, other than storing the video data read-out from the video data storage device, as is, to the frame buffer.

(3) In the multi-screen video playback system according to the above (2), the timing server further includes a read-in frame information generation section that generates frame information (hereinafter, referred to as "read-in frame information") concerning the video data read in from the video data storage device and being developed to the frame buffer in advance. The irregular playback control information generation section can output the irregular playback control information to the read-in frame information generation section, while the transmission section in the timing server can distribute the read-in frame information to the plurality of rendering units by simultaneous transmission or to a certain rendering unit by unicast communication. The receiving section in the rendering unit can receive the read-in frame information distributed by the transmission section, while the rendering unit further has a video data acquisition section that reads in video data from the video data storage device and develops to a frame buffer, based on the read-in frame information which the receiving section received.

By constituting this way, the read-in frame information is transmitted from the timing server to each rendering unit through the network, and based on this read-in frame information, each rendering unit can read-in the video data from the video data storage device at necessary timing and develop to the frame buffer. Therefore, the right video data can be correctly outputted to each display device. Moreover, by giving irregular playback control information to the read-in frame information generation section, the read-in frame information can be controlled, thereby enabling irregular playback such as changing the video data presently on display to the video data of other contents at a certain timing.

(4) In the multi-screen video playback system according to any one of the above (1) to (3), it is preferable that the irregular playback control information includes control information to control the contents of the video processing.

In this way, since the irregular playback control information is the information to control the contents of video processing, various video processing can be carried out to the video that is displayed with each display device.

(5) In the multi-screen video playback system according to the above (4), it is preferable that the control information to control the contents of the video processing is the control information to enable the color processing and the resolution conversion.

Thereby, the color processing and the resolution conversion can be carried out to the video that is displayed with each display device.

(6) In the multi-screen video playback system according to the above (3), it is preferable that the irregular playback control information includes the control information that instructs the contents change to set the video data presently on display to the video data of other contents.

Thereby, for example, it is also possible to change the video data presently on display to the video data of other contents at certain timing.

(7) In the multi-screen video playback system according to any one of the above (1) to (6), the irregular playback of the video data can be carried out to, as a target, each video data that is displayed in all the display devices.

This means that the above-described irregular control to carry out various kinds of irregular playback (color processing, resolution conversion, contents change, and the like) is carried out to the video that is displayed in all the display devices, and thereby, when displaying one whole picture by combining a plurality of partial pictures, the irregular playback like the one described above can be carried out simultaneously to the whole picture.

(8) In the multi-screen video playback system according to any one of the above (1) to (6), the irregular playback of the video data can be also carried out to, as a target, the video data that is displayed in a certain specific display device.

This means that the irregular control for carrying out various kinds of irregular playback (color processing, resolution conversion, contents change, and the like) described above is carried out to a video displayed in a certain specific display device. Thereby, when displaying one whole picture by combining a plurality of partial pictures, irregular playback like the one described above can be carried out only to a certain partial picture.

(9) In the multi-screen video playback system according to any one of the above (1) to (8), a certain rendering unit out of the plurality of rendering units may have the function of the timing server.

In this way, since a certain rendering unit has the function of the timing server, it is not necessary to prepare the timing server separately, and the system can be simplified.

(10) The multi-screen video playback system of exemplary embodiments of the present invention includes a video data storage device to store video data to be reproduced; a plurality of rendering units, which can be connected to the network, that output video data read in from the video data storage device and being developed to a frame buffer in advance, to each corresponding display device of a plurality of display devices, and to carry out irregular playback processing to enable irregular playback of the video data; and a timing server, which can be connected to the network, having a function that distributes timing information with which the plurality of rendering units output the video data synchronized with the corresponding display device, to the plurality of rendering units by simultaneous transmission, and a function that generates, when an irregular playback instruction is given, irregular playback control information of video data based on this irregular playback instruction and can output this irregular playback control information to the rendering unit.

According to the multi-screen video playback system according to (10), by preparing the network separately, the multi-screen video playback system according to (1) can be constituted, and the same effect as that of the multi-screen video playback system according to (1) is obtained. In addition, also in the multi-screen video playback system according to (10), it is preferable to have the same characteristic as the multi-screen video playback system according to the above (2) to (9).

(11) The multi-screen video playback system of exemplary embodiments of the present invention includes a network; a plurality of rendering units connected to the network, that output video data to each corresponding display device of a plurality of display devices, and carries out video processing to enable irregular playback of the video data, to the video data; and a video distribution server connected to the network that distributes the video data to the plurality of rendering units, and distributes timing information, with which the plurality of rendering units output the video data synchronized with the corresponding display device, to the plurality of rendering units by simultaneous transmission, and that generates the irregular playback control information of video data based on this irregular playback instruction, when an irregular playback instruction is given, and controls the video data to be distributed to the rendering unit according to the contents of this irregular playback control information, or to distribute this irregular playback control information to the rendering unit.

Also in the multi-screen video playback system according to (11), the same irregular playback (for example, playback of the video to which color processing, resolution conversion, and the like is carried out) can be made. Moreover, by controlling the video data to be distributed based on the irregular playback control information, it is also possible to carry out the irregular playback such as changing the video data presently on display to the video data of other contents at a certain timing. Moreover, any one of the video distribution servers which is the distribution side, and each rendering unit which is the receiving side can carry out synchronized playback of the video in each display device without carrying out acquisition of the absolute time.

Moreover, according to the multi-screen video playback system according to this (11), since the video data to be displayed is distributed from the video distribution server, the video data storage device to store the video data to be displayed is not necessary in each rendering unit, and a frame buffer which temporarily stores a necessary minimum (for example, in units of frame) video data that is distributed each time from the video distribution server has only to be needed, and moreover, long hours of video data can be displayed.

In addition, also in the multi-screen video playback system according to (11), it is preferable to have the same characteristic as the multi-screen video playback system according to the above (4) to (9).

(12) In the multi-screen video playback system according to the above (11), it is preferable that the video distribution server includes: a video data generation section that generates the video data to be distributed to the plurality of rendering units; a timing information generation section that generates the timing information; an irregular playback control information generation section that generates the irregular playback control information and can output this irregular playback control information, according to the contents thereof, to the video data generation section or a rendering unit; and a transmission section that distributes video data generated in the video data generation section, the timing information generated in the timing information generation section, and the irregular playback control information, to the plurality of rendering units. The rendering unit includes a receiving section that can receive the video data that is distributed by the video distribution server, timing information, and irregular playback control information; a frame buffer to which the video data received in this receiving section is developed; a video processing section that carries out video processing based on the irregular playback control information to the video data being developed to this frame buffer; an output section that outputs to the corresponding display device the video data being developed to the frame buffer, based on the timing information.

By constituting this way, the multi-screen video playback system according to the above (11) can be realized easily.

(13) The multi-screen video playback system of exemplary embodiments of the present invention includes:
   a plurality of rendering units, which can be connected to the network, that output video data to each corresponding display device of a plurality of display devices, and to carry out video processing to enable irregular playback of the video data, to the video data; and
   a video distribution server, which can be connected to the network, that distributes video data to the plurality of rendering units, distributes timing information, with which the plurality of rendering units output the video data synchronized with the corresponding display device, to the plurality of rendering units by simultaneous transmission, and that generates, when an irregular playback instruction is given, irregular playback control information of the video data based on this irregular playback instruction and controls the video data to be distributed to the rendering unit according to the contents of this irregular playback control information, or to distribute this irregular playback control information to the rendering unit.

According to the multi-screen video playback system according to (13), by preparing the network separately, the multi-screen video playback system according to (11) can be constituted, and the same effect as that of the multi-screen video playback system according to (11) is obtained.

In addition, also in the multi-screen video playback system according to (13), it is preferable to have the same characteristic as the multi-screen video playback system according to the above (4) to (9), and (12).

(14) The multi-screen video playback system of exemplary embodiments of the present invention includes:
   a network;
   a plurality of rendering units connected to the network that output video data to each corresponding display device of a plurality of display devices; and
   a video distribution server connected to the network that distributes video data to the plurality of rendering units, distributes timing information with which the plurality of rendering units output the video data synchronized with the corresponding display device, to the plurality of rendering units by simultaneous transmission, and that generates, when an irregular playback instruction is given, irregular playback control information of video data based on this irregular playback instruction and controls the video data to be distributed to the rendering unit according to the contents of this irregular playback control information, or to carry out video processing to video data to be distributed.

This provides the video processing section at the video distribution server side, and the video processing (color processing, resolution conversion, and the like) to enable irregular playback is carried out at the video distribution server side. Thereby, the processing load at the rendering unit side can be alleviated.

In addition, also in the multi-screen video playback system according to (14), it is preferable to have the same characteristic as the multi-screen video playback system according to the above (4) to (9).

(15) In the multi-screen video playback system according to the above (14), it is preferable that the video distribution server includes:
   a video data generation section that generates the video data to be distributed to the plurality of rendering units; a timing information generation section that generates the timing information; a video processing section that carries out video processing to enable the irregular playback of the video data to be distributed; an irregular playback control information generation section that generates the irregular playback control information and can output this irregular playback control information, according to the contents thereof, to the video data generation section or the video processing section; and a transmission section that can distribute video data generated in the video data generation section, and the timing information generated in the timing information generation section, to the plurality of rendering units.

The rendering unit includes a receiving section that can receive the timing information and the video data that is distributed by the transmission section; and a frame buffer to which the video data received in this receiving section is developed; an output section that outputs to the corresponding display device the video data being developed to the frame buffer, based on the timing information.

By constituting this way, the multi-screen video playback system according to (14) can be realized easily.

(16) The multi-screen video playback system of exemplary embodiments of the present invention includes:
   a plurality of rendering units, which can be connected to the network having a function that outputs video data to each corresponding display device of a plurality of display devices; and
   a video distribution server, which can be connected to the network that distributes video data to the plurality of rendering units, that distributes timing information, with which the plurality of rendering units output the video data synchronized with the corresponding display device, to the plurality of rendering units by simultaneous transmission; and that generate, when an irregular playback instruction is given, irregular playback control information of the video data based on this irregular playback instruction, and controls the video data to be distributed to the rendering unit according to the contents of this irregular playback control information, or to carry out video processing to the video data to be distributed.

According to the multi-screen video playback system according to (16), by preparing the network separately, the multi-screen video playback system according to (14) can be constituted, and the same effect as that of the multi-screen video playback system according to (14) is obtained. In addition, also in the multi-screen video playback system according to (16), it is preferable to have the same characteristic as the multi-screen video playback system according to the above (4) to (9), and (15).

(17) The multi-screen video playback system according to exemplary embodiments of the present invention includes:
a network;
a plurality of rendering units connected to the network that output video data to each corresponding display device of a plurality of display devices, and that carry out video processing to enable irregular playback of the video data to the video data;
a timing server connected to the network that distributes timing information, with which the plurality of rendering units output the video data synchronized with the corresponding display device, to the plurality of rendering units by simultaneous transmission, that generates the video distribution control information to a video distribution server, and that generates, when an irregular playback instruction is given, the irregular playback control information of video data based on this irregular playback instruction, and distributes, according to the contents of this irregular playback control information, the irregular playback control information as the information to control the video data to be distributed, to the video distribution server, or a function to distribute this irregular playback control information to the rendering unit; and
a video distribution server connected to the network, that distributes video data to the plurality of rendering units based on the video distribution control information from the timing server.

This separates the function of the timing server from the video distribution server, and provides a timing server independently. Thus, by providing the timing server separately from the video distribution server, the processing load of the video distribution server can be alleviated. Moreover, any one of the plurality of rendering units can also serve as the timing server, and thus an effect that freedom of the configuration is increased is also obtained. Moreover, in the multi-screen video playback system according to this (17), by generating the irregular playback control information to enable the irregular playback at the timing server side, the same irregular playback as the one described above can be attained.

In addition, also in the multi-screen video playback system according to this (17), it is preferable to have the same characteristic as the multi-screen video playback system according to the above (4) to (9).

(18) In the multi-screen video playback system according to the above (17), it is preferable that the timing server includes: a timing information generation section that generates the timing information; a video distribution control information generation section that generates the video distribution control information; an irregular playback control information generation section that generates irregular playback control information to enable the irregular playback of the video data in the plurality of display devices, and outputs, according to the contents of this irregular playback control information, this irregular playback control information to the video distribution control information generation section as the information to control the video data to be distributed, or a function to output this irregular playback control information; and a transmission section that can output the timing information, the video distribution control information, and the irregular playback control information, and the video distribution server includes: a video distribution control section that controls video distribution to the plurality of rendering units based on the video distribution control information from the timing server; a video data generation section that generates the video data to be distributed to the plurality of rendering units by the control of this video distribution control section; and a transmission section that can distribute the video data generated in this video data generation section to the plurality of rendering units.

The rendering unit includes a receiving section that can receive the video data, timing information, and irregular playback control information; a frame buffer to which the video data received in this receiving section is developed; a video processing section that carries out video processing based on the irregular playback control information; and an output section that outputs to the corresponding display device the video data being developed to the frame buffer, based on the timing information.

By constituting this way, the multi-screen video playback system according to the above (17) can be realized easily.

(19) The multi-screen video playback system of exemplary embodiments of the present invention includes:
a plurality of rendering units, which can be connected to the network, that outputs video data to each corresponding display device of a plurality of display devices and to carry out video processing to enable irregular playback of the video data to the video data;
a timing server, which can be connected to the network, that distributes timing information, with which the plurality of rendering units output the video data synchronized with the corresponding display device, to the plurality of rendering units by simultaneous transmission, that generates, when an irregular playback instruction is given, the video distribution control information to a video distribution server, and that generates irregular playback control information of video data based on this irregular playback instruction, and distributes, according to the contents of this irregular playback control information, the irregular playback control information as the information to control the video data to be distributed, to the video distribution server, or a function to distribute this irregular playback control information to the rendering unit; and
a video distribution server, which can be connected to the network, that distributes video data to the plurality of rendering units based on the video distribution control information from the timing server.

According to the multi-screen video playback system according to this (19), by preparing the network separately, the multi-screen video playback system according to (17) can be constituted, and the same effect as that of the multi-screen video playback system according to (17) is obtained.

In addition, also in the multi-screen video playback system according to (19), it is preferable to have the same characteristic as the multi-screen video playback system according to the above (4) to (9), and (18).

(20) The multi-screen video playback system of exemplary embodiments of the present invention includes:
a network;
a plurality of rendering units connected to the network that outputs video data to each corresponding display device of a plurality of display devices;
a timing server connected to the network that distributes timing information, with which the plurality of rendering units output the video data synchronized with the corresponding display device, to the plurality of rendering units by simultaneous transmission, that generates the video distribution control information to a video distribution server, and that generates, when an irregular playback instruction is given, the irregular playback control information of video data based on this irregular playback instruction, and distributes, according to the contents of this irregular playback control information, the irregular playback control information as the information to control the video data to be distributed, to the video distribution server, or a function to distribute this irregular playback control information to the video distribution server as information for carrying out the video processing; and
a video distribution server connected to the network to distribute video data to the plurality of rendering units based on the video distribution control information from the timing server; and that carries out video processing to enable the irregular playback of the video data to be distributed, to the video data to be distributed.

This provides the video processing section provided at the video distribution server side, and the video processing (color processing, resolution conversion, and the like) to enable irregular playback is carried out at the video distribution server side. Thereby, the processing load at the rendering unit side can be alleviated.

(21) In the multi-screen video playback system according to the above (20), the timing server includes: a timing information generation section that generates the timing information; a video distribution control information generation section that generates the video distribution control information; an irregular playback control information generation section having a function that generates irregular playback control information to enable irregular playback of video data in the plurality of display devices and outputs, as the information to control video data to be distributed, the irregular playback control information according to the contents of this irregular playback control information, to the video distribution control information generation section, or that outputs this irregular playback control information as information to carry out the video processing; and a transmission section that can output the timing information, the video distribution control information, and information for carrying out the video processing, and
the video distribution server includes: a video distribution control section that controls video distribution to the plurality of rendering units based on the video distribution control information generated by the timing server; a video data generation section that generates the video data to be distributed to the plurality of rendering units by the control of this video distribution control section; a video processing section that carries out video processing to enable the irregular playback of the video data to be distributed, to the data to be distributed; and a transmission section that can distribute the video data generated in this a video data generation section to the plurality of rendering units, and
the rendering unit includes: a receiving section that can receive the video data and timing information; a frame buffer to which the video data received in this receiving section is developed; and an output section that outputs to the corresponding display device the video data being developed to the frame buffer, based on the timing information.

By constituting this way, the multi-screen video playback system according to (20) can be realized easily.

(22) The multi-screen video playback system of exemplary embodiments of the present invention is a multi-screen video playback system to output video data synchronized with each of the plurality of display devices that constitute the multi-screen video playback system, including:
a plurality of rendering units, which can be connected to the network that output video data to each corresponding display device of a plurality of display devices;
a timing server, which can be connected to the network that distributes timing information, with which the plurality of rendering units output the video data synchronized with the corresponding display device, to the plurality of rendering units by simultaneous transmission, that generates the video distribution control information to a video distribution server, and that generates, when an irregular playback instruction is given, the irregular playback control information of video data based on this irregular playback instruction, and distributes, according to the contents of this irregular playback control information, the irregular playback control information as the information to control the video data to be distributed, to the video distribution server, or a function to distribute this irregular playback control information to the video distribution server as information to carry out the video processing; and
a video distribution server, which can be connected to the network, having: a function to distribute video data to the plurality of rendering units based on the video distribution control information from the timing server, and a function that carries out video processing to enable the irregular playback of the video data to be distributed, to the video data to be distributed.

According to the multi-screen video playback system according to this (22), by preparing the network separately, the multi-screen video playback system according to (20) can be constituted, and the same effect as that of the multi-screen video playback system according to (20) is obtained.

In addition, also in the multi-screen video playback system according to (22), it is preferable to have the same characteristic as that of the multi-screen video playback system according to the above (4) to (9), and (21).

(23) In the multi-screen video playback system according to any one of the above (1) to (22), it is preferable that the plurality of display devices are a plurality of display devices that constitute a multi-screen display, and wherein the multi-screen video playback system is a multi-screen video playback system to output video data synchronized with each of the plurality of display devices.

Thereby, a multi-screen video playback system suitable when carrying out video playback on a multi-screen display, such as a tiling display can be realized.

(24) In the multi-screen video playback system according to any one of the above (11), (13), (14), (16), (17), (19), (20), and (22), a certain rendering unit of the plurality of rendering units includes the function of the video distribution server.

(25) A video playback method in the multi-screen video playback system according to exemplary embodiments of the present invention includes: a video data storage device to store video data to be reproduced; a plurality of rendering units that output the video data read in from the video data storage device and being developed to a frame buffer in advance, to each corresponding display device of a plurality of display devices, and to carry out video processing to enable irregular playback of the video data; and a timing server that distributes timing information with which the plurality of rendering units output the video data synchronized with the corresponding display device to the plurality of rendering units by simultaneous transmission, and that generates, when an irregular playback instruction is given, irregular playback control information of video data based on this irregular playback instruction and can output this irregular playback control information to the rendering unit, and wherein the timing server includes distributing timing information with which the plurality of rendering units output the video data synchronized with the corresponding display device to the plurality of rendering units by simultaneous transmission; and generating, when an irregular playback instruction is given, irregular playback control information of video data based on this irregular playback instruction and distributing this irregular playback control information to the rendering unit, and wherein the plurality of rendering units includes outputting to the corresponding display device the video data read in from the video data storage device and being developed to a frame buffer in advance, based on timing information from the timing server; and carrying out the video processing based on this irregular playback control information, upon receipt of irregular playback control information from the timing server.

According to the video playback method in the multi-screen video playback system according to this (25), the same effect as the multi-screen video playback system according to the above (1) can be obtained. In addition, also in the video playback method of the multi-screen video playback system according to this (25), it is preferable to have the same characteristic as the multi-screen video playback system according to the above (2) to (9).

(26) The video playback method in the multi-screen video playback system of exemplary embodiments of the present invention is a video playback method in the multi-screen video playback system which includes: a plurality of rendering units that output video data to each corresponding display device of a plurality of display devices and that carry out video processing to enable irregular playback of the video data to the video data; and a video distribution server which distributes video data to the plurality of rendering units, that distributes timing information with which the plurality of rendering units output the video data synchronized with the corresponding display device, to the plurality of rendering units by simultaneous transmission, and that generates, when an irregular playback instruction is given, the irregular playback control information of video data based on this irregular playback instruction, and controls the video data to be distributed to the rendering unit according to the contents of this irregular playback control information, or a function to distribute this irregular playback control information to the rendering unit.

The video distribution server includes distributing video data to the plurality of rendering units; distributing timing information with which the plurality of rendering units output the video data synchronized with the corresponding display device to the plurality of rendering units by simultaneous transmission; and generating, when an irregular playback instruction is given, irregular playback control information of video data based on this irregular playback instruction and controlling the video data to be distributed to the rendering unit according to the contents of this irregular playback control information or distributing this irregular playback control information to the rendering unit.

The rendering unit includes outputting video data to each corresponding display device of the plurality of display devices based on the timing information; and carrying out video processing to enable the irregular playback of this video data, based on this irregular playback control information, upon receipt of the irregular playback control information.

According to the video playback method in the multi-screen video playback system according to this (26), the same effect as the multi-screen video playback system according to the above (11) can be obtained. In addition, also in the video playback method of the multi-screen video playback system according to (26), it is preferable to have the same characteristic as the multi-screen video playback system according to the above (4) to (9), and (12).

(27) The video playback method in the multi-screen video playback system of exemplary embodiments of the present invention includes: a plurality of rendering units that output video data to each corresponding display device of a plurality of display devices; and a video distribution server that distributes video data to the plurality of rendering units, that distributes timing information, with which the plurality of rendering units output the video data synchronized with the corresponding display device, to the plurality of rendering units by simultaneous transmission, and that generates, when an irregular playback instruction is given, irregular playback control information of video data based on this irregular playback instruction, and controls the video data to be distributed to the rendering unit according to the contents of this irregular playback control information, or to carry out video processing to the video data to be distributed.

The video distribution server includes distributing video data to the plurality of rendering units; distributing timing information with which the plurality of rendering units output the video data synchronized with the corresponding display device to the plurality of rendering units by simultaneous transmission; and generating, when an irregular playback instruction is given, irregular playback control information of video data based on this irregular playback instruction and controlling the video data to be distributed to the rendering unit according to the contents of this irregular playback control information, or of carrying out video processing to the video data to be distributed.

The rendering unit includes outputting video data to each corresponding display device of the plurality of display devices, based on the timing information.

According to the video playback method in the multi-screen video playback system according to this (27), the same effect as the multi-screen video playback system according to the above (14) can be obtained. In addition, also in the video playback method of the multi-screen video playback system according to (27), it is preferable to have the same characteristic as the multi-screen video playback system according to the above (4) to (9), and (15).

(28) The video playback method in the multi-screen video playback system of exemplary embodiments of the present invention is a the video playback method in the multi-screen video playback system which includes: a plurality of rendering units that outputs video data to the each corresponding display device of a plurality of display devices and to carry out video processing to enable irregular playback of the video data to the video data; a timing server that distributes timing information, with which the plurality of rendering units output the video data synchronized with the corresponding display device, to the plurality of rendering units by simultaneous transmission, that generates the video distribution control information to a video distribution server, and that generates, when an irregular playback instruction is given, irregular playback control information of video data based on this irregular playback instruction, and distributes according to the contents of this irregular playback control information, this irregular playback control information as the information to control the video data to be distributed, to the video distribution server, or that distributes this irregular playback control information to the rendering unit; and a video distribution server that distributes the video data to the plurality of rendering units based on the video distribution control information from the timing server.

The timing server includes distributing timing information with which the plurality of rendering units output the video data synchronized with the corresponding display device to the plurality of rendering units by simultaneous transmission; generating the video distribution control information for the video distribution server; and generating, when an irregular playback instruction is given, irregular playback control information of video data based on this irregular playback instruction and distributing this irregular playback control information as the information to control video data to be distributed, according to the contents of this irregular playback control information, to the video distribution server; or distributing this irregular playback control information to the rendering unit.

The video distribution server includes distributing video data to the plurality of rendering units based on the video distribution control information from the timing server.

The rendering unit includes outputting video data to each corresponding display device of the plurality of display devices based on the timing information and carrying out video processing to enable the irregular playback of the video data of the video data based on this irregular playback control information, upon receipt of the irregular playback control information.

According to the video playback method in the multi-screen video playback system according to this (28), the same effect as the multi-screen video playback system according to the above (17) can be obtained. In addition, also in the video playback method of the multi-screen video playback system according to (28), it is preferable to have the same characteristic as the multi-screen video playback system according to the above (4) to (9), and (18).

(29) The video playback method in the multi-screen video playback system of exemplary embodiments of the present invention is a video playback method in the multi-screen video playback system which includes: a plurality of rendering units that output video data to each corresponding display device of a plurality of display devices; a timing server that distributes timing information, with which the plurality of rendering units output the video data synchronized with the corresponding display device, to the plurality of rendering units by simultaneous transmission, that generates the video distribution control information to a video distribution server, and that generates, when an irregular playback instruction is given, irregular playback control information of video data based on this irregular playback instruction, and distributes this irregular playback control information as the information to control the video data to be distributed, to the video distribution server according to the contents of this irregular playback control information, or that distributes the irregular playback control information to the video distribution server as information for carrying out the video processing; and a video distribution server that distributes video data from the timing server to the plurality of rendering units based on the video distribution control information, and that carries out video processing to enable the irregular playback of the video data to be distributed, to the data to be distributed.

The timing server includes distributing timing information with which the plurality of rendering units output the video data synchronized with the corresponding display device to the plurality of rendering units by simultaneous transmission; generating the video distribution control information for the video distribution server; and generating, when an irregular playback instruction is given, irregular playback control information of video data based on this irregular playback instruction and distributing this irregular playback control information, as the information to control the video data to be distributed, to the video distribution server according to the contents of this irregular playback control information, or distributing this irregular playback control information to the video distribution server as information for carrying out the video processing.

The video distribution server includes distributing video data to the plurality of rendering units based on the video distribution control information from the timing server; and carrying out video processing to enable the irregular playback of the video data to be distributed, to the video data to be distributed.

The rendering unit includes outputting video data to each corresponding display device of the plurality of display devices, based on the timing information.

According to the video playback method in the multi-screen video playback system according to this (29), the same effect as the multi-screen video playback system according to the above (20) can be obtained. In addition, also in the video playback method of the multi-screen video playback system according to (29), it is preferable to have the same characteristic as the multi-screen video playback system according to the above (4) to (9) and (21).

(30) In the video playback method in the multi-screen video playback system according to any one of the above (25) to (29), it is preferable that the multi-screen video playback system is a multi-screen video playback system for outputting video data synchronized with each of a plurality of display devices that constitute the multi-screen video playback system.

Thereby, a multi-screen video playback method suitable for the multi-screen video playback system, which carries out video playback on the multi-screen display, such as a tiling display can be realized.

(31) The timing server according to exemplary embodiments of the present invention includes distributes timing information, with which the plurality of rendering units output the video data synchronized with the corresponding display device, to a plurality of rendering units by simultaneous transmission, and that generates, when an irregular playback instruction is given, the irregular playback control information of video data based on this irregular playback instruction, and can distribute this irregular playback control information to the rendering unit.

By constituting the multi-screen video playback system according to the above (1) using such timing server, the same effect as the multi-screen video playback system according to the above (1) can be obtained.

(32) In the timing server according to the above (31), it is preferable that the timing server is a timing server used in a multi-screen video playback system which includes: a network; a video data storage device to store video data to be reproduced; a plurality of rendering units connected to the network that output the video data read in from the video data storage device and being developed to a frame buffer in advance, to each corresponding display device of a plurality of display devices, and to carry out video processing to enable irregular playback of the video data; a timing server connected to the network that distributes timing information, with which the plurality of rendering units output the video data synchronized with the corresponding display device, to the plurality of rendering units by simultaneous transmission, and that generates, when an irregular playback instruction is given, the irregular playback control information of video data based on this irregular playback instruction, and can output this irregular playback control information to the rendering unit.

Thereby, the multi-screen video playback system according to the above (1) can be constituted.

(33) The rendering unit according to exemplary embodiments of the present invention outputs, to each corresponding display device of a plurality of display devices, the video data read in from the video data storage device and being developed to a frame buffer in advance, based on timing information from the timing server; and that carries out the video processing based on this irregular playback control information, upon receipt of irregular playback control information from the timing server.

By constituting the multi-screen video playback system according to the above (1) by using such rendering unit, the same effect as the multi-screen video playback system according to the above (1) can be obtained.

(34) In the rendering unit according to the above (33), the rendering unit is a rendering unit used in a multi-screen video playback system which includes: a network; a video data storage device to store video data to be reproduced; a plurality of rendering units connected to the network that output the video data read in from the video data storage device and being developed to a frame buffer in advance, to each corresponding display device of a plurality of display devices, and to carry out video processing to enable irregular playback of the video data; a timing server connected to the network that distributes timing information with which the plurality of rendering units output the video data synchronized with the corresponding display device to the plurality of rendering units by simultaneous transmission, and that generates, when an irregular playback instruction is given, the irregular playback control information of video data based on this irregular playback instruction and can output this irregular playback control information to the rendering unit.

Thereby, the multi-screen video playback system according to the above (1) can be constituted.

(35) The video distribution server of exemplary embodiments of the present invention distributes video data to a plurality of rendering units; distributes timing information with which the plurality of rendering units output the video data synchronized with a corresponding display device, to the plurality of rendering units by simultaneous transmission; and that generates, when an irregular playback instruction is given, irregular playback control information of video data based on this irregular playback instruction and controls the video data to be distributed to the rendering unit according to the contents of this irregular playback control information, or a function to distribute this irregular playback control information to the rendering unit.

By constituting the multi-screen video playback system according to the above (11) using such video distribution server, the same effect as the multi-screen video playback system according to the above (11) can be obtained.

(36) In the video distribution server according to the above (35), the video distribution server is a video distribution server used in a multi-screen video playback system which includes: a network; a plurality of rendering units connected to the network that output video data to each corresponding display device of a plurality of display devices and carry out video processing to enable irregular playback of the video data, to the video data; a video distribution server connected to the network that distributes video data to the plurality of rendering units, that distributes timing information, with which the plurality of rendering units output the video data synchronized with the corresponding display device, to the plurality of rendering units by simultaneous transmission, and that generates, when an irregular playback instruction is given, irregular playback control information of video data based on this irregular playback instruction, and controls the video data to be distributed to the rendering unit according to the contents of this irregular playback control information, or a function to distribute this irregular playback control information to the rendering unit.

Thereby, the multi-screen video playback system according to the above (11) can be constituted.

(37) The rendering unit of exemplary embodiments of the present invention outputs the video data that is distributed from a video distribution server to each corresponding display device of the plurality of display devices, based on timing information; and that carries out the video processing based on this irregular playback control information, upon receipt of irregular playback control information.

By constituting the multi-screen video playback system according to the above (11) or (17) by using such rendering unit, the same effect as the multi-screen video playback system according to the above (11) or (17) can be obtained.

(38) In the rendering unit according to the above (37), the rendering unit is a rendering unit used in a multi-screen video playback system which includes: a network; a plurality of rendering units connected to the network that output video data to each corresponding display device of a plurality of display devices and carry out video processing to enable irregular playback of the video data, to the video data; a video distribution server connected to the network that distributes video data to the plurality of rendering units, that distributes timing information, with which the plurality of rendering units output the video data synchronized with the corresponding display device, to the plurality of rendering units by simultaneous transmission, and that generates, when an irregular playback instruction is given, irregular playback control information of video data based on this irregular playback instruction, and controls the video data to be distributed to the rendering unit according to the contents of this irregular playback control information, or a function to distribute this irregular playback control information to the rendering unit.

Thereby, the multi-screen video playback system according to the above (1) can be constituted.

(39) In the rendering unit according to the above (37), the rendering unit is a rendering unit used in a multi-screen video playback system which includes: a network; a plurality of rendering units connected to the network that outputs the video data to each corresponding display device of a plurality of display devices, and to carry out video processing to enable irregular playback of the video data, to the video data; a timing server connected to the network that distributes timing information with which the plurality of rendering units output the video data synchronized with the corresponding display device to the plurality of rendering units by simultaneous transmission, that generates video distribution control information to the video distribution server, and that generates, when an irregular playback instruction is given, the irregular playback control information of video data based on this irregular playback instruction, and distributes this irregular playback control information as the information to control the video data to be distributed, according to the contents of this irregular playback control information, to the video distribution server, or to distribute this irregular playback control information to the rendering unit; and a video distribution server connected to the network that distributes video data to the plurality of rendering units based on the video distribution control information from the timing server.

Thereby, the multi-screen video playback system according to the above (17) can be constituted.

(40) The video distribution server of exemplary embodiments of the present invention distributes video data to a plurality of rendering units; distributes timing information with which the plurality of rendering units output the video data synchronized with a corresponding display device, to the plurality of rendering units by simultaneous transmission; and that generates, when an irregular playback instruction is given, irregular playback control information of video data based on this irregular playback instruction and controls the video data to be distributed to the rendering unit according to the contents of this irregular playback control information, or to carry out video processing to the video data to be distributed.

By constituting the multi-screen video playback system according to the above (14) using such video distribution server, the same effect as the multi-screen video playback system according to the above (14) can be obtained.

(41) In the video distribution server according to the above (40), the video distribution server is a video distribution server used in a multi-screen video playback system which includes: a network; a plurality of rendering units connected to the network that output video data to each corresponding display device of a plurality of display devices; a video distribution server connected to the network that distributes video data to the plurality of rendering units, that distributes timing information, with which the plurality of rendering units output the video data synchronized with the corresponding display device, to the plurality of rendering units by simultaneous transmission, and that generates, when an irregular playback instruction is given, the irregular playback control information of video data based on this irregular playback instruction, and controls the video data to be distributed to the rendering unit according to the contents of this irregular playback control information, or a function to carry out video processing to the video data to be distributed.

Thereby, the multi-screen video playback system according to the above (14) can be constituted.

(42) The timing server of exemplary embodiments of the present invention, distributes timing information with which a plurality of rendering units output the video data synchronized with a corresponding display device to the plurality of rendering units by simultaneous transmission; that generate the video distribution control information to a video distribution server; and that generate, when an irregular playback instruction is given, irregular playback control information of video data based on this irregular playback instruction, and distributes this irregular playback control information to the video distribution server, as the information to control video data to be distributed, according to the contents of this irregular playback control information, or a function to distribute this irregular playback control information to the rendering unit.

By constituting the multi-screen video playback system according to the above (17) using such timing server, the same effect as the multi-screen video playback system according to the above (17) can be obtained.

(43) In the timing server according to the above (42), it is preferable that the timing server is a timing server used in a multi-screen video playback system which includes: a network; a plurality of rendering units connected to the network that output the video data to each corresponding display device of a plurality of display devices, and carry out video processing to enable irregular playback of the video data, to the video data; a timing server connected to the network, that distributes timing information, with which the plurality of rendering units output the video data synchronized with the corresponding display device, to the plurality of rendering units by simultaneous transmission, that generates the video distribution control information to a video distribution server; and that generates, when an irregular playback instruction is given, the irregular playback control information of video data based on this irregular playback instruction, and distributes this irregular playback control information as the information to control the video data to be distributed, according to the contents of this irregular playback control information, to the video distribution server, or to distribute this irregular playback control information to the rendering unit; and a video distribution server connected to the network that distributes video data to the plurality of rendering units based on the video distribution control information from the timing server.

Thereby, the multi-screen video playback system according to the above (17) can be constituted.

(44) The timing server of exemplary embodiments of the present invention distributes timing information with which a plurality of rendering units output video data synchronized with a corresponding display device to the plurality of rendering units by simultaneous transmission; that generates the video distribution control information to a video distribution server; and that generates, when an irregular playback instruction is given, irregular playback control information of video data based on this irregular playback instruction, and distributes to the video distribution server this irregular playback control information as the information to control video data to be distributed, according to the contents of this irregular playback control information, or that distributes this irregular playback control information as the information for carrying out the video processing.

By constituting the multi-screen video playback system according to the above (20) by using such timing server, the same effect as the multi-screen video playback system according to the above (20) can be obtained.

(45) In the timing server according to the above (44), it is preferable that the timing server is a timing server used in a multi-screen video playback system which includes: a network; a plurality of rendering units connected to the network that output the video data to each corresponding display device of a plurality of display devices; a timing server connected to the network that distributes timing information with which the plurality of rendering units output the video data synchronized with the corresponding display device, to the plurality of rendering units by simultaneous transmission, that generates the video distribution control information to a video distribution server, and that generates, when an irregular playback instruction is given, the irregular playback control information of video data based on this irregular playback instruction, and distributes to the video distribution server this irregular playback control information as the information to control video data to be distributed, according to the contents of this irregular playback control information, or that distributes this irregular playback control information as the information to carry out the video processing, to the video distribution server; and a video distribution server connected to the network that distributes video data to the plurality of rendering units based on the video distribution control information from the timing server, and that carries out video processing to enable irregular playback of the video data to be distributed, to the video data to be distributed.

Thereby, the multi-screen video playback system according to the above (20) can be constituted.

(46) The display device of exemplary embodiments of the present invention includes a rendering unit that outputs to a display section the video data read in from the video data storage device and being developed to a frame buffer in advance, based on the timing information from the timing server, and that carries out the video processing based on this irregular playback control information, upon receipt of irregular playback control information from the timing server.

According to such a display device, by preparing the network and the timing server according to the above (31), separately, the multi-screen video device can be constituted easily.

(47) The display device of exemplary embodiments of the present invention includes a rendering unit that outputs the video data that is distributed from a video distribution server, to a display section, based on timing information, and that carries out the video processing based on this irregular playback control information, upon receipt of irregular playback control information.

According to such a display device, by preparing the network and the video distribution server according to the above (35), separately, the multi-screen video device can be constituted easily. In addition, if the timing server is provided separately from the video distribution server, the multi-screen video device can be easily constituted by preparing the timing server and the like along with the video distribution server.

BRIEF DESCRIPTION OF THE DRAWINGS

FIGS. 3A-B are schematics showing a double buffering;

DETAILED DESCRIPTION OF EMBODIMENTS

Exemplary Embodiment 1

Figure 1:
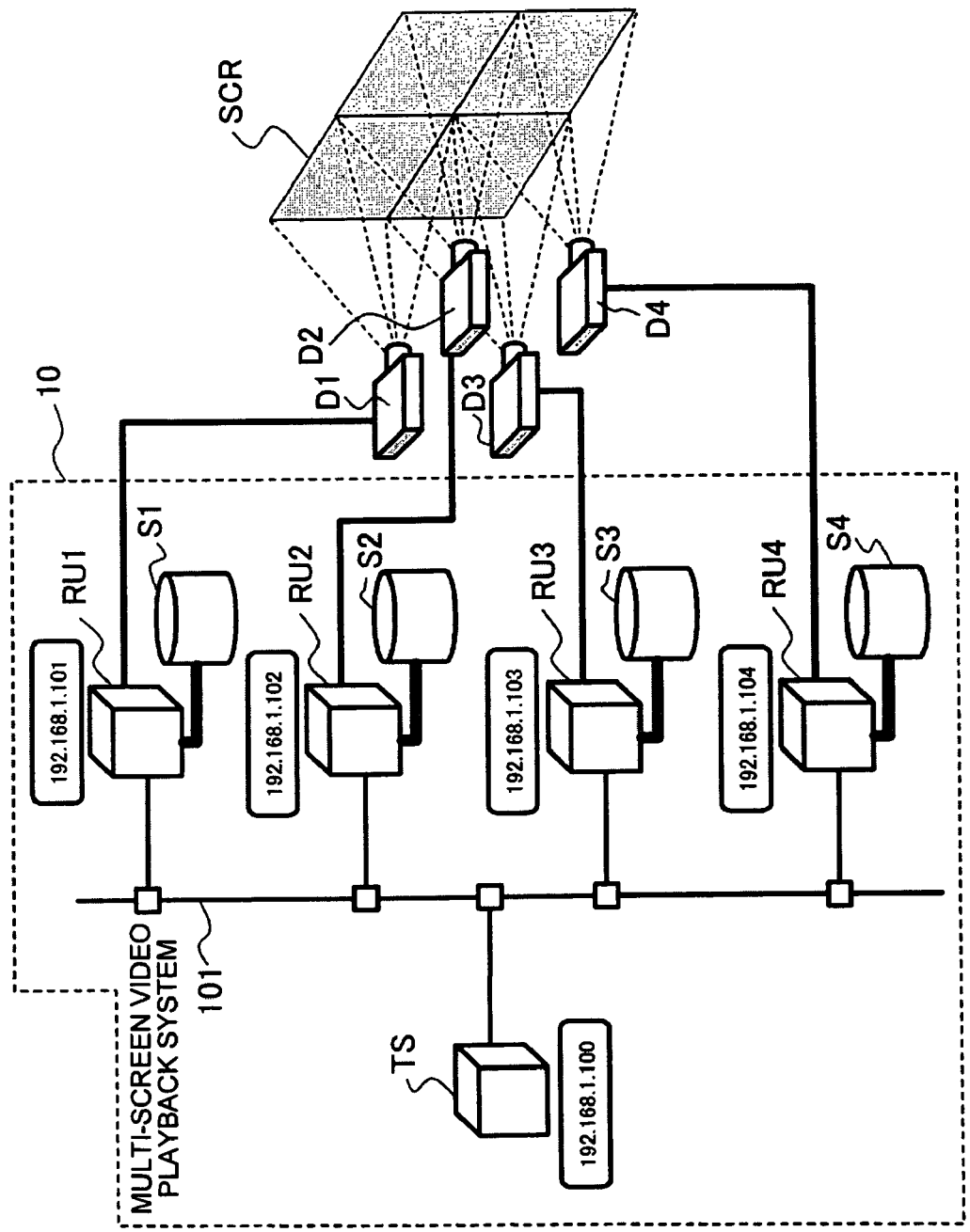
FIG. 1 is a schematic showing the configuration of a multi-screen video playback system according to an exemplary embodiment 1.
Figure 2:
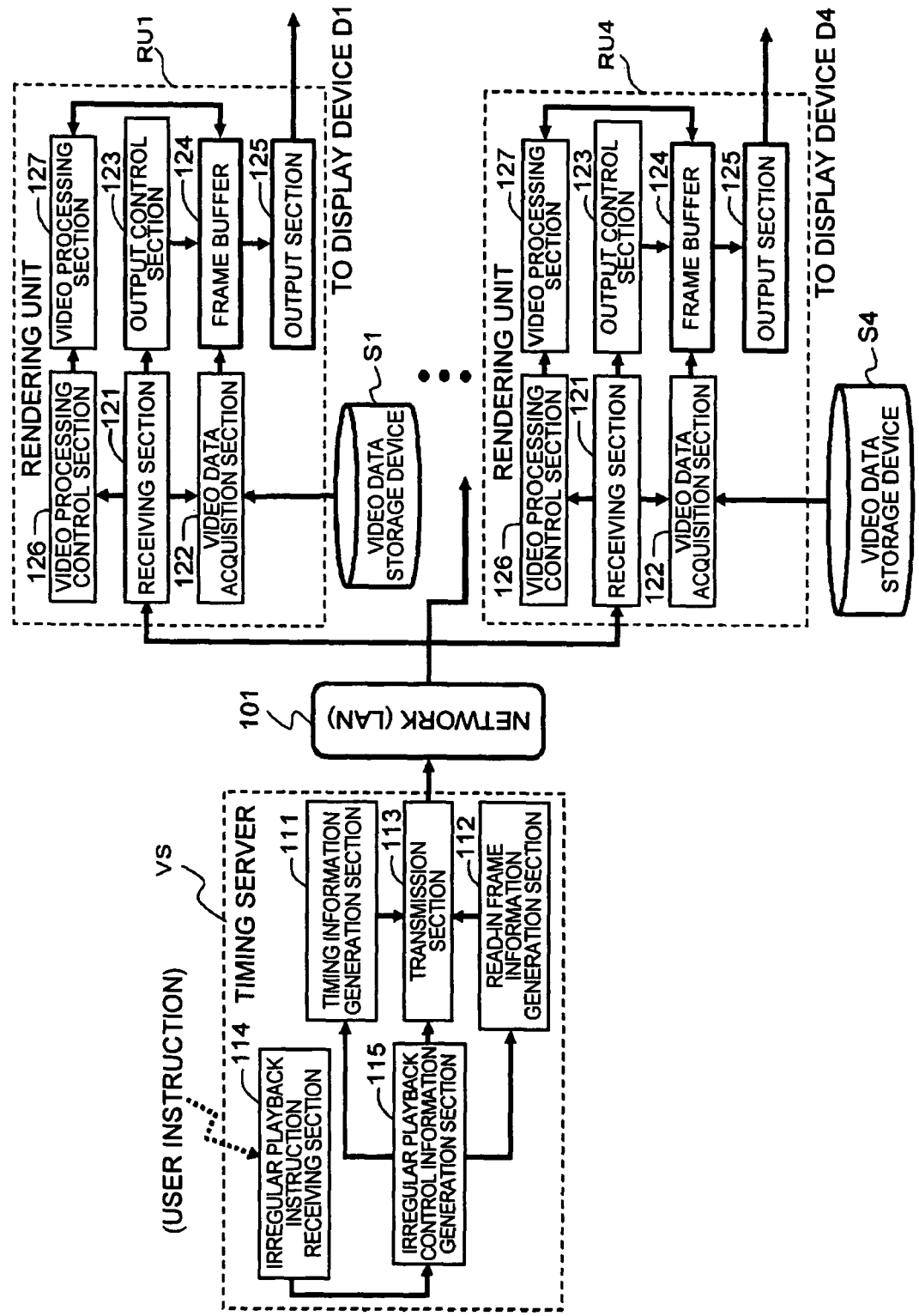
FIG. 2 is a schematic showing the configuration of a timing server and a rendering unit of the multi-screen video playback system concerning the exemplary embodiment 1.

FIG. 1 and FIG. 2 are schematics showing a multi-screen video playback system according to an exemplary embodiment 1 of the present invention. The multi-screen video playback system 10 according to this exemplary embodiment 1 is, as shown in FIG. 1, a video playback device to output the synchronized video data to a plurality of display devices D1 through D4 (assuming the display device is a projector, in the exemplary embodiment of the present invention), which constitute the multi-screen display.

Moreover, the multi-screen display, to which the synchronized video data outputted by this multi-screen video playback system 10 is projected, consists of four sets of display devices D1 through D4 arranged in a matrix form of 2 lines by 2 rows (2×2), and reproduces one large screen video by combining an unit video (a partial video) which each of these display devices D1 through D4 projects onto a screen SCR.

In addition, the meaning of a "frame" used in the description of the exemplary embodiment 1 includes the meaning of a "field" in the video of an interlace method, other than the "frame" of an ordinary video. This is same also in other exemplary embodiments.

The configuration of the multi-screen video playback system 10 in this exemplary embodiment 1 will be explained in detail, referring to FIG. 1 and FIG. 2. This multi-screen video playback system 10, as shown in FIG. 1 and FIG. 2, includes a LAN (Local Area Network) 101 as a network, a timing server TS connected to this LAN 101 by a network interface (not shown), a plurality of (assuming four sets in the exemplary embodiment of the present invention) rendering units RU1 through RU4 connected to the LAN 101 by the network interface (not shown), and video data storage devices S1 through S4 which store the video data to be reproduced.

In addition, these timing server TS and rendering units RU1 through RU4 can be prepared not only as dedicated devices, but also can be substituted by a personal computer (PC) having the network interface.

The timing server TS according to this exemplary embodiment 1 includes: a timing information generation section 111 which generates a display instruction packet as a synchronized signal based on the display timing which indicates a display instruction; a read-in frame information generation section 112 which generates, as a read-in instruction packet, the read-in frame information concerning the video data which each of the rendering units RU1 through RU4 should read from the each corresponding video data storage devices S1-S4; a transmission section 113 which distributes the display instruction packet generated in such timing information generation section 111 or the read-in instruction packet generated in the read-in frame information generation section 112, to each of the rendering units RU1 through RU4 by simultaneous transmission.

Moreover, this timing server TS includes an irregular playback instruction receiving section 114 which receives an irregular playback instruction given by a user, and an irregular playback control information generation section 115 which generates the irregular playback control information based on the irregular playback instruction from the user, which is received by this irregular playback instruction receiving section 114.

This irregular playback control information generation section 115 enables providing to either or both of the timing information generation section 111 and the read-in frame information generation section 112 according to the contents of the irregular playback control information generated here, and furthermore, depending on the contents of the irregular playback control information, can generate the irregular playback control packet in which the irregular playback control information is stored, and can distribute the irregular playback control packet to each of the rendering units RU1 through RU4 directly from the transmission section 113 by simultaneous transmission. Moreover, depending on the case, it is also possible to distribute only to a certain specific rendering unit by unicast communication. In addition, an example concerning the irregular playback operation based on this irregular playback control information will be explained hereinafter.

This timing server TS is connected to each of the rendering units RU1 through RU4 through the LAN 101, and assume that the network protocol at this time is TCP/IP (Transport Control Protocol/Internet Protocol). Moreover, the description will be made, assuming the version number of the IP is 4, or IPv4.

Moreover, an IP address of "192.168.1.100" is assigned to this timing server TS on the LAN 101, and the IP addresses shown in FIG. 1 are also assigned to each of the rendering units RU1 through RU4, respectively.

Namely, the IP address expressed as "192.168.1.101" is assigned to the rendering unit RU1, "192.168.1.102" to the rendering unit RU2, "192.168.1.103" to the rendering unit RU3, and "192.168.1.104" to the rendering unit RU4. This shows that the timing server TS and each of the rendering units RU1 through RU4 all belong to a group of the network "192.168.1".

Moreover, it is preferable that the network topology of the LAN 101 used here is made to be a "closed" network, and is a configuration of connection in which there is no large differences in the number of the hierarchy of the connection between a video distribution server VS and each of the rendering units RU1 through RU4. The reason for this is that if there is a large difference in the number of the hierarchy, it is highly likely that the deviation in the receiving time of the display instruction packet due to the simultaneous transmission (broadcast communication, in this case) will be large between each of the rendering units RU1 through RU4.

Moreover, because this LAN 101 is assumed to be a small-scaled and closed network, it is almost unnecessary to take into consideration that the data which runs on the LAN 101 as a packet is delayed or lost.

On the other hand, each of the rendering units RU1 through RU4 includes: a receiving section 121 which receives a read-in instruction packet distributed from the timing server TS, a display instruction packet, and an irregular playback control packet; a video data acquisition section 122 which reads, in units of frame, the video data to be displayed, which is stored in a video data storage devices S1 through S4, based on the read-in frame information stored in the read-in instruction packet received in this receiving section 121; a frame buffer 124 to which the video data in units of frame obtained in this video data acquisition section 122 is developed; an output control section 123 which carries out output-control of the video data being developed to the frame buffer 124, based on the display instruction timing information from the timing server TS that is stored in the display instruction packet, which is received also in the receiving section 121; and an output section 125 which outputs the video data to be displayed, which is outputted from the frame buffer 124, to a corresponding display device (any one of the display devices D1 through D4), respectively.

Moreover, each of the rendering units RU1 through RU4 also includes a video processing control section 126 which analyzes the contents of the irregular playback control packet received in the receiving section 121, and carries out processing such as the corresponding video processing instruction and the like; and a video processing section 127 which performs video processing based on the control of this video processing control section 126.

Moreover, each output section 125 of each of the rendering units RU1 through RU4 is connected to each corresponding display device (any one of the display devices D1 through D4).

In addition, as the video data storage devices S1 through S4, a storage device which can store long hours of video data, for example, a storage medium, such as HDD and DVD can be exemplified. Moreover, the video data storage devices S1 through S4 may be a video data storage device in which a common video data is stored, and may be a video data storage device in which only video data which each of the rendering units RU1 through RU4 should display is stored (for example, referring to FIG. 1, in the case of the video data storage device S1 connected to the rendering unit RU1, only a unit video data concerning the upper left area of the original video may be recorded).

Moreover, each frame buffer 124 of these rendering units RU1 through RU4 is a storage area to develop the video data read in from the video data storage devices S1 through S4, and this recording area is secured on a RAM, or, in case of PC, for example, on a video memory in a video card.

Moreover, in this frame buffer 124, there exist two buffers: a frame buffer (a display frame buffer) to develop the video data presently being displayed; and a frame buffer (a read-ahead frame buffer) to store the video data to be displayed next, and double buffering which is used by changing these roles alternately is realized. In addition, a plurality of read-ahead frame buffers, instead of one, may exist.

FIG. 3 is a view shown to explain the double buffering, and as shown in this FIG. 3, two frame buffers A and B having a mutually complementary relationship which constitute the double buffering are used as the frame buffer 124.

To explain the operation of this FIG. 3, first, as shown in FIG. 3a, the frame buffer A becomes the target for the operation of outputting the already-developed video data regarding the frame concerned, to any corresponding display device out of the display devices D1 through D4. The frame buffer B becomes the target for the operation of read-in/development of the video data concerning the next frame, from any corresponding one out of the video data storage devices S1 through S4.

Then, as shown in FIG. 3b, the frame buffer B becomes the target for the operation of outputting the already read-in/developed video date concerning the next frame, to any corresponding display device out of the display devices D1 through D4, while in the frame buffer A, the operation of read-in/development of the video data concerning the further next frame from any corresponding one out of the video data storage devices S1 through S4 is carried out.

In addition, this frame buffer 124 may be constituted as to have a function, for example, as a ring buffer. Moreover, "developing" video data to the frame buffer 124 includes expanding or decrypting the video data which is compressed or encrypted to store to the frame buffer 124, other than storing the video data to the frame buffer 124, as is.

Figure 4:
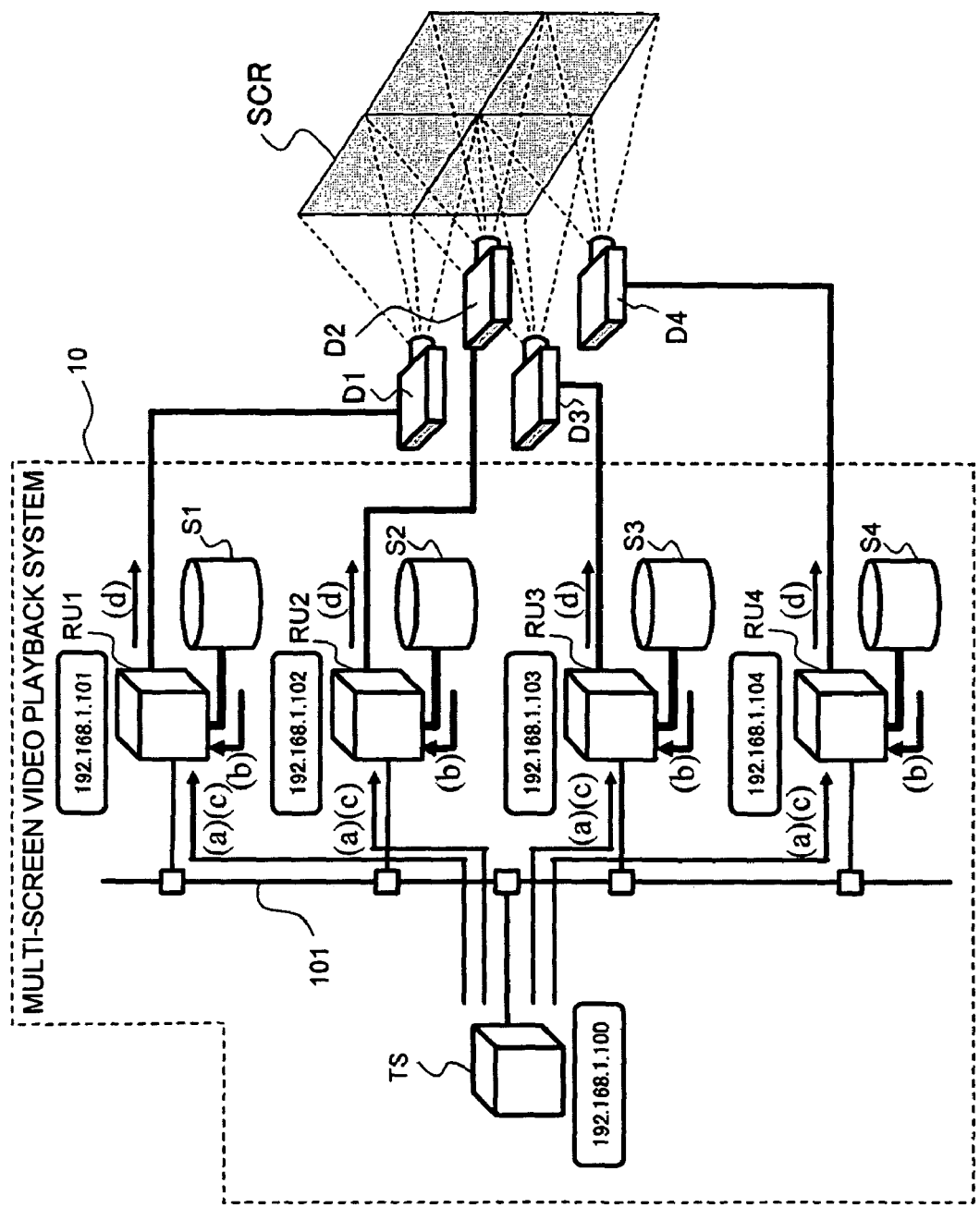
FIG. 4 is a schematic showing, in the configuration of FIG. 1, the whole processing flow of the multi-screen video playback system concerning the exemplary embodiment 1.

Next, the operation of this exemplary embodiment 1 will be explained. First, the regular playback operation will be explained. FIG. 4 explains, in the configuration of FIG. 1, the processing flow of the multi-screen video playback system in this exemplary embodiment 1, and the whole processing flow in the exemplary embodiment 1 is described by this FIG. 4.

First, in the timing server TS, a read-in instruction packet is generated by the read-in frame information generation section 112, and this generated read-in instruction packet is sent out by broadcast communication onto the LAN 101. The IP address for the broadcast communication at this time is "192.168.1.255." In addition, the read-in instruction packet may be sent by unicast communication to each rendering unit, not by broadcast or multicast communication, if the read-in instruction packet can be distributed adequately to each rendering unit.

In this way, when the read-in instruction packet is distributed by broadcast communication onto the LAN 101 from the timing server TS ((a) in FIG. 4), the read-in instruction packet will be received in the receiving section 121 in each of the rendering units RU1 through RU4.

When each of the rendering units RU1 through RU4 receives the read-in instruction packet in the receiving section 121, the video data acquisition section 122 will read-in the video data to be displayed, in units of frame, from each of the corresponding video data storage devices S1 through S4 ((b) in FIG. 4), and will develop this video data to the frame buffer 124.

Figure 23:
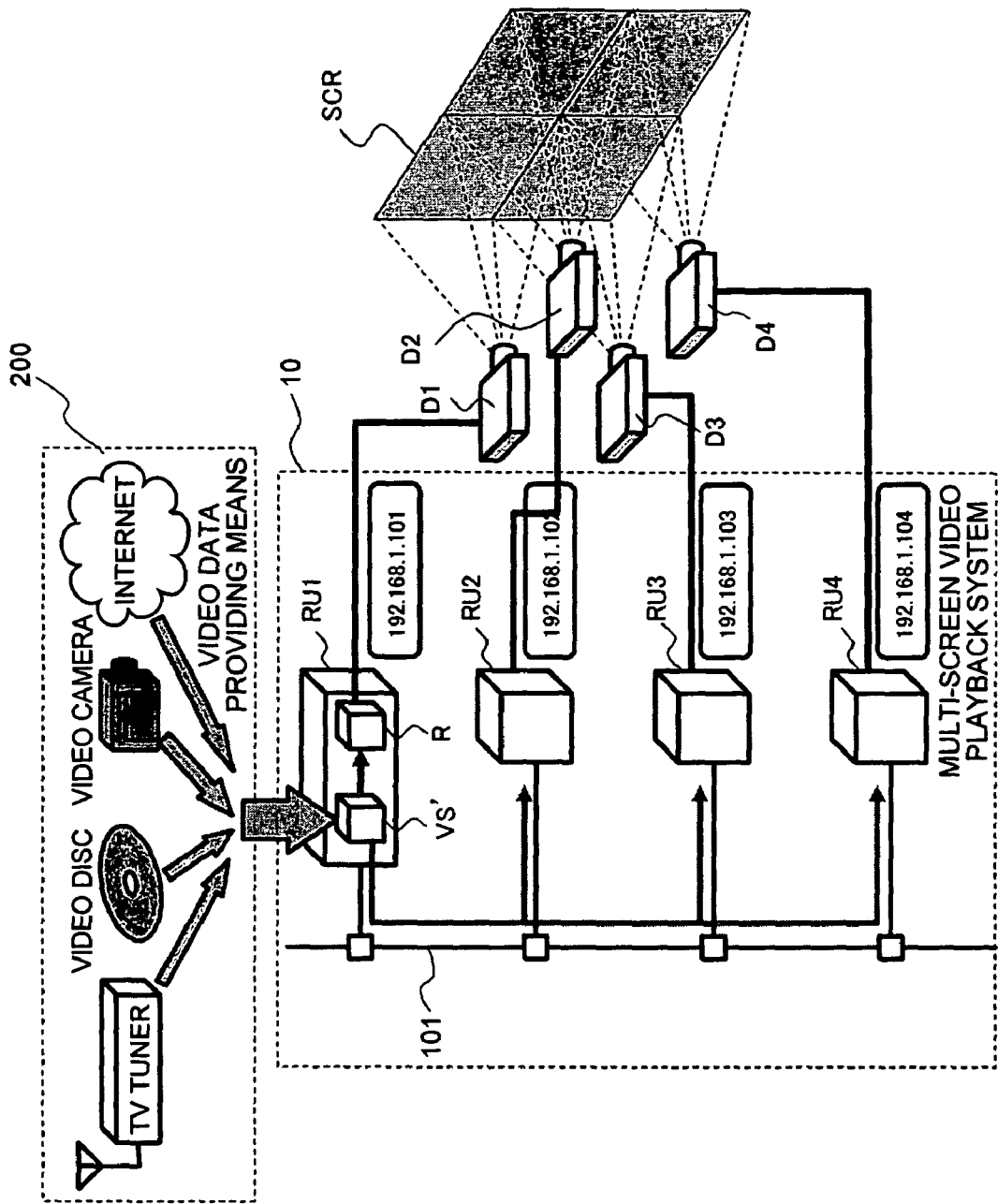
FIG. 23 is a schematic showing the configuration of the multi-screen video playback system according to an exemplary embodiment 6.

Here, assuming that four display devices D1 through D4 of 2×2 constituting the multi-screen display device is a tiling display as shown in FIG. 23 which constitutes one large screen combining these partial video by displaying each partial video, respectively, each of the rendering units RU1 through RU4 enlarges and develops the video data corresponding only to the display area (for example, the upper left area of the combined screens of 2×2, in the rendering unit RU1 which is connected to the display device D1), which each rendering unit itself takes charge of, out of the read-in video data, to the frame buffer 124.

In addition, needless to say, the rendering units RU1 through RU4 may output the same video data, respectively, and display the same video from each of the corresponding display devices D1 through D4.

Subsequently, in the timing server TS, the display instruction packet is distributed to each of the rendering units RU1 through RU4 by broadcast communication at the timing of the display cycle T (approximately 33.333 milli seconds, if the original frame rate is 30 frames/second) which is adjusted to the original playback frame rate of the video data to display ((c) in FIG. 4).

In each of the rendering units RU1 through RU4, when receiving the display instruction packet from the timing server TS in the receiving section 121, the video data being developed to the frame buffer 124 by the output control section 123 is outputted to the corresponding display device from the output section 125. Thereby, in each of the rendering units RU1 through RU4, the video data is read-in from each frame buffer 124 at the same timing, and the read-in video data is outputted to the corresponding display devices D1 through D4 ((d) in FIG. 4).

Then, immediately after distributing this display instruction packet, the next read-in instruction packet is distributed, and thereafter, the operation of distributing the display instruction packet to each of the rendering units RU1 through RU4 at a predetermined timing is carried out repeatedly. In addition, the distribution cycle of these read-in instruction packet and display instruction packet is set to be the display cycle T which is adjusted to the above described playback frame rate.

In addition, if four display devices D1 through D4 of 2×2 constituting the multi-screen display device is a tiling display which constitutes one large screen combining these partial video by displaying each partial video, the video data corresponding to only the display area (for example, in the rendering unit connected to the display device D1, the upper left area of the combined screens of 2×2), which each of the rendering units RU1 through RU4 itself takes charge of, out of the read-in video data, is outputted to the corresponding display devices D1 through D4 in the synchronized condition, respectively.

Thereby, from the plurality of display devices D1 through D4 which constitute the multi-screen display, each synchronized partial video is projected and one large screen combining the partial video is displayed on the screen SCR.

Incidentally, because each of the rendering units RU1 through RU4 has only to be capable of developing the video data to be displayed next, to the frame buffer 124 (the display frame buffer) before receiving the display instruction packet from the timing server TS, if the relationship between the maximum time TL which each of the rendering units RU1 through RU4 takes in the read-in and the development of the video data, and the display cycle T is ensured to be TL≦T, then the difference of the performance between each of the rendering units RU1 through RU4 (difference in the processing speed) can be absorbed to some extent.

Figure 5:
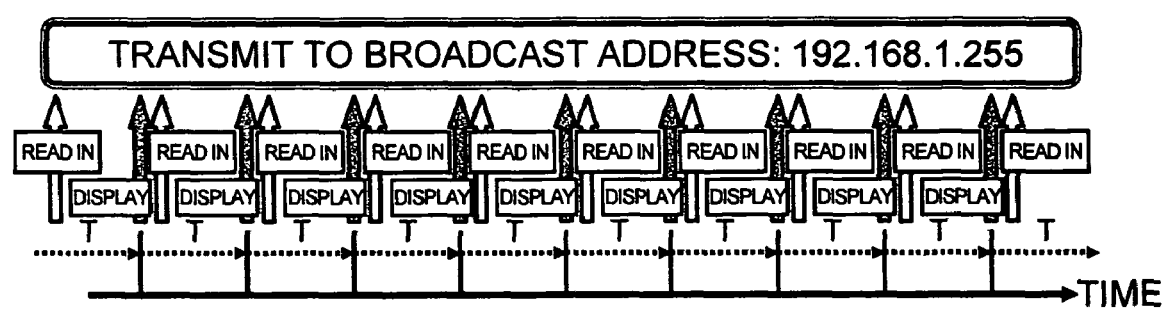
FIG. 5 is a schematic showing the distribution timing of a read-in instruction packet and a display instruction packet, to a rendering unit, at the time of the regular playback of a timing server concerning the exemplary embodiment 1.

FIG. 5 is a schematic showing the distribution timing of the read-in instruction packet and the display instruction packet from the timing server TS to each of the rendering units RU1 through RU4.

In the multi-screen video playback system 10 according to this exemplary embodiment 1, the timing server TS distributes the display instruction packet at a predetermined timing, after distributing the read-in instruction packet.

In FIG. 5, the distribution timing of the read-in instruction packet is shown with the outline arrow, and the distribution timing of the display instruction packet is shown with the gray arrow. In addition, "read-in" described in the outline arrow portion is the abbreviation of "read-in instruction packet", and this outline arrow indicates the distribution timing of the read-in instruction packet. Moreover, "display" described in the gray arrow portion is the abbreviation of "display instruction packet", and this gray arrow indicates the distribution timing of the display instruction packet.

As apparent from this FIG. 5, the timing server TS, first, distributes a read-in instruction packet to each of the rendering units RU1 through RU4 by broadcast communication, and thereafter, distributes a display instruction packet to each of the rendering units RU1 through RU4 by broadcast communication at a predetermined timing. Then, immediately after distributing this display instruction packet, the next read-in instruction packet is distributed, and then, the display instruction packet is distributed to each of the rendering units RU1 through RU4 at a predetermined timing by broadcast communication, and such operations are carried out repeatedly. In addition, the distribution cycle of these read-in instruction packet and display instruction packet are set to be the display cycle T which is adjusted to the playback frame rate.

Figure 6:
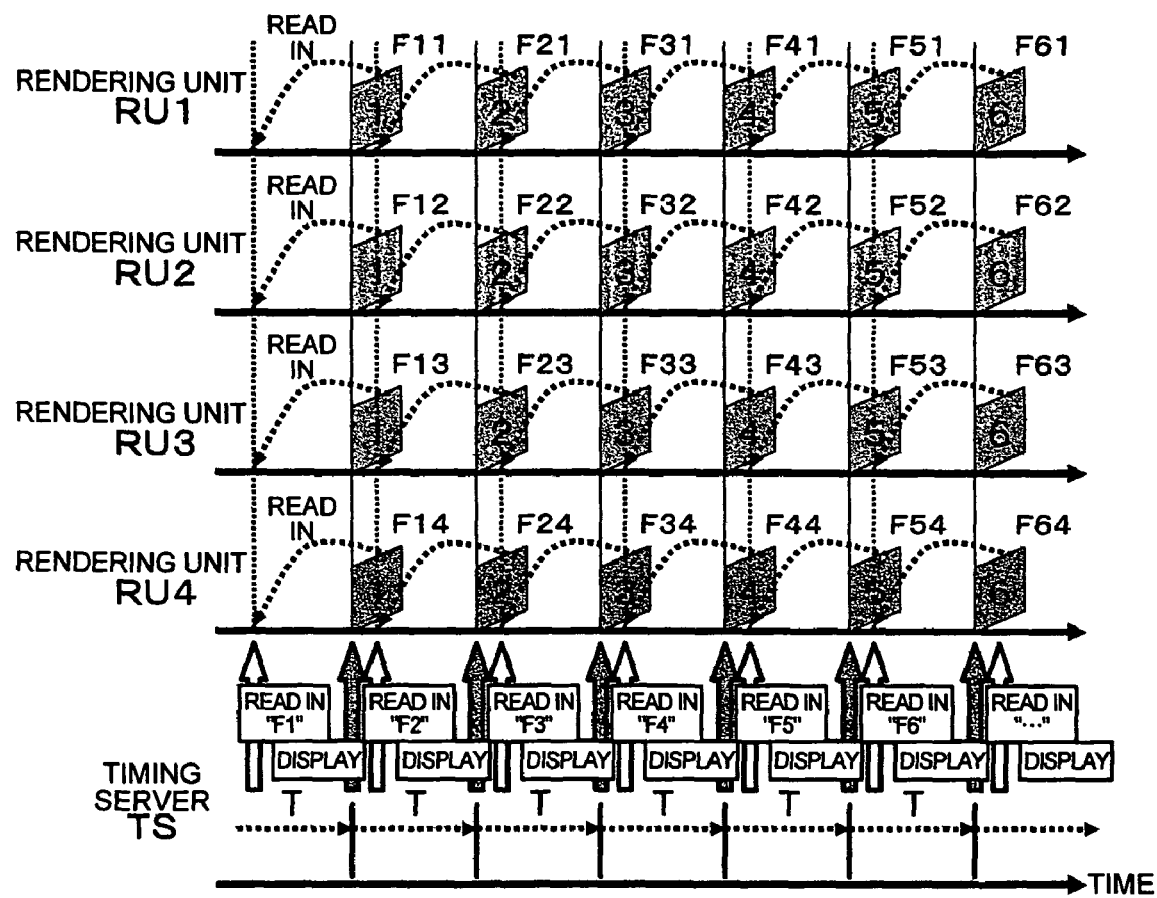
FIG. 6 is a schematic showing the distribution timing to the rendering unit, of a read-in instruction packet and a display instruction packet from the timing server, and the operation of the rendering unit at the time of the regular playback of the multi-screen video playback system concerning the exemplary embodiment 1.

FIG. 6 is a schematic showing the distribution timing of the read-in instruction packet and the display instruction packet from the timing server TS to each of the rendering units RU1 through RU4, and the operation of the rendering unit based on these read-in instruction packet and display instruction packet. Also in FIG. 6, like FIG. 5, the distribution timing of the read-in instruction packet is shown with the outline arrow, and the distribution timing of the display instruction packet is shown with the gray arrow.

As apparent from this FIG. 6, the timing server TS, first, distributes the read-in instruction packet to each of the rendering units RU1 through RU4. Thereby, each of the rendering units RU1 through RU4 carries out the read-in of the video data in units of frame (corresponding to frame F1) stored in the video data storage devices S1 through S4, and develops this to the frame buffer 124. Then, the timing server TS distributes the display instruction packet to each of the rendering units RU1 through RU4 at a predetermined timing, and thereby, each of the rendering units RU1 through RU4 outputs to each of the corresponding display devices D1 through D4 the video data being developed to the frame buffer 124.

Then, the timing server TS distributes the next read-in instruction packet to each of the rendering units RU1 through RU4. Thereby, each of the rendering units RU1 through RU4 reads in the video data in units of frame (corresponding to frame F2) stored in the video data storage devices S1 through S4, and develops this to the frame buffer 124. Subsequently, the timing server TS distributes the display instruction packet to each of the rendering units RU1 through RU4 at a predetermined timing, and thereby, each of the rendering units RU1 through RU4 outputs the video data being developed to the frame buffer 124 to each of the corresponding display devices D1 through D4.

By repeating this operation, each of the rendering units RU1 through RU4 can output the synchronized video data to each of the display devices D1 through D4.

In addition, FIG. 6 is an example of display operation in a tiling display by the four display devices D1 through D4 as shown in FIG. 1: F1, F2, etc. express the video data in each frame to the whole tiling display; F11, F12 etc. express the video data in the first frame, the second frame, etc. corresponding to the area that the rendering unit RU1 takes charge of; F21, F22, etc. express the video data in the first frame, the second frame, and etc. corresponding to the area that the rendering unit RU2 takes charge of; F31, F32, etc. express the video data in the first frame, the second frame corresponding to the area that the rendering unit RU3 takes charge of; and F41, F42, etc. express the video data in the first frame, the second frame corresponding to the area that the rendering unit RU4 takes charge of.

Thus, according to the multi-screen video playback system 10 concerning the exemplary embodiment 1, in each of the rendering units RU1 through RU4, the video data is read-in from each of the corresponding video data storage devices S1 through S4 and developed to the frame buffer 124 based on the read-in instruction packet which is simultaneously distributed from the timing server TS through the LAN 101 to each of the rendering units RU1 through RU4, and the video data being developed to the frame buffer 124 is outputted to the corresponding display devices D1 through D4 by the display instruction packet to be distributed next from the timing server TS, therefore, any one of the timing server TS and each of the rendering units RU1 through RU4 does not need to acquire the absolute time.

For this reason, any one of the timing server TS and each of the rendering units RU1 through RU4 of the receiving side does not need to contain an extremely accurate internal clock, nor to receive the time signal distributed from a GPS (Global Positioning System) satellite, nor to communicate with an external time server based on the NTP, and thus, with a simple system easy to handle and reduce cost, a synchronized video playback can be carried out.

Incidentally, although the above description has been made regarding the regular playback, various irregular playbacks which are different from such regular playback can be made in exemplary embodiments of the present invention. In addition, in exemplary embodiments of the present invention, out of the irregular playback, irregular playback methods which realize more advanced video expression, for example, by controlling the video data itself to be displayed, such as contents change and picture in picture (hereinafter, referred to as PinP), and by carrying out video processing, such as color processing like color correction and the like, as well as resolution conversion will be described. Hereinafter, the irregular playback which realizes such advanced video expression will be explained.

The irregular playback control information to enable the irregular playback to realize such advanced video expression is generated by the irregular playback control information generation section 115. Namely, when an irregular playback instruction is given to the irregular playback instruction receiving section 114 by a user, the irregular playback control information corresponding to the irregular playback instruction by the user will be generated in the irregular playback control information generation section 115.

FIGS. 7A-C are schematics showing an example of the irregular playback for realizing the advanced video expression. FIG. 7A is an example of carrying out irregular playback control for carrying out the content change (change of the displayed video), which changes this video data to the video data of other contents during the playback of the video data of a certain contents. 7B in this view, is an example of carrying out irregular playback control for carrying out color processing during the playback of a certain video data. 7C in this view, shows an example of carrying out irregular playback control for carrying out PinP during the playback of a certain video data.

Among such irregular playback controls, the contents change and PinP can be carried out by that based on an irregular playback instruction from a user who instructs the contents change, the irregular playback control information generation section 115 generates the irregular playback control information to carry out the contents change, and based on this irregular playback control information, the read-in frame information generation section 112 generates a read-in instruction packet, and then this read-in instruction packet is distributed to each rendering unit (there may be a case of only a certain specific rendering unit).

Namely, the rendering unit which received the read-in instruction packet, in which the irregular playback control information for carrying out this contents change instructions is stored, reads out the video to be displayed from the corresponding video storage device based on the irregular playback control information stored in this read-in instruction packet, and develops this to a frame buffer. Thereby, the contents change and PinP can be realized.

Moreover, with respect to color processing, resolution conversion, and the like, the irregular playback control information generation section 115 generates the irregular playback control packet, in which the irregular playback control information of the contents which instructs color processing and resolution conversion is stored, based on the irregular playback instruction given by the user who instructs the color processing and the resolution conversion, and distributes this irregular playback control packet to each of the rendering units RU1 through RU4 (there may be also a case of only a certain specific rendering unit).

Then, at the rendering unit side which received this irregular playback control packet, the video processing control section 126 analyzes the contents of the irregular playback control packet, and carries out the processing of the video processing instruction, and the like corresponding to this, and thereby the video processing section 127 carries out the color processing, the resolution conversion, and the like to the video data being developed to the frame buffer 124.

Figure 7:
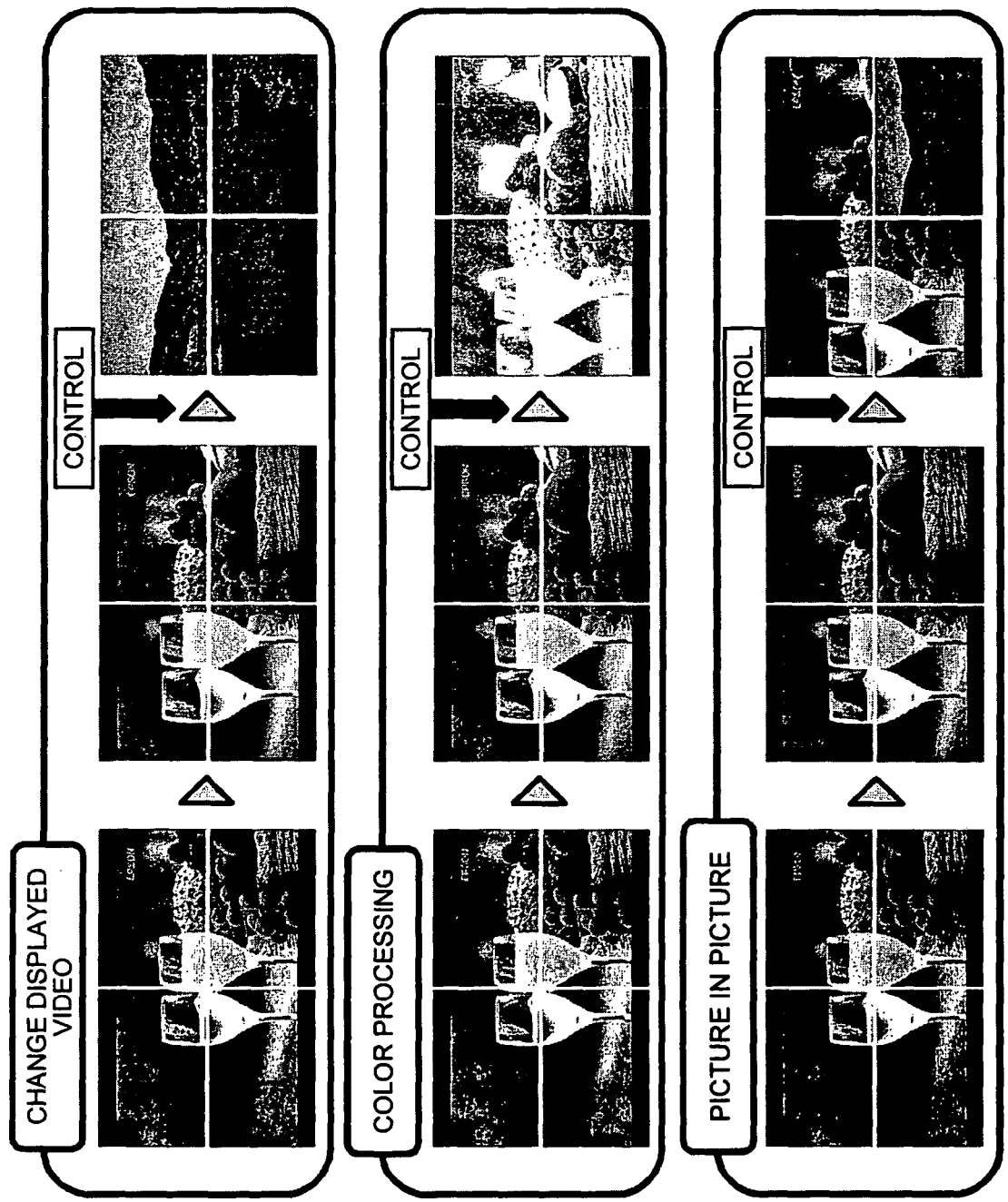
FIGS. 7A-C are schematics showing an example of irregular playback for realizing video expressions concerning exemplary embodiments of the present invention.
Figure 8:
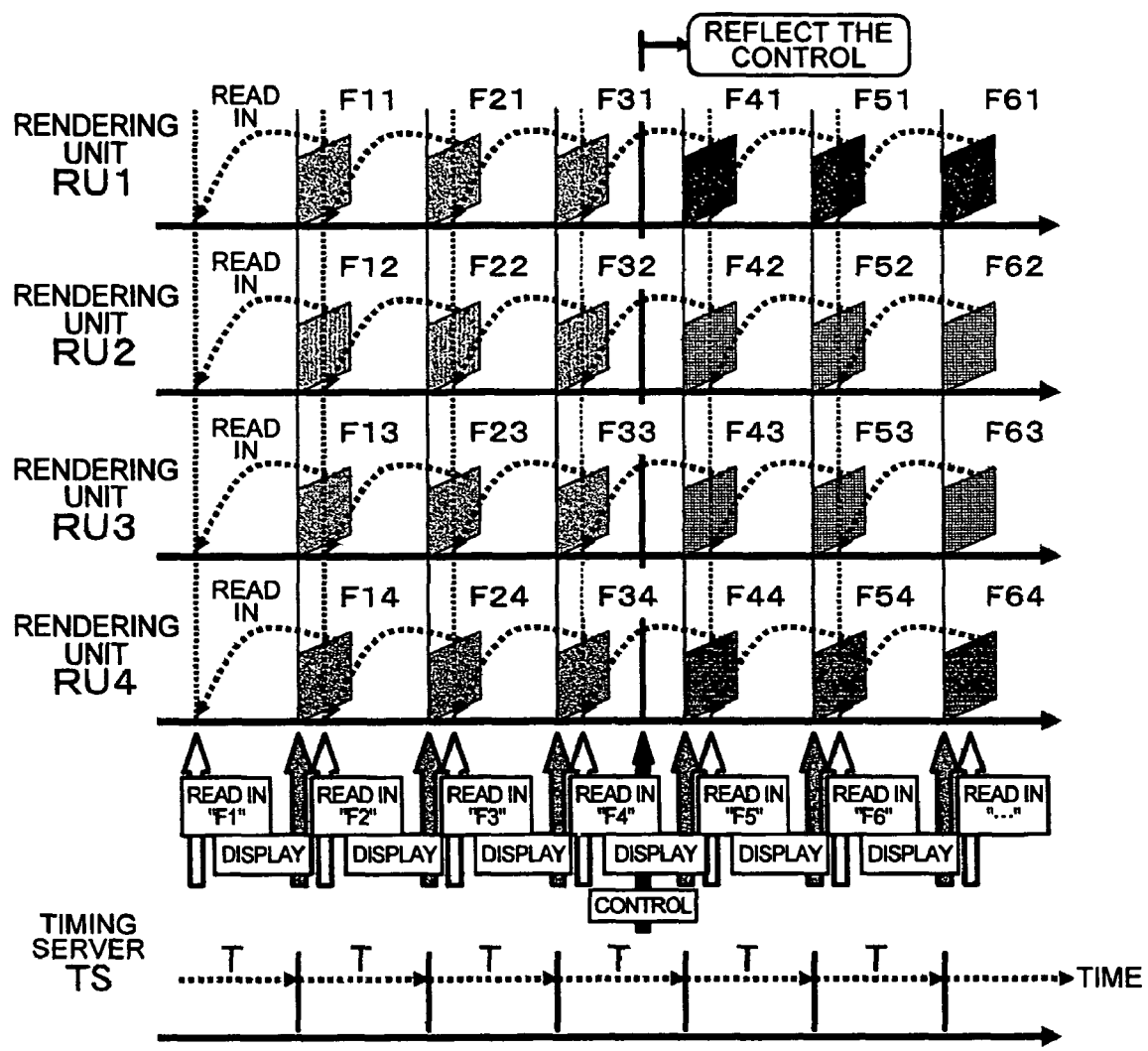
FIG. 8 is a schematic showing, in FIG. 6, one example of the irregular playback control of the exemplary embodiment 1, and is a view showing the irregular playback control to all rendering units.

FIG. 8 is a schematic showing the distribution timing of the read-in instruction packet, the display instruction packet, and the irregular playback control packet of the timing server TS to each of the rendering units RU1 through RU4, when realizing the video processing as shown in FIG. 7. This is the case where all the rendering units RU1-RU4 are controlled simultaneously. This FIG. 8 corresponds to FIG. 6 which is already explained as the regular operation at the time of playback.

In FIG. 8, the read-in instruction packet and the display instruction packet are distributed to each of the rendering units RU1 through RU4 by broadcast communication at the same timing as FIG. 6, and the read-in instruction packet and the display instruction packet are distributed in a cycle T (if the frame rate is 30 frames/second, T is approximately 33.333 milli seconds), respectively, and thereby the playback operation like the one at the time of the regular playback is carried out by each of the display devices D1 through D4.

Suppose that the irregular playback control packet has been distributed to each of the rendering units RU1 through RU4 by simultaneous transmission from the timing server TS at a certain timing in such regular playback operation. The distribution timing of this irregular playback control packet is shown with the black arrow, and "control" described in this arrow portion is the abbreviation of "irregular playback control packet", and this black arrow indicates the distribution timing of the irregular playback control packet.

In the example of this FIG. 8, because the irregular playback control packet is distributed after the read-in instruction in frame F4, each of the rendering units RU1 through RU4 carries out video processing to the video data in frame F4 and the subsequent frame based on the contents of the distributed irregular playback control packet, and thereby, the playback to which this irregular playback control is reflected is carried out from each of the display devices D1 through D4.

Figure 9:
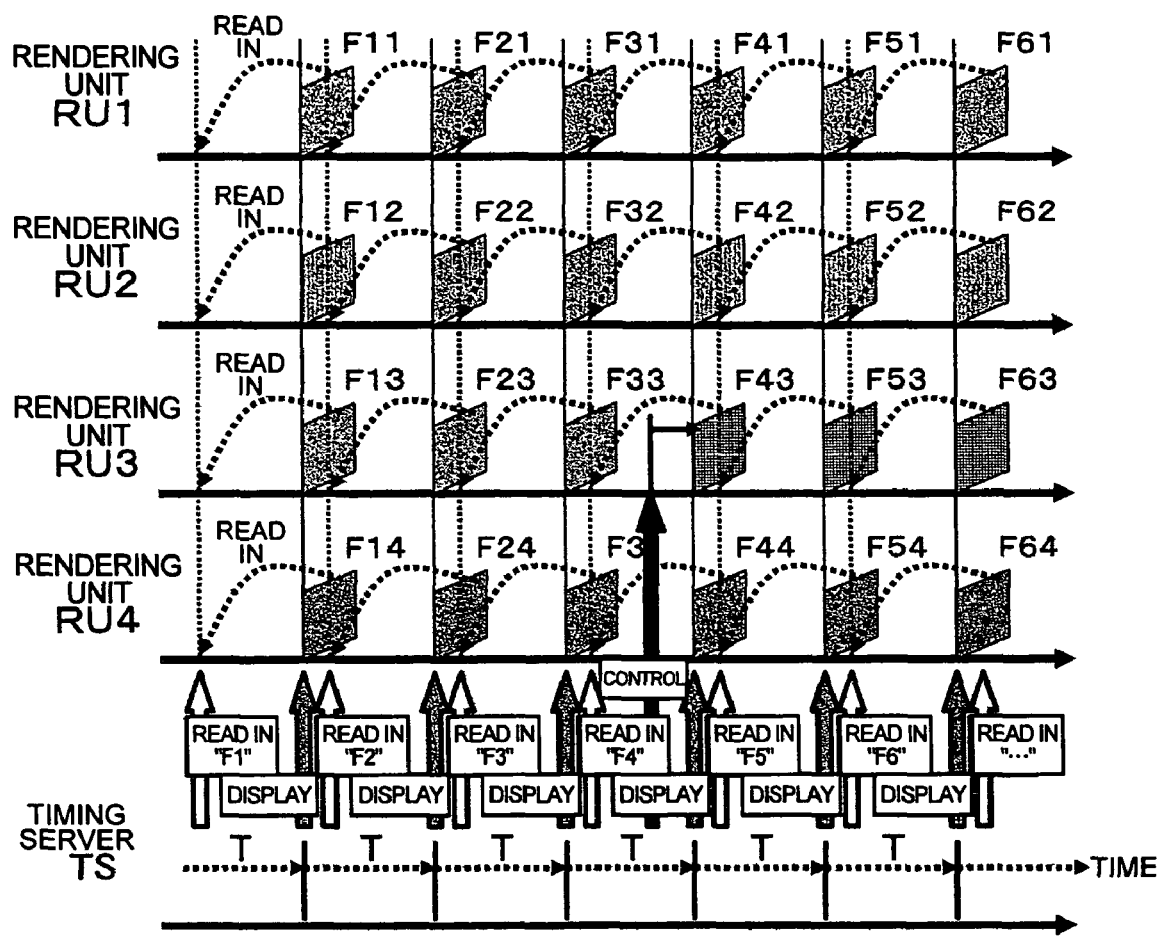
FIG. 9 is a schematic showing, in FIG. 6, one example of the irregular playback control of the exemplary embodiment 1, and is the view showing the irregular playback control to a certain specific rendering unit.

FIG. 9 is an example of the operation when the playback control instruction packet is given only to a certain specific rendering unit (the rendering unit RU3 in this FIG. 9). In this case, the irregular playback control packet is distributed to a specific rendering unit by utilizing unicast communication.

Also in the example of this FIG. 9, like the example of FIG. 8, because the irregular playback control packet is distributed to the rendering unit RU3 after the read-in instruction in frame F4, the video processing based on the contents of the distributed irregular playback control packet is carried out to the video data in the rendering unit RU3 in frame F4 and the subsequent Frame, and thereby, the playback to which this irregular playback control is reflected is carried out from the corresponding display device D3.

Thus, as the situation of distributing an irregular playback control packet only to a certain specific rendering unit, the case can be considered where the individual difference of the color display of this rendering unit to other rendering units needs to be corrected, for example. Moreover, like FIG. 7c, when carrying out PinP, and the like, it can be realized in the same way by distributing only to the corresponding rendering unit the read-in instruction packet which instructs read-in of the video data of other contents by unicast communication.

Incidentally, although as the irregular playback control, in FIG. 7, the change of the displayed video, color processing, PinP, and the like have been illustrated, a processing of resolution conversion can be also attained, other than these.

In addition, the color processing can be realized by applying a color conversion table, which is set in advance so as to carry out a certain color processing, to the frame information being developed to the frame buffer 124. Moreover, as the conversion to a high resolution side, techniques, such as "nearest neighbor", "bi-linear,", and "bi-cubic2" are known, and by applying these to the frame information being developed to the frame buffer 124, the resolution conversion can realize high resolution processing. Moreover, conversion to a low resolution side by mosaic processing and the like can be also realized. Techniques, such as these color processing and the resolution conversion, are the same regarding the exemplary embodiment 2 and the subsequent exemplary embodiments, as will be described later.

Moreover, in this exemplary embodiment 1, although the above example explained an example which realizes advanced video expression such as color processing, resolution conversion, contents change, and PinP, by the irregular playback control information generated by the irregular playback control information generation section 115, not only such advanced video expression but also variable speed playback which changes the playback speed (high-speed playback and slow playback), frame forwarding playback, reverse playback, and the like can be also attained.

In order to realize the variable speed playback, the irregular playback control information for changing the display instruction timing is generated in the irregular playback control information generation section 115, and by giving this irregular playback control information to the timing information generation section 111, display timing of a shorter cycle than the display cycle T at the time of the regular playback or of a longer cycle than the display cycle T at the time of the regular playback is generated in the timing information generation section 111, and distributed to each of the rendering units RU1 through RU4 as the display instruction packet.

Thereby, in each rendering unit, because the video data is outputted to the corresponding display devices D1 through D4 in a shorter cycle or in a longer cycle than at the time of the regular playback, a high-speed playback or a slow playback can be attained.

Moreover, in order to realize the frame forwarding playback, the irregular playback control information to instruct the frame forwarding playback is generated in the irregular playback control information generation section 115, and by giving this irregular playback control information to the read-in frame information generation section 112, for example, read-in frame information which makes discontinuous the frame number of the video data to be read-in is generated in the read-in frame information generation section 112, and is distributed to each of the rendering units RU1 through RU4 as the read-in instruction packet.

Thereby, because the video data corresponding to this discontinuous frame number is outputted to each of the corresponding display devices D1 through D4 in each of the rendering units RU1 through RU4, the frame forwarding playback can be attained.

Moreover, in order to realize the reverse playback, the irregular playback control information to instruct the reverse playback is generated in the irregular playback control information generation section 115, and by giving this irregular playback control information to the read-in frame information generation section 112, for example, the read-in frame information, which sets the frame number of the video data to be read-in to the counter-playback order (for example, set the frame number in a descending order if the frame number at the time of the regular playback is in an ascending order), is generated in the read-in frame information generation section 112, and is distributed to each of the rendering units RU1 through RU4 as the read-in instruction packet.

Thereby, because the frame of counter-playback order is outputted to the corresponding display devices D1 through D4 in each of the rendering units RU1 through RU4, the reverse playback is attained.

Moreover, it is also possible to combine the irregular playback controls for carrying out these variable speed playbacks, frame forwarding playback, and reverse playback, with the irregular playback control for realizing various kinds of video expression described in the above exemplary embodiment 1.

In addition, in the above described exemplary embodiment 1, the multi-screen video playback which outputs the video data synchronized with each of the plurality of display devices that constitute the multi-screen display, in the case where the video data to be displayed is stored in the video data storage devices S1 through S4 provided in each rendering unit inside each of the rendering units RU1 through RU4, has been described, however, with respect to the multi-screen video playback method in this exemplary embodiment 1, various exemplary modifications and changes can be made.

For example, although in the above description, the timing server TS distributes the read-in instruction packet and the display instruction packet at different timings, it is also possible to distribute the read-in instruction packet and the display instruction packet simultaneously.

This means that, in the timing server TS, the display instruction packet concerning a certain predetermined frame, and the read-in instruction packet concerning the next frame of this predetermined frame are distributed altogether as one packet to each of the rendering units RU1 through RU4, and also by this, each of the rendering units RU1 through RU4 outputs the video data being developed to the frame buffer 124 concerning the predetermined frame, to each of the display devices D1 through D4, and at the same time can read-in the video data concerning the next frame of the predetermined frame from the video data storage devices S1 through S4, and develop to the frame buffer 124. Consequently, by repeating this operation, each of the rendering units RU1 through RU4 can output the synchronized video data to each of the display devices D1 through D4, like the above example.

Moreover, the timing server TS in the multi-screen video playback system in this exemplary embodiment 1 further includes a playback-start information generation section which generates the information of starting the video playback (hereinafter, referred to as "playback-start information"), while the transmission section 113 in the timing server TS also has a function which distributes this playback-start information to the plurality of rendering units RU1 through RU4 by simultaneous transmission, and moreover, the receiving section in the rendering units RU1 through RU4 also has a function to receive the playback-start information distributed by the transmission section 113, while the rendering units RU1 through RU4 may have a video data acquisition section which starts, based on the playback-start information received in this receiving section 121, the read-in/development operation which reads in the video data from the video data storage devices S1 through S4 and develops to the frame buffer 124.

Also in the multi-screen video playback system of such configuration, the irregular playback control described in this exemplary embodiment 1 can be also applied.

Moreover, in the above-described multi-screen video playback system, the rendering units RU1 through RU4 further have a second timing information generation section which generates a second timing information synchronizing with the timing information, and this rendering units RU1 through RU4, after carrying out the read-in/development operation which reads in the video data from the video data storage devices S1 through S4 and develops to the frame buffer 124, based on the above-described playback-start information, may carry out operation which reads the video data from the video data storage devices S1 through S4 and develops to the frame buffer, based on the second timing information.

Also in the multi-screen video playback system having the rendering unit of such a configuration, the irregular playback control described in this exemplary embodiment 1 can be also applied.

Moreover, the multi-screen video playback system described so far includes four video data storage devices S1 through S4 corresponding to each of the rendering units RU1 through RU4, while these four video data storage devices S1 through S4 and each of the rendering units RU1 through RU4 are connected with a separate dedicated line, respectively. However, not limited to this, the number of the video data storage device may be set to be one, and this one video data storage device and each of the rendering units RU1 through RU4 may be connected with a common dedicated line. Even in the multi-screen video playback system having the rendering unit of such a configuration, the irregular control described in this exemplary embodiment 1 can be also applied.

Moreover, in the case where the number of such video data storage device is set to be one, the configuration of the connection to the rendering units RU1 through RU4 is not the one connected by a common dedicated line, but may be the one connected to the LAN 101 and connected to each of the rendering units (RU1 through RU4) through this LAN 101. Also in the multi-screen video playback system having the rendering units of such a configuration, the irregular playback control described in this exemplary embodiment 1 can be also applied.

Furthermore, the video data storage devices S1 through S4 may be connected, in common, to a plurality of rendering units belonging to a predetermined group of the plurality of rendering units RU1 through RU4. By constituting this way, it is possible to connect arbitrary m sets of video data storage devices to n sets of rendering units, and the freedom at the time of constituting a multi-screen display can be increased.

Exemplary Embodiment 2

Although the above exemplary embodiment 1 is the case where the video data to be displayed is stored in the video data storage devices S1 through S4 provided in each of the rendering units RU1 through RU4 side, in this exemplary embodiment 2, a configuration in which the video data is distributed to each of the rendering units RU1 through RU4 through the network (LAN 101) will be described.

Figure 10:
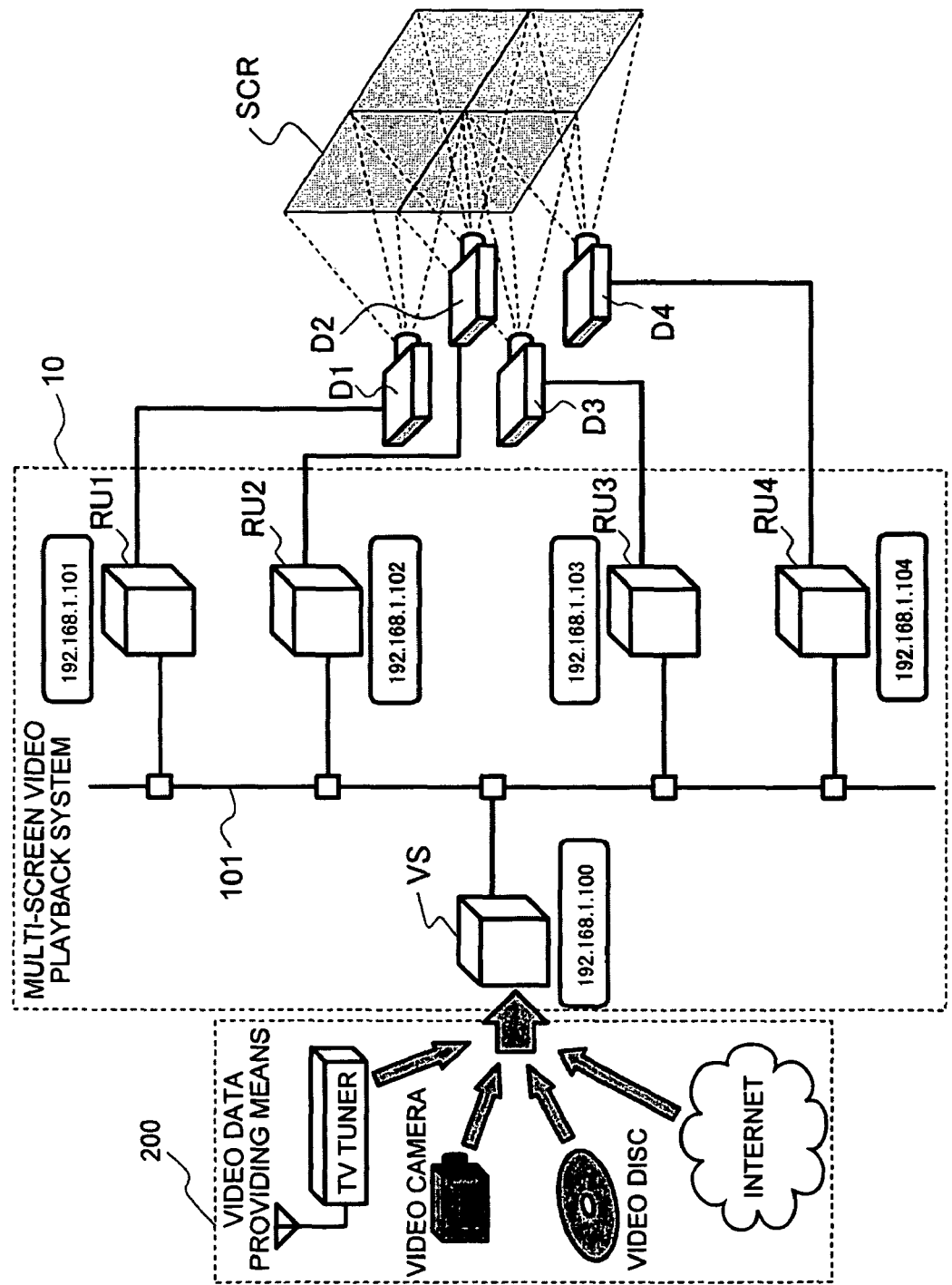
FIG. 10 is a schematic showing the configuration of a multi-screen video playback system regarding an exemplary embodiment 2.
Figure 11:
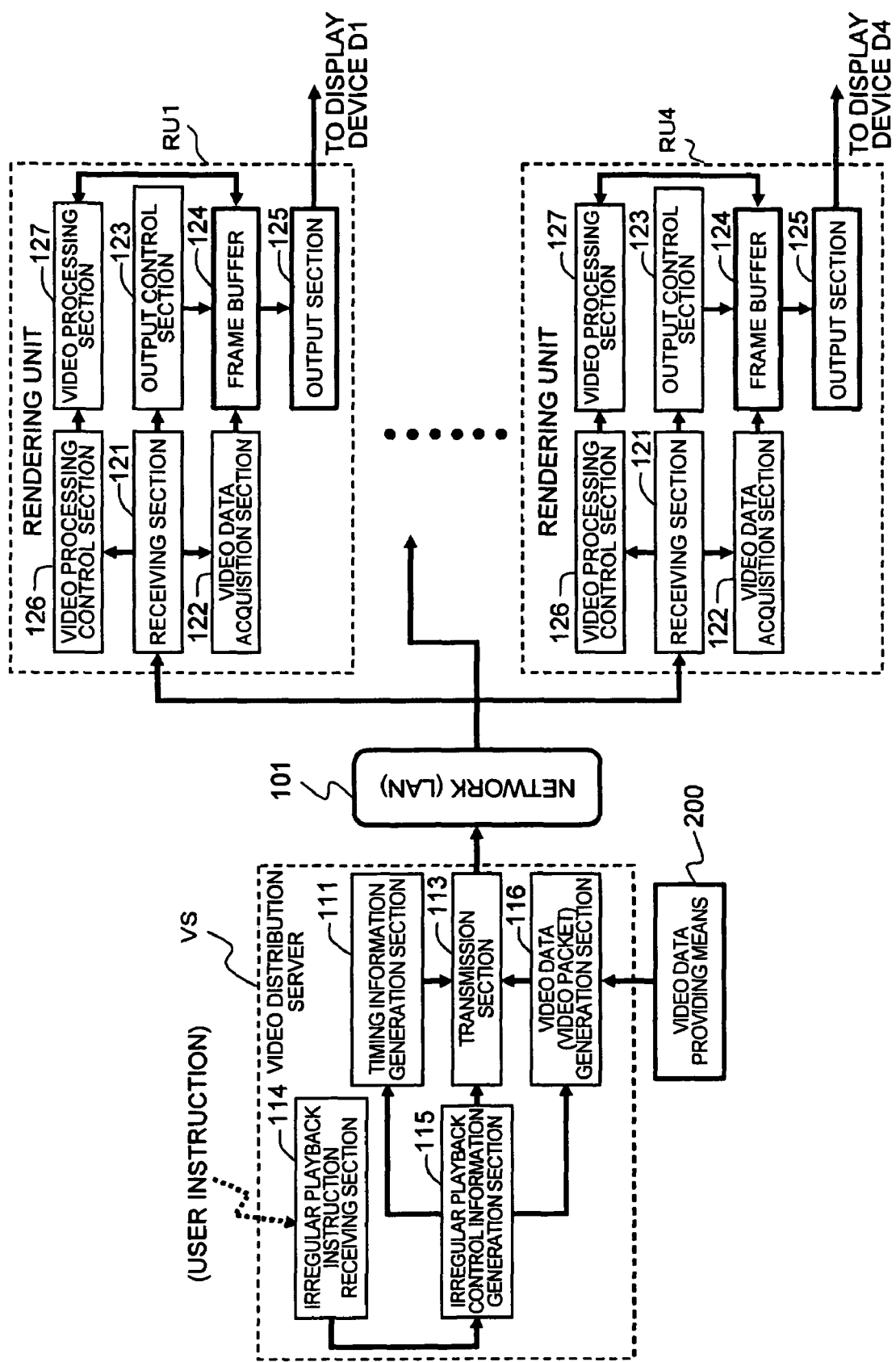
FIG. 11 is a schematic showing the configuration of a video distribution server and a rendering unit of the multi-screen video playback system concerning the exemplary embodiment 2.

FIGS. 10 and 11 are schematics showing the configurations of the multi-screen video playback system according to the exemplary embodiment 2 of the present invention. Also, in the multi-screen video playback system 10 according to this exemplary embodiment 2, the multi-screen display is composed of, like the exemplary embodiment 1 four sets of display devices D1 through D4 arranged in a matrix form of two lines by 2 rows (2×2), and one large screen video is reproduced by combining a unit video (partial video) which each of these display devices D1 through D4 projects on the screen SCR.

The multi-screen video playback system 10 according to this exemplary embodiment 2 includes, as shown in FIG. 10 and FIG. 11, the LAN 101 as the network, the video distribution server VS connected to this LAN 101 by a network interface (not shown), a plurality of (four sets, also in this exemplary embodiment 2) rendering units RU1 through RU4 connected to the LAN 101 through the network interface (not shown). In addition, these video distribution server VS and rendering units RU1 through RU4 can be prepared as a dedicated device but also can be substituted by a personal computer (PC) having the network interface.

Moreover, the video distribution server VS used in this multi-screen video playback system 10 has a function which packetizes the video data supplied from a video data providing device 200, such as a television tuner (TV-Tuner), a Video Camera, a Video Disc, and the Internet, and distributes by simultaneous transmission, such as broadcast communication, to all the rendering units RU1 through RU4. In addition, as the simultaneous transmission, multicast communication, not the broadcast communication, can be also employed, however, the broadcast communication is used here.

Moreover, this video distribution server VS includes in this exemplary embodiment 2: the timing information generation section 111 which generates a display instruction packet as a synchronized signal to each rendering unit; the irregular playback instruction receiving section 114 which receives an irregular playback instruction given by a user; the irregular playback control information generation section 115 which generates irregular playback control information based on the irregular playback instructions from the user, which is received by this irregular playback instruction receiving section 114; the video data generation section (also referred to as the video packet generation section) 116 which generates a video packet which contains the video data to be distributed; the transmission section 113 which can distribute the display instruction packet generated in the timing information generation section 111 and the video packet generated in the video packet generation section 116, and the like, onto the LAN 101.

This irregular playback control information generation section 115 enables controlling the processing contents of the timing information generation section 111 or the video packet generation section 116 according to the contents of the irregular playback control information generated here, and furthermore, depending on the contents of the irregular playback control information, generates an irregular playback control packet which contains the irregular playback control information, and give this irregular playback control packet directly to each of the rendering units RU1 through RU4 (there may be a case of only a certain specific rendering unit) from the transmission section 113. In addition, an example regarding the irregular playback will be described hereinafter.

Moreover, assume that, an IP address of "192.168.1.100" is assigned to this video distribution server VS on the LAN 101, and the IP address as shown in FIG. 1 described in the above exemplary embodiment 1, is assigned also to each of the rendering units RU1 through RU4, respectively.

This video distribution server VS is connected to each of the rendering units RU1 through RU4 through the LAN 101, and assume the network protocol at this time is TCP/IP. Moreover, the description will be made, assuming the version number of the IP is 4, or IPv4.

Moreover, assume the network topology of the LAN 101 used here, is a "closed" network like the exemplary embodiment 1, and a configuration of connection having no large difference in the number of hierarchy of the connection between the video distribution server VS and each of the rendering units RU1 through RU4 is preferable. This is because if there is a large difference in the number of hierarchy, it is highly likely that the deviation in the receiving time of the display instruction packet due to the simultaneous transmission (here, broadcast communication) becomes large between each of the rendering units RU1 through RU4.

Moreover, since this LAN 101 is assumed to be a small-scale and closed network, it is almost not necessary to take into consideration that the data which runs on the LAN 101 as a packet may be delayed or lost.

Moreover, each of the rendering units RU1 through RU4 includes: the receiving sections 121 which receives distributed information; the video data acquisition section 122 which obtains the video data contained in the video packet from the video distribution server VS, which is received in this receiving section 121, and analyzes the obtained video data; the output control section 123 which carries out the output-control based on the display instruction packet from the video distribution server VS, which is also received in the receiving section 121; the frame buffer 124 to which the video data obtained in the video data acquisition section 122 is developed; and the output section 125 which outputs the video data to be displayed, to a corresponding display device (any one of the display devices D1 through D4), respectively.

Moreover, each of the rendering units RU1 through RU4 includes: the video processing control section 126 which caries out the processing such as analyzing the contents of the irregular playback control packet received in the receiving section 121, and generating the corresponding video processing instructions; and the video processing section 127 which performs the video processing based on the processing of this video processing control section 126. Moreover, each output section 125 of each of the rendering units RU1 through RU4 is connected to each corresponding display device (any one of the display devices D1 through D4).

In addition, each frame buffer 124 of these rendering units RU1 through RU4 is a storage area to develop the video data contained in the video packet sent from the video distribution server VS, and this recording area is secured on RAM or on a video memory in a video card. Moreover, this frame buffer 124 carries out the same operation as the one described in FIG. 3.

Next, the operation of this exemplary embodiment 2 will be described.

First, the operation at the time of the regular playback will be described. Some video data to be displayed is inputted to the video distribution server VS from the video data providing device 200. Thereby, in the video distribution server VS, the video packet corresponding to the video to be reproduced by each rendering unit is generated by the video packet generation section 116, and this video packet is sent from the transmission section 113 to each of the rendering units RU1 through RU4 by unicast communication.

In addition, at this time, although it is, of course, possible to distribute the same video data from the video distribution server VS to all the rendering units RU1 through RU4 by simultaneous transmission using broadcast communication (multicast communication is also feasible). Here, an example of distributing individually the video data to be displayed in each of the rendering units RU1 through RU4 to each of the rendering units RU1 through RU4 by unicast communication will be described.

Namely, in the case where four display devices D1 through D4 of 2×2 constituting a multi-screen display device display a partial video, respectively, and thereby, make a tiling display as shown in FIG. 23 which constitutes one large screen combining these partial video, since each of the rendering units RU1 through RU4 outputs to each of the corresponding display devices D1 through D4 the partial video corresponding to the area, which each takes charge of, the partial video data in the area, which this rendering unit takes charge of, is separately distributed to each of the rendering units RU1 through RU4.

Figure 12:
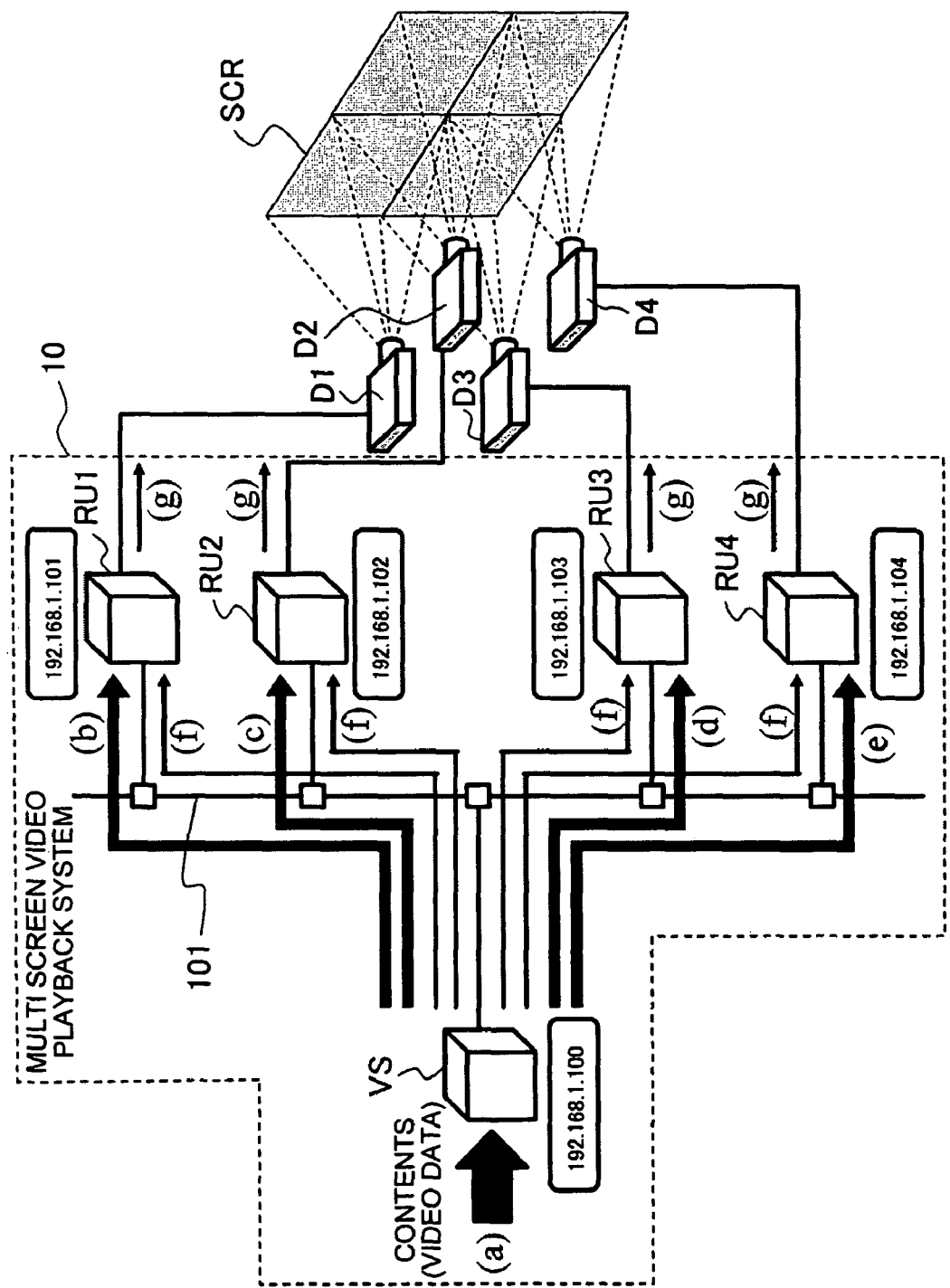
FIG. 12 is a schematic showing, in the configuration of FIG. 10, the whole processing flow of the multi-screen video playback system concerning the exemplary embodiment 2.

FIG. 12 is a schematic showing, in the configuration of FIG. 10, the processing flow at the video distribution server VS side of this exemplary embodiment 2. First, the read-out and analysis of the contents (video data) from the video data providing device 200 are carried out ((a) in FIG. 12), and the video packet corresponding to each of the rendering units RU1 through RU4 is generated based on the read-out and analyzed video data. Then, the video packet for each of the rendering units RU1 through RU4 is distributed to each of the corresponding rendering units RU1 through RU4 ((b) through (e) in FIG. 12).

Then, when the display instruction packet from the video distribution server is distributed to all the rendering units RU1 through RU4 by broadcasting (multicasting is also applicable) ((f) in FIG. 12), each of the rendering units RU1 through RU4 outputs the video data being developed to each frame buffer 124 ((g) in FIG. 12).

Figure 13:
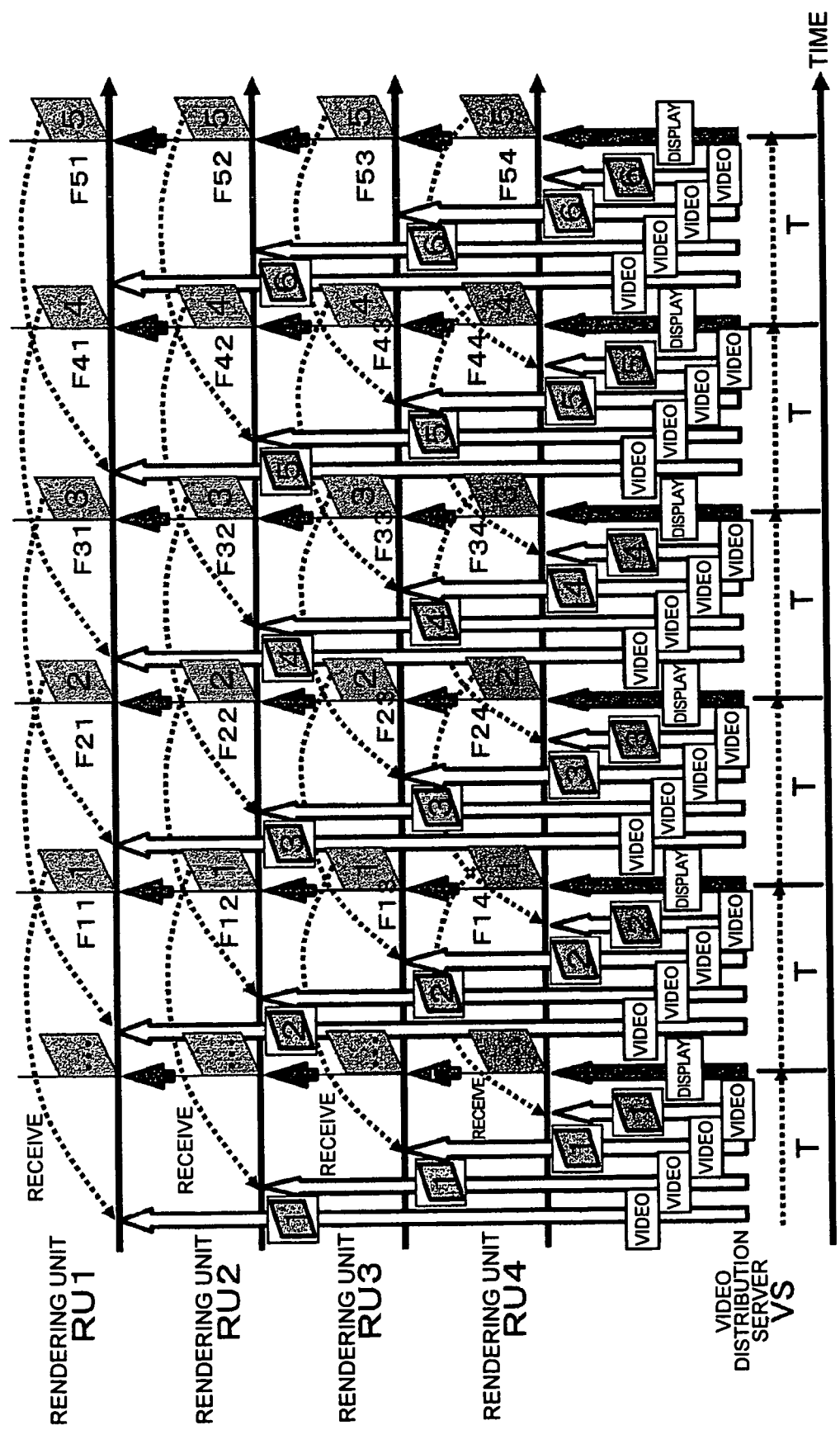
FIG. 13 is a schematic showing the distribution timing to the rendering unit, of a video packet and a display instruction packet from the video distribution server, and the operation of the rendering unit at the time of the regular playback of the multi-screen video playback system concerning the exemplary embodiment 2.

FIG. 13 is a schematic showing the distribution timing of the video packet and the display instruction packet to each of the rendering units RU1 through RU4 from the video distribution server VS, and the operation of each of the rendering units RU1 through RU4, where the distribution timing of the video packet is indicated with the outline arrow, and the distribution timing of the display instruction packet is indicated with the gray arrow.

In addition, in this FIG. 13, "video" described in the outline arrow portion is the abbreviation of "video packet", and this outline arrow indicates the distribution timing of the video packet. Moreover, "display" described in the gray arrow portion is the abbreviation of "display instruction packet", and this gray arrow indicates the distribution timing of the display instruction packet.

In this exemplary embodiment 2, as already explained, since the video packet in which the video data corresponding to its rendering unit is contained is distributed from the video distribution server VS to each of the rendering units RU1 through RU4, each different video data is packetized and distributed sequentially to each of the rendering units RU1 through RU4. Thereby, each of the rendering units RU1 through RU4 develops to the frame buffer 124 the video data contained in the video packet which has been distributed to the rendering unit itself.

Then, the video distribution server VS distributes the display instruction packet to each of the rendering units RU1 through RU4 at a predetermined timing by broadcast communication, and thereby, each of the rendering units RU1 through RU4 outputs to the corresponding display devices D1 through D4 the video data being developed to the frame buffer 124.

By repeating this operation, each of the rendering units RU1 through RU4 can output the synchronized video data to each of the display devices D1 through D4. In addition, from the video distribution server VS, the video of one frame amount is not always necessarily to be sent as one packet, however, in this FIG. 13, one frame is shown as being sent as one packet, for convenience.

The above is the regular playback operation in this exemplary embodiment 2, however, also in this exemplary embodiment 2, like the exemplary embodiment 1, as various irregular playback different from the regular playback, irregular playback which carries out video processing for realizing more advanced video expression (one example is shown in FIG. 7), for example, color processing, resolution conversion, contents change, PinP, and the like, can be attained. Hereinafter, the irregular playback control for realizing the advanced video expression in this exemplary embodiment 2 will be explained.

The irregular playback control information for realizing this advanced video expression is generated by the irregular playback control information generation section 115 based on the irregular playback instructions from a user. This irregular playback control information generation section 115 enables providing the irregular playback control information to either or both of the timing information generation section 111 and the video packet generation section 116 according to the contents thereof, and furthermore, depending on the contents of the irregular playback control information, enables generating the irregular playback control packet which contains the irregular playback control information, and outputting this irregular playback control packet from the transmission section 113 to the rendering units RU1 through RU4 (there may be a case of only a certain specific rendering unit).

For example, when carrying out the contents change and PinP, the irregular playback control information generation section 115 gives the irregular playback control information to the video packet generation section 116. Thereby, the actual video data itself to be distributed to the rendering units RU1 through RU4 can be changed. In addition, when changing the whole display video displayed with the four display devices D1 through D4 simultaneously, the processing which changes the video data to be distributed to all the rendering units RU1 through RU4 is carried out at certain timing. Moreover, in order to carry out PinP, only the video data to be distributed to a certain specific rendering unit is changed at a certain timing, and thus PinP can be realized.

On the other hand, when carrying out color processing, resolution conversion, and the like, the irregular playback control packet, in which the irregular playback control information to instruct these color processing and resolution conversion is contained, is distributed to each of the rendering units RU1 through RU4 by broadcast communication and the like. In addition, when distributing only to a certain specific rendering unit, the distribution is carried out by unicast communication and the like. Then, at the rendering units RU1 through RU4 sides which receive this irregular playback control packet, the video processing control section 126 analyzes the contents of the irregular playback control packet, and carries out the processing of the video processing instruction, and the like corresponding to this, and thereby the video processing section 127 carries out the color processing, the resolution conversion, and the like to the video data being developed to the frame buffer 124. Thereby, the video processing (color processing, resolution conversion, and the like) corresponding to the contents of the irregular playback control information contained in the irregular playback control packet can be attained.

Figure 14:
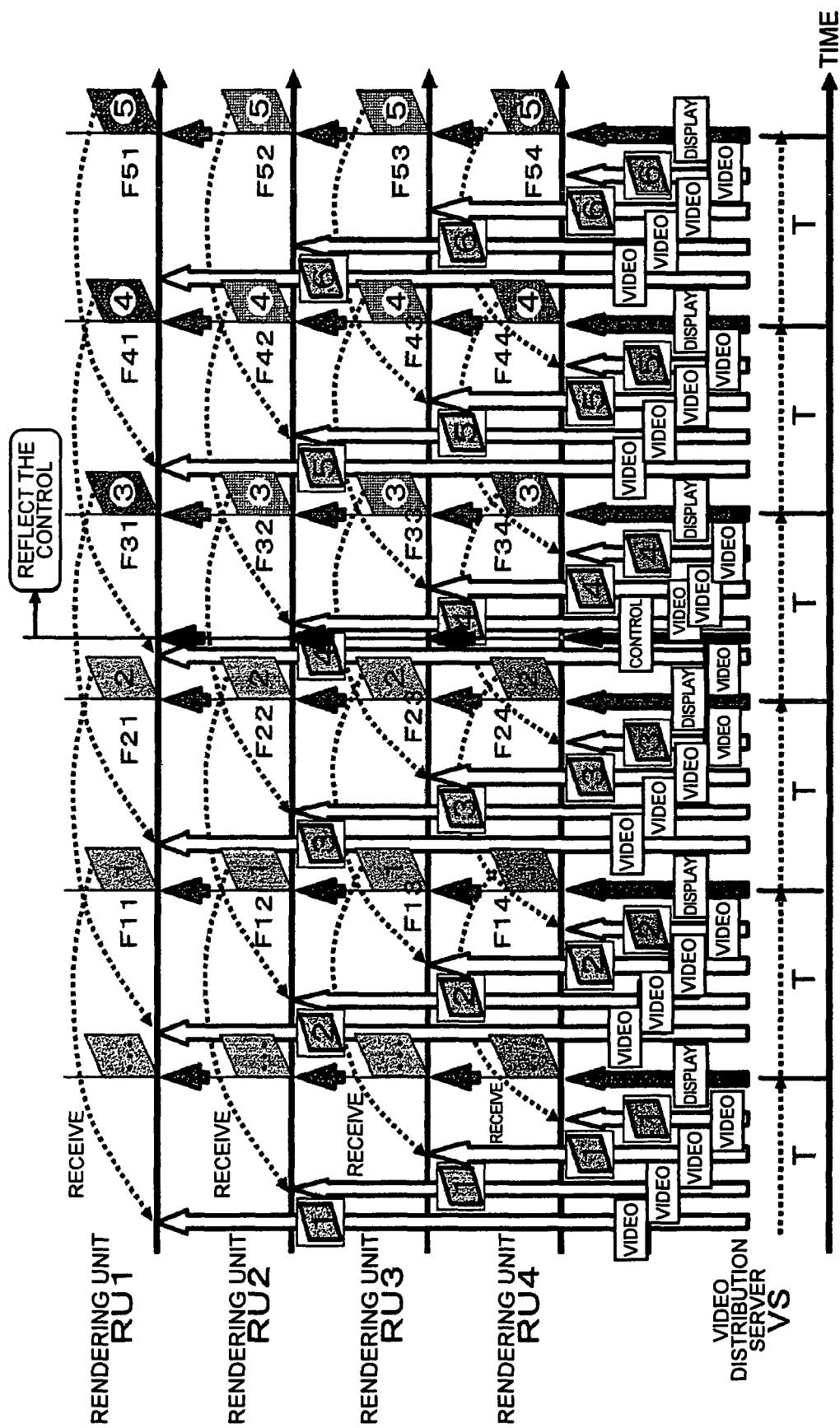
FIG. 14 is a schematic showing, in FIG. 13, one example of the irregular playback control of the exemplary embodiment 2, and is a view showing the irregular playback control to all rendering units.

Moreover, FIG. 14 is a schematic showing the distribution timing of the video packet, the display instruction packet, and the irregular playback control packet of the video distribution server VS, to each of the rendering units RU1 through RU4, when carrying out the video processing such as color processing, resolution conversion and the like, and an example of this FIG. 14 is the case where all the rendering units RU1 through RU4 are controlled simultaneously. This FIG. 14 corresponds to FIG. 13 which is already explained as the operation at the time of the regular playback.

In FIG. 14, the video packet and the display instruction packet are distributed to each of the rendering units RU1 through RU4 by broadcast communication at the same timing as that of FIG. 13, and thereby, the regular playback operation explained in FIG. 13 is carried out. However, suppose that the irregular playback control packet has been distributed to each of the rendering units RU1 through RU4 from the video distribution server VS by simultaneous transmission at a certain timing. The distribution timing of this irregular playback control packet is shown with the black arrow, and "control" described in this arrow portion is the abbreviation of "irregular playback control packet", and the this black arrow indicates the distribution timing of the irregular playback control packet.

In the example of this FIG. 14, since the irregular playback control packet is distributed after distributing the video packet of frame F3, the video processing section 127 in each of the rendering units RU1-RU4 carries out to the video data from frame F3 and the subsequent frame the video processing based on the contents (for example, irregular playback control information for carrying out color processing, resolution conversion, and the like) of the irregular playback control packet which has been distributed, and thereby the playback to which this irregular playback control is reflected is carried out from each of the display devices D1 through D4.

Figure 15:
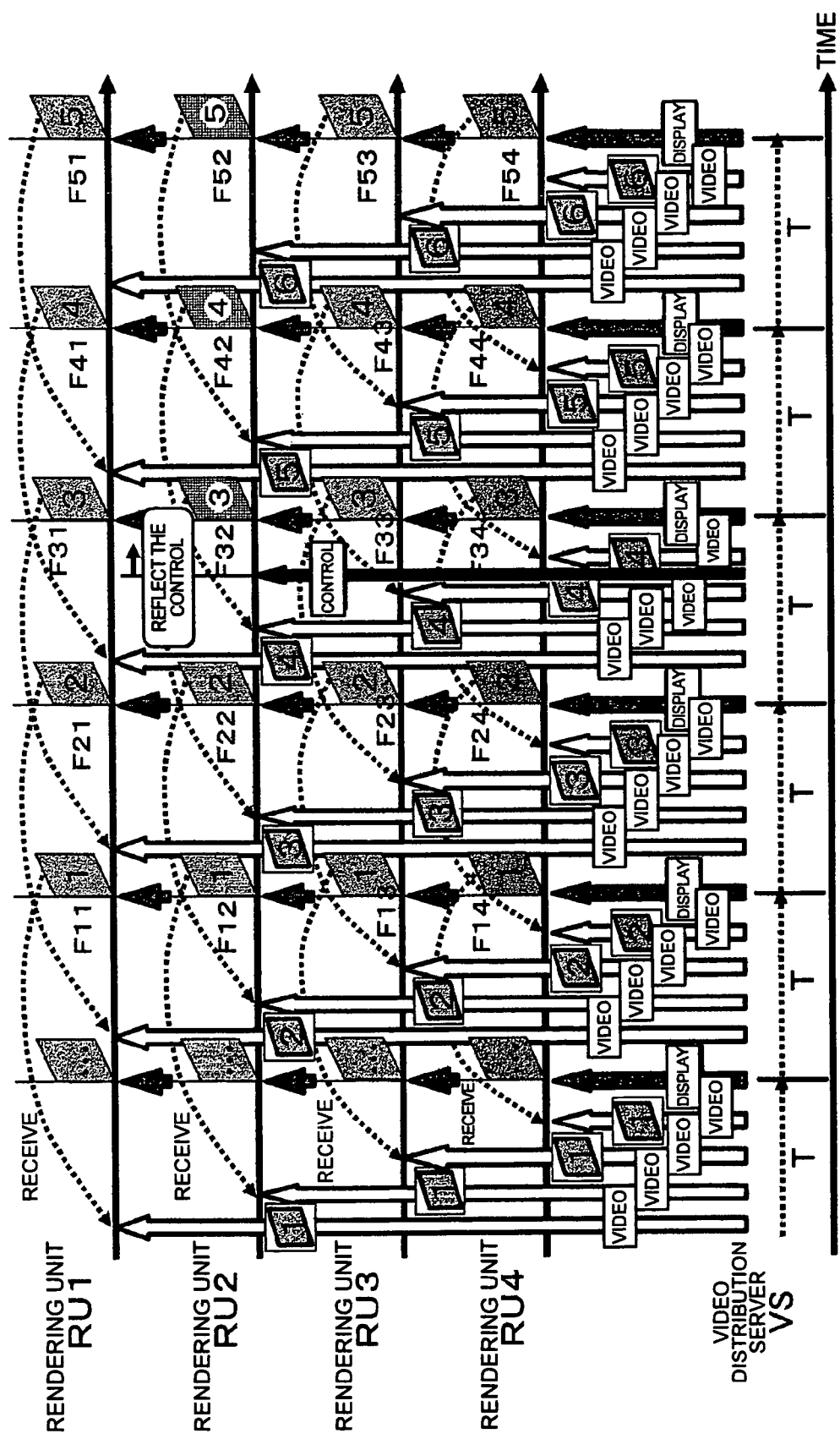
FIG. 15 is a schematic showing, in FIG. 13, one example of the irregular playback control of the exemplary embodiment 2, and is a view showing the irregular playback control to a certain specific rendering unit.

FIG. 15 is a schematic showing the operation when the playback control instruction packet is given only to a certain specific rendering unit (the rendering unit RU2 in this FIG. 15). In this case, the irregular playback control packet is distributed to a specific rendering unit using unicast communication.

Also in the example of this FIG. 15, like the example of FIG. 14, the irregular playback control packet is distributed after distributing the video packet in frame F3, however, in the example of this FIG. 15, the irregular playback control packet is distributed only to the rendering unit RU2. Thereby, in the rendering unit RU2, the video processing based on the contents of the distributed irregular playback control packet is carried out to the video data in the frame F3 and the subsequent Frame, and the playback to which this irregular playback control is reflected is carried out from the corresponding display device D2.

In addition, also in this exemplary embodiment 2, like the above exemplary embodiment 1, a variable speed playback to change the playback speed (a high-speed playback and a slow playback), a frame forwarding playback, a reverse playback, and the like can be also attained.

In addition, in this exemplary embodiment 2, in order to realize the variable speed playback, like the exemplary embodiment 1, in the irregular playback control information generation section 115, the irregular playback control information for changing the display instruction timing is generated, and by giving this irregular playback control information to the timing information generation section 111, the display timing of a shorter cycle than the display cycle T at the time of the regular playback or of a longer cycle than the display cycle T at the time of the regular playback is generated in the timing information generation section 111, and is distributed to each of the rendering units RU1 through RU4 as the display instruction packet.

Moreover, with respect to the frame forwarding playback and the counter-playback, the irregular playback control information for instructing the frame forwarding playback or the irregular playback control information for instructing counter-playback is generated in the irregular playback control information generation section 115, and by giving these irregular playback control information to the video packet generation section 116, the video packet generation section 116 generates, for example, the video data in which the frame number of the video data to be distributed becomes discontinuous, or the video data in which the frame number of the video data to be distributed becomes in counter-playback order, and distributes this to each of the rendering units RU1 through RU4 as the video packet. Thereby, the frame forwarding playback and the counter-playback can be attained.

Moreover, it is also possible to combine the irregular playback controls for carrying out these variable speed playback, frame forwarding playback, and reverse playback, with the irregular playback control for realizing various kinds of video expression described in the above exemplary embodiment 1.

Moreover, in this exemplary embodiment 2, although an example of distributing the video data to be displayed in each of the rendering units RU1 through RU4 separately to each of the rendering units RU1 through RU4 was explained, not limited to this, exemplary embodiments of the present invention can be applicable to the case where the same video data is distributed from the video distribution server VS to all the rendering units RU1 through RU4 by simultaneous transmission using broadcast communication (multicast communication can be also applied), not to mention.

Figure 16:
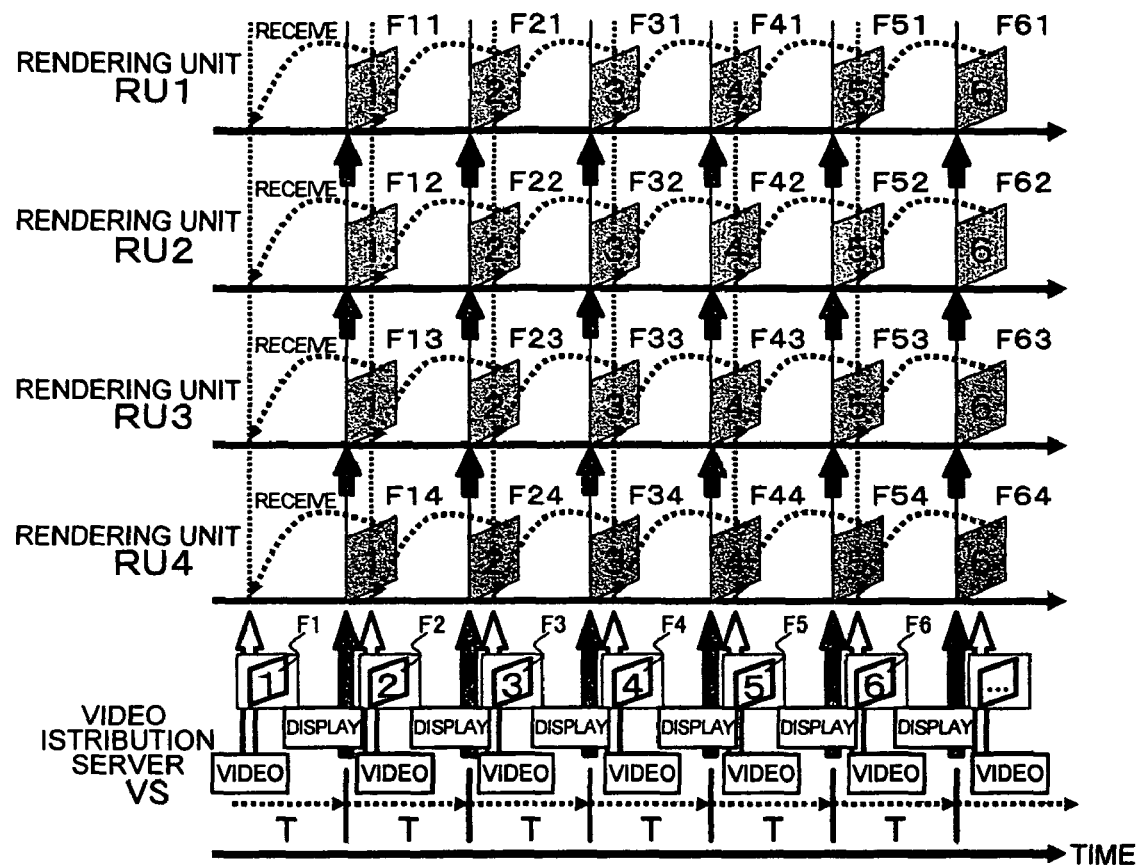
FIG. 16 is a schematic showing the distribution timing to the rendering unit, of a video packet and a display instruction packet from the video distribution server, and the operation of the rendering unit at the time of the regular playback of the multi-screen video playback system concerning the exemplary embodiment 2, and is a view explaining the operation in the case of distributing the same video data to each rendering unit by simultaneous transmission.

FIG. 16 is a schematic showing the distribution timing of the video packet as well as the display instruction packet to each of the rendering units RU1 through RU4 from the video distribution server VS, and the operation of each of the rendering units RU1 through RU4, when distributing the same video data from the video distribution server VS to all the rendering units RU1 through RU4 by simultaneous transmission, such as broadcast communication, and in this case, the same video data is distributed from the video distribution server VS to all the rendering units RU1 through RU4 by simultaneous transmission, such as broadcast communication.

In addition, the operation at the rendering units RU1 through RU4 side is the same as the above-described. In the multi-screen video playback system carrying out such operation, the irregular playback control of the contents change, PinP, the color processing, the resolution conversion, and the like explained also in this exemplary embodiment 2, can be attained.

Exemplary Embodiment 3

Figure 17:
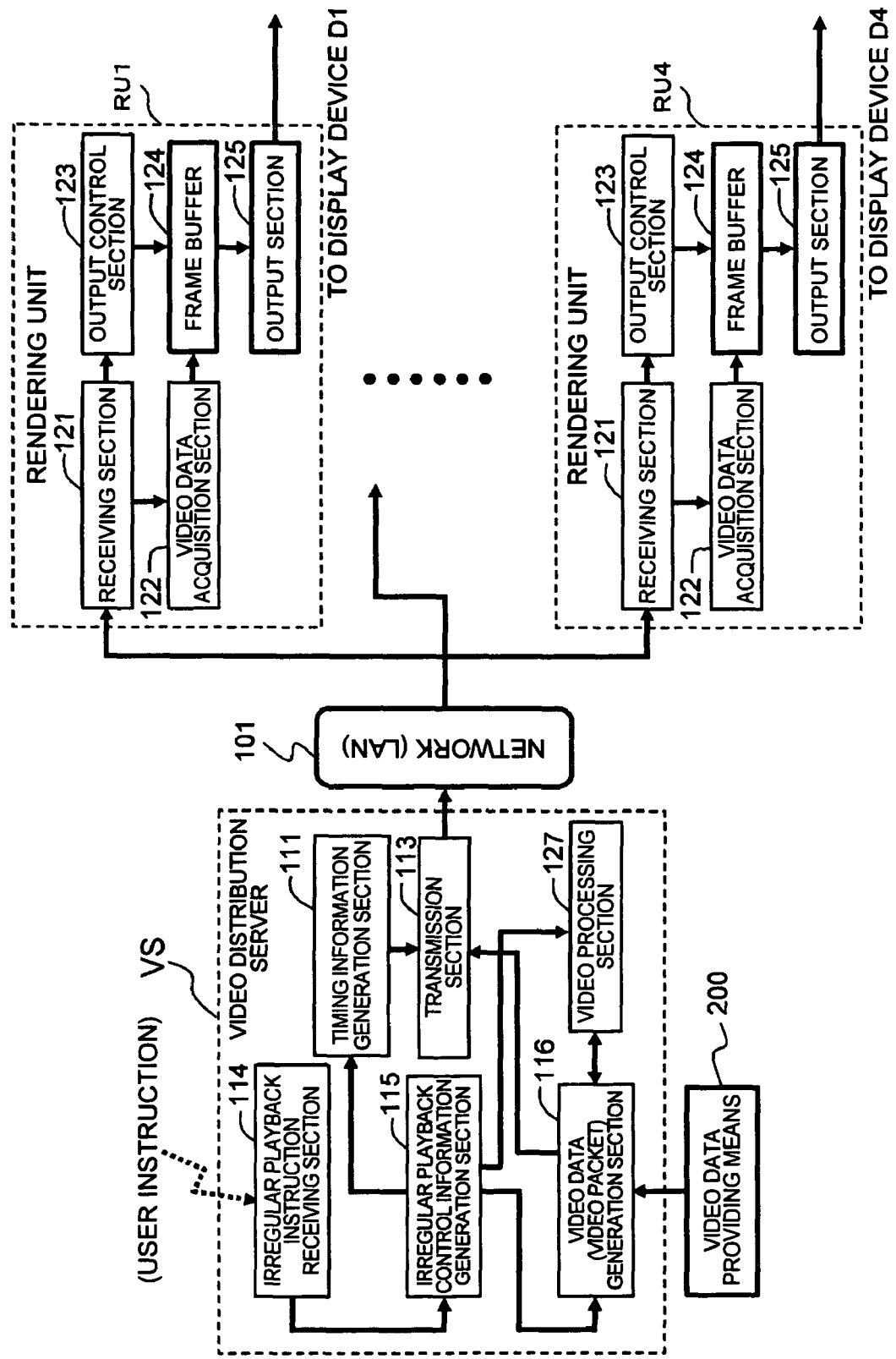
FIG. 17 is a schematic showing the configuration of the video distribution server and the rendering unit of the multi-screen video playback system regarding an exemplary embodiment 3.

This exemplary embodiment 3 is an exemplary modification of the above exemplary embodiment 2, and differs from the exemplary embodiment 2, in a point that the video processing function to carry out the color processing, the resolution conversion, and the like, is given to the video distribution server side. In order to realize this, as shown in FIG. 17, in this exemplary embodiment 3, a video processing section 127 is provided at the video distribution server VS side.

Accordingly, in this exemplary embodiment 3, the configuration of the rendering units RU1-RU4 includes the receiving section 121, the video data acquisition section 122, the output control section 123, the frame buffer 124, and the output section 125.

In addition, the example of the whole system configuration of this exemplary embodiment 3 is the same as that of FIG. 10, and one example of the whole processing flow thereof is the same as that of FIG. 12, and the distribution timing of the video packet as well as the display instruction packet at the time of the regular playback and the operation of each of the rendering units RU1 through RU4 based on these video packet and display instruction packet are the same as FIG. 13.

Also in this exemplary embodiment 3, like the exemplary embodiment 2, when carrying out the contents change and PinP, the irregular playback control information generated in the irregular playback control information generation section 115, which instructs the contents change, is given to the video packet generation section 116 to change the actual video data itself to be distributed. In addition, when simultaneously changing the whole display video which is displayed with four display devices D1 through D4, the processing which changes the video data to be distributed to all the rendering units RU1 through RU4 at certain timing is carried out. Moreover, in order to carry out PinP, only the video data to be distributed to a certain specific rendering unit is changed at certain timing, and thus PinP can be realized.

Moreover, the color processing, the resolution conversion, and the like, are carried out by that the irregular playback control information to instruct the color processing, the resolution conversion, and the like generated in the irregular playback control information generation section 115, is given to the video processing section 127, and the video processing section 127 carries out the video processing using a predetermined video processing technique to the video data to be distributed. In addition, these color processing and resolution conversion can be carried out not only to all the video data to be distributed to each of the rendering units RU1 through RU4, but are also carried out to only the video data to be distributed to a certain specific rendering unit.

The difference between this exemplary embodiment 3 and the above exemplary embodiment 2 is whether the video processing function for carrying out the irregular playback control exists at the rendering units RU1 through RU4 side (exemplary embodiment 2) or at the video distribution server VS side (exemplary embodiment 3). An advantage in the case where the video processing function exists at the rendering units RU1 through RU4 side is that since the video processing is carried out at each of the rendering units RU1 through RU4 side, the loading at the video distribution server VS side can be reduced. On the contrary, an advantage in the case where the video processing function exists at the video distribution server VS side is that since a batch video-processing is carried out at the video distribution server VS side, the loading at the rendering units RU1 through RU4 side can be reduced. This can be determined by judging which is advantageous in constituting the system. Moreover, the video processing function can be given to both the video distribution server VS and each of the rendering units RU1 through RU4.

In addition, also in this exemplary embodiment 3, like the exemplary embodiment 2, the variable speed playback, the frame forwarding playback, and the counter-playback can be attained, and moreover, it is also possible to combine the irregular playback control for carrying out these variable speed playback, frame forwarding playback, and counter-playback, with the irregular playback control for realizing various kinds of video expression described in this exemplary embodiment 3.

Moreover, also in this exemplary embodiment 3, like the exemplary embodiment 2, even in the configuration of distributing the video data as shown in FIG. 14, namely when distributing the same video data from the video distribution server VS to all the rendering units RU1 through RU4 by simultaneous transmission, such as broadcast communication, the irregular playback control such as the contents change, PinP, color processing, resolution conversion, and the like described in this exemplary embodiment 3 can be attained.

Exemplary Embodiment 4

Although in the examples of the above-described exemplary embodiment 2 and exemplary embodiment 3, the case where the video distribution server VS has the function as the timing server TS has been described, it is also possible to separate the video distribution server VS and the timing server TS to make a separate component, respectively.

Figure 18:
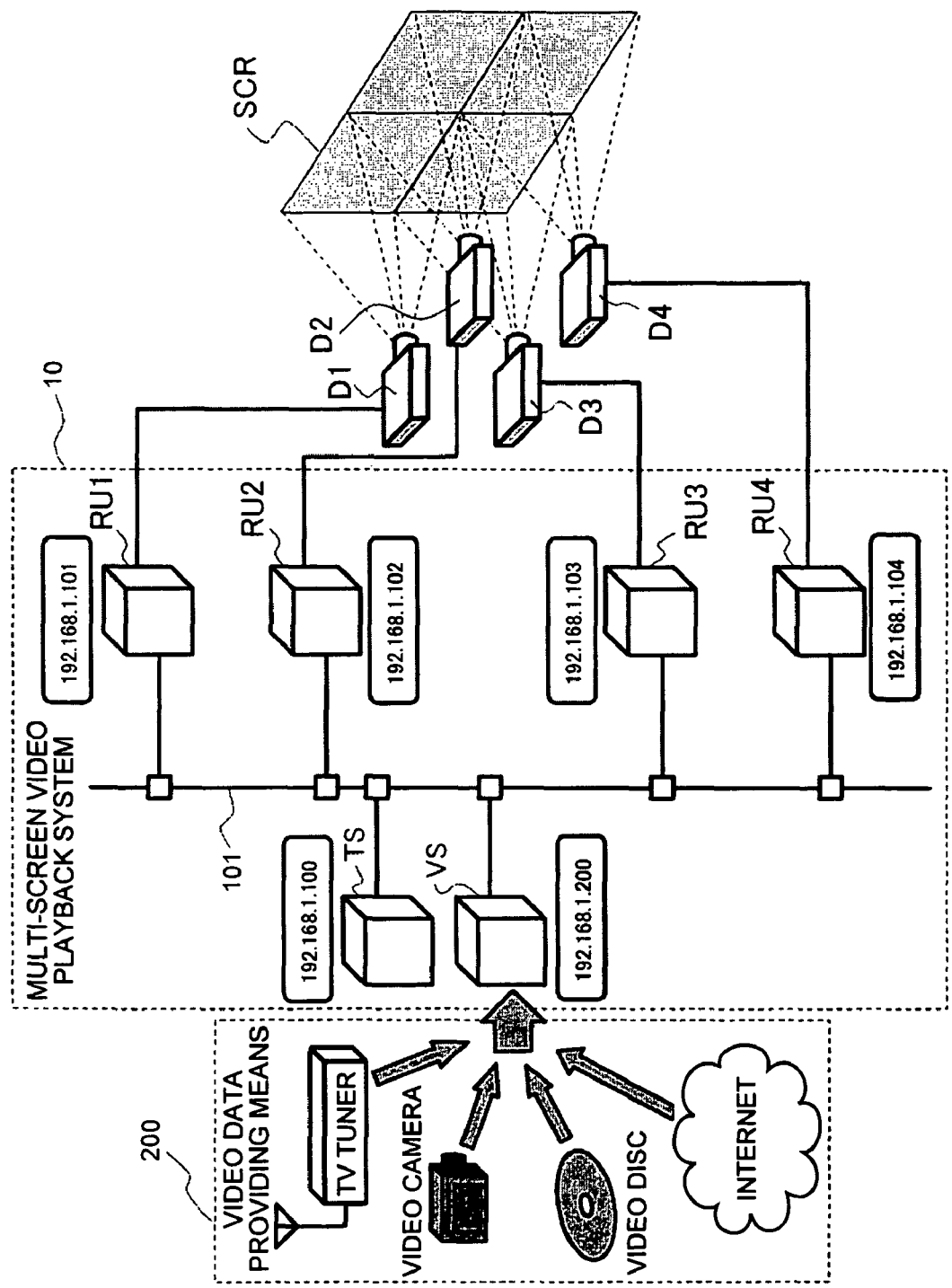
FIG. 18 is a schematic showing the configuration of a multi-screen video playback system according to an exemplary embodiment 4.

FIG. 18 is a schematic showing the configuration of a multi-screen video playback system 10 according to an exemplary embodiment 4. The configuration of this FIG. 18 differs from the configuration shown in FIG. 10 in a point that the configuration is made, in which the timing server TS is provided separately from the video distribution server VS, and since the others are the same as FIG. 10, the same numeral is given to the same component. In addition, like the video distribution server VS and the rendering units RU1-RU4, the timing server TS has the network interface (not shown), and is connected to the network (LAN 101) by this network interface.

Figure 19:
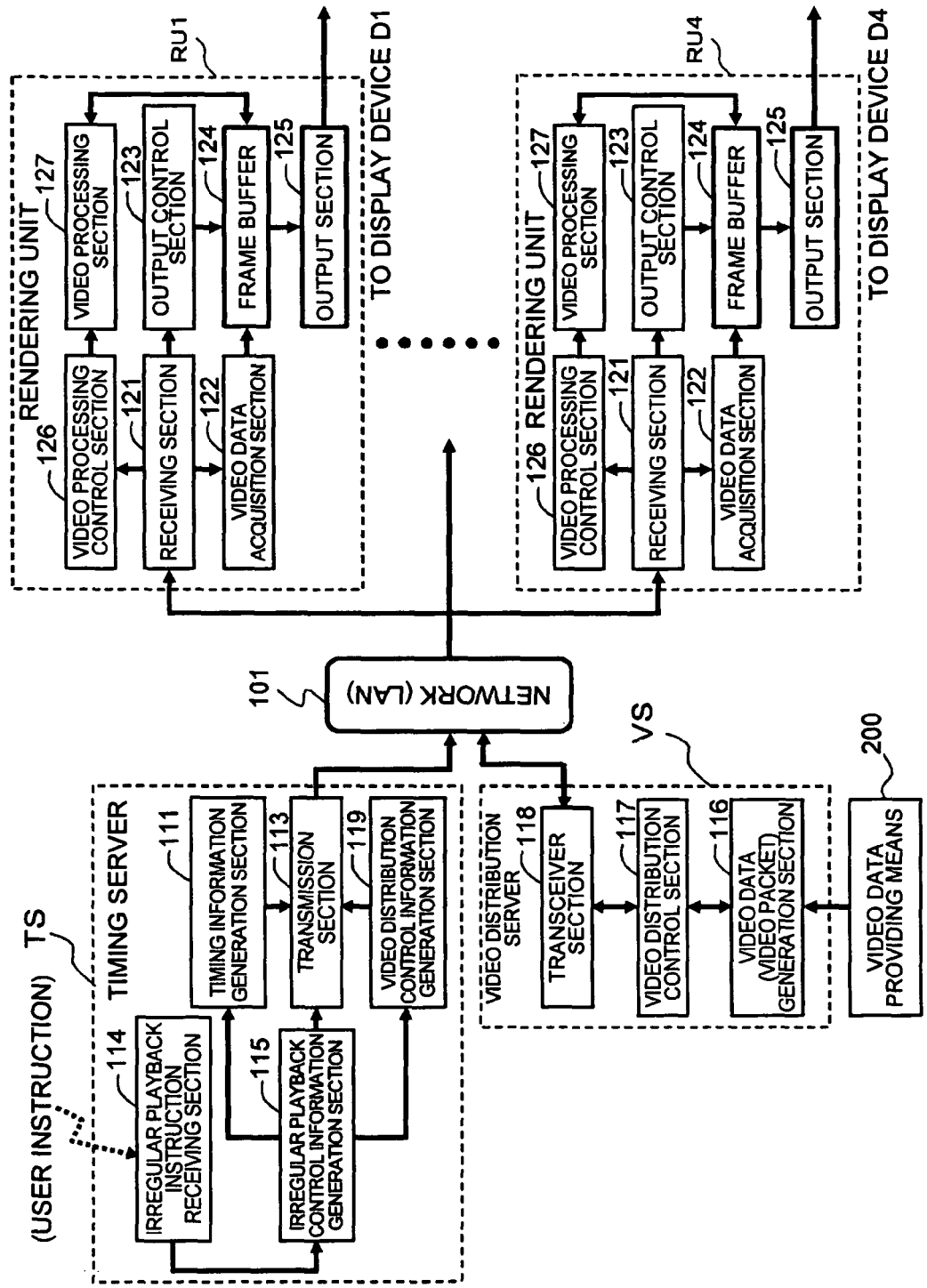
FIG. 19 is a schematic showing the configuration of the video distribution server and the rendering unit of the multi-screen video playback system concerning the exemplary embodiment 4.

FIG. 19 is a schematic showing the configuration of the video distribution server VS and the timing server TS in FIG. 18. In addition, the configuration of the rendering units RU1 through RU4 is the same as FIG. 11.

As apparent from these FIG. 18 and FIG. 19, in this exemplary embodiment 4, the timing server TS is provided separately from the video distribution server VS.

This timing server TS includes: the timing information generation section 111 which generates the display instruction timing information; a video distribution control information generation section 119 which generates the video distribution control information when the video distribution server VS carries out the video distribution to the rendering units RU1 through RU4; the transmission section 113 which distributes this video distribution control information to the video distribution server VS, and at also, can distribute the display instruction timing information and the like to each of the rendering units RU1 through RU4 by broadcast; the irregular playback instruction receiving section 114 which receives the irregular playback instructions given by a user; and the irregular playback control information generation section 115 which generates the irregular playback control information based on the irregular playback instruction from the user, which is received by this irregular playback instruction receiving section 114.

This irregular playback control information generation section 115 enables providing to either or both of the timing information generation section 111 and the video distribution control information generation section 119 according to the contents of the irregular playback control information generated here, and furthermore, generates an irregular playback control packet which contains the irregular playback control information, depending on the contents of the irregular playback control information, and gives this irregular playback control packet directly to each of the rendering units RU1 through RU4 (there may be a case of only a certain specific rendering unit) from the transmission section 113.

On the other hand, the video distribution server VS includes: a video data (video packet) generation section 116; a video distribution control section 117 which carries out the video distribution control to the rendering units RU1 through RU4 based on the video distribution control information generated in the video distribution control information generation section 119 in the timing server TS; a transceiver section 118 having a function as the transmission section which sends out the video packet onto the network (LAN 101) and a function as the receiving section which receives the video distribution control information generated in the timing server TS.

The operation of this exemplary embodiment 4 having such video distribution server VS and the timing server TS will be described briefly.

Figure 20:
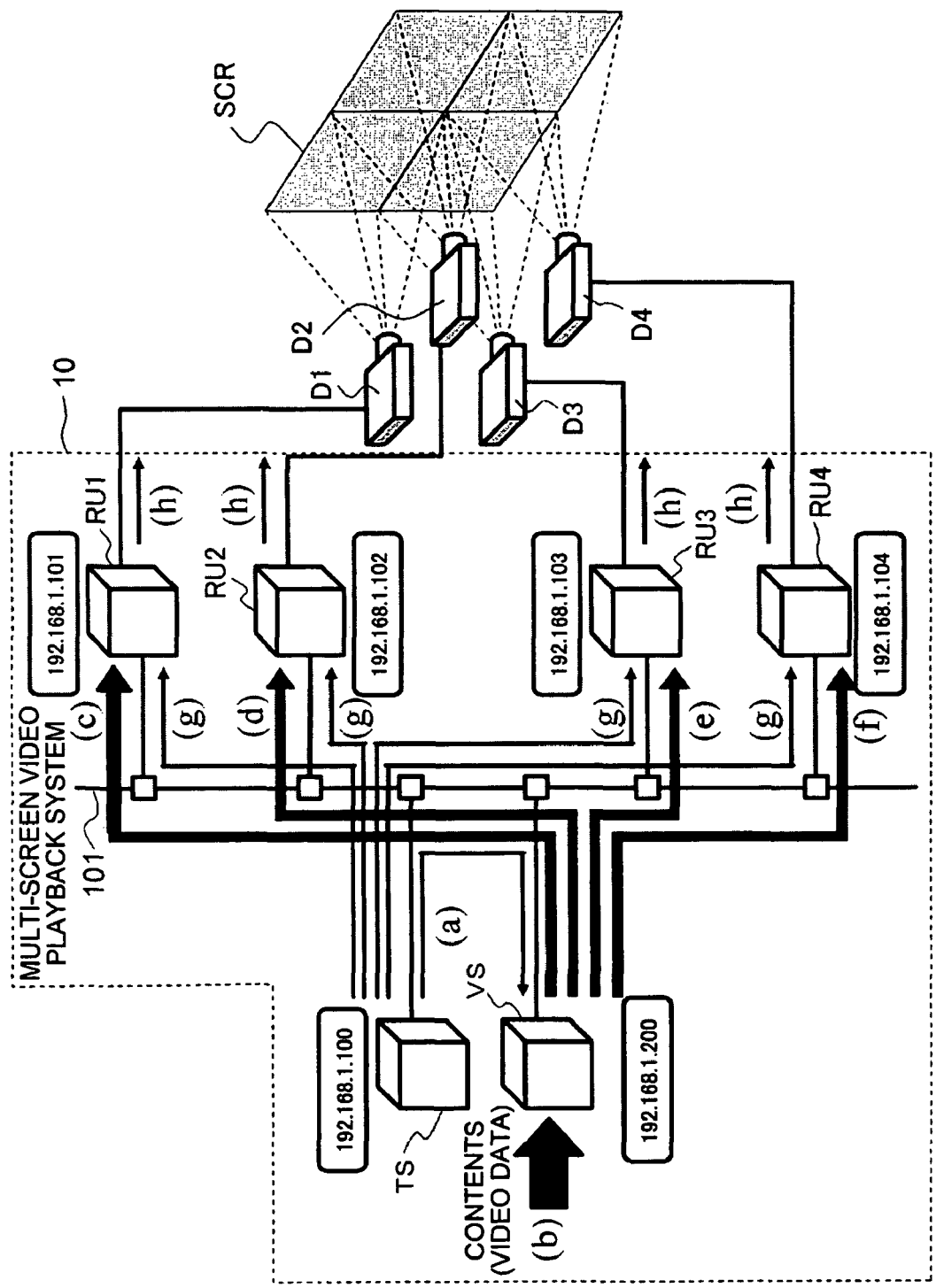
FIG. 20 is a schematic showing, in the configuration of FIG. 18, the whole processing flow of the multi-screen video playback system concerning the exemplary embodiment 4.

FIG. 20 explains, in the configuration of FIG. 18, the processing flow of the video distribution server VS and the timing server TS in this exemplary embodiment 4 at the time of the regular playback.

First, the timing server TS distributes the video distribution control information to the video distribution server VS ((a) in FIG. 20) as a video distribution control packet. Thereby, the video distribution server VS carries out the read-out and analysis of the contents (video data) ((b) in FIG. 20), and based on this read-out and analyzed video data, the video data corresponding to each of the rendering units RU1 through RU4 is generated, and the generated video data for each of the rendering units RU1 through RU4 is packetized, and this packetized video data (a video packet) is distributed to each of the rendering units RU1 through RU4 by unicast communication ((c) through (f) in FIG. 20).

On the other hand, at the timing server TS side, after transmitting the video distribution control information, the display instruction packet following the display instruction timing is distributed by simultaneous transmission at a predetermined timing ((g) in FIG. 20).

When this display instruction packet is distributed to all the rendering units RU1 through RU4, each of the rendering units RU1 through RU4 will output the video data being developed to each frame buffer 124 ((h) in FIG. 20). The above processing is carried out repeatedly.

In this way, in the exemplary embodiment 4, the timing server TS is provided, and this timing server TS distributes the video distribution control packet for carrying out the video distribution control to the video distribution server VS, and at the same time, distributes to each of the rendering units RU1 through RU4 the display instruction packet for establishing synchronization of the display at an appropriate timing.

Figure 21:
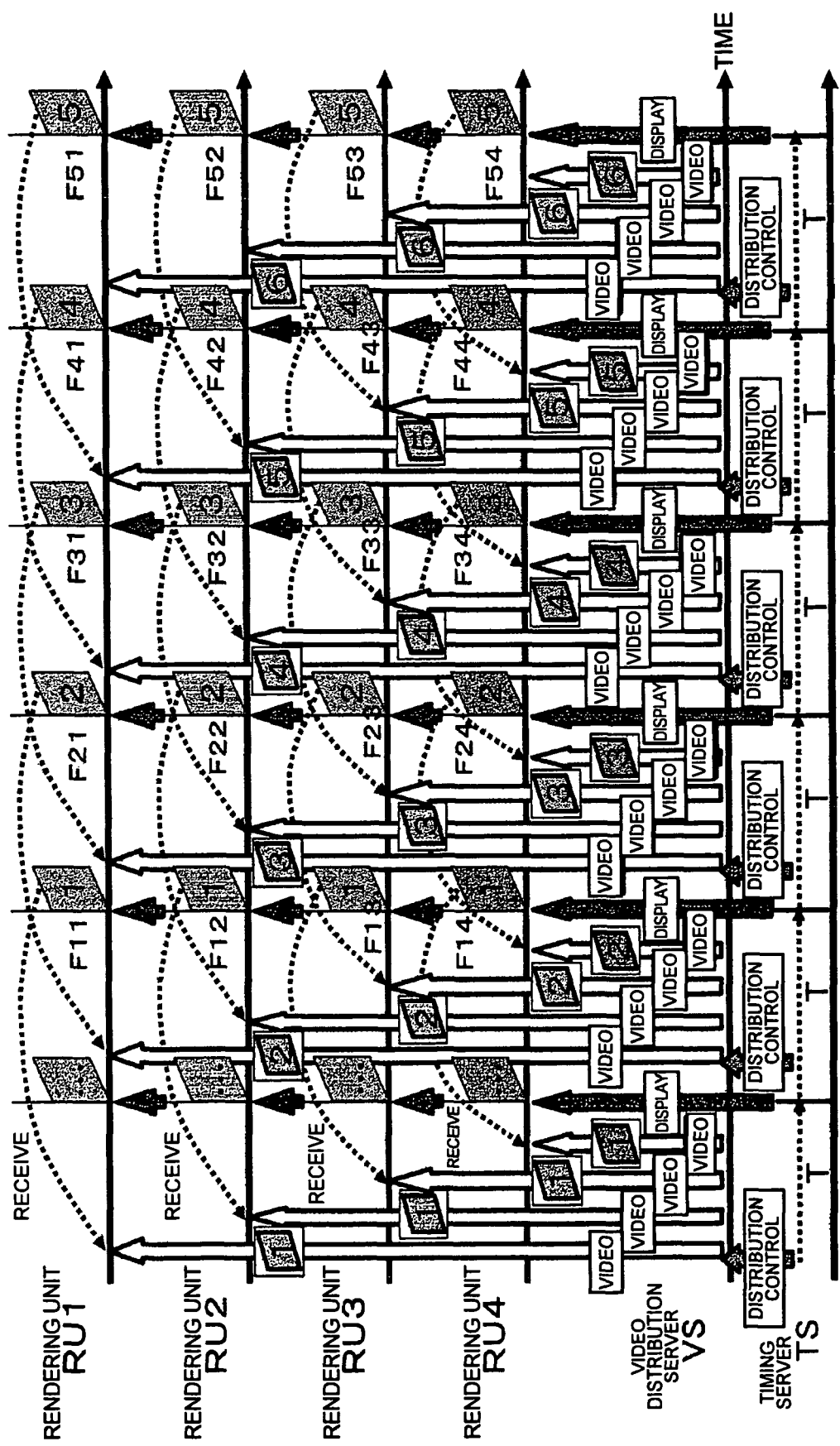
FIG. 21 is a schematic showing the video distribution control packet to the video distribution server from the timing server, the video packet from the video distribution server, the distribution timing of the display instruction packet to each rendering unit from the timing server, and the operation of the rendering unit at the time of the regular playback in the multi-screen video playback system concerning the exemplary embodiment 4.

FIG. 21 is a schematic showing the distribution timing of the video distribution control packet from the timing server TS to the video distribution server VS; the distribution timing of the video packet to each of the rendering units RU1 through RU4 of the video distribution server VS, based on this video distribution control packet; the distribution timing of the display instruction packet from the timing server TS to the rendering units RU1 through RU4; and the operation of each of the rendering units RU1 through RU4 based on these video packet from the video distribution server VS, and the display instruction packet from the timing server TS, and this FIG. 21 shows the operation at the time of the regular playback.

In this FIG. 21, the distribution timing of the video distribution control packet from the timing server TS to the video distribution server VS is shown with the hatched arrow, and the distribution timing of the video packet from the video distribution server VS to each of the rendering units RU1 through RU4 is shown with the outline arrow, and the distribution timing of the display instruction packet from the timing server TS to each of the rendering units RU1 through RU4 is shown with the gray arrow.

In addition, in this FIG. 21, "video" described in the outline arrow portion is the abbreviation of "video packet", and this outline arrow indicates the distribution timing of the video packet. Moreover, "display" described in the gray arrow portion is the abbreviation of "display instruction packet", and this gray arrow indicates the distribution timing of the display instruction packet. Moreover, "distribution control" described in the hatched arrow portion is the abbreviation of "video distribution control packet", and the hatched arrow indicate the distribution timing of the video distribution control packet.

Although the operation of this FIG. 21 is almost the same as FIG. 13 used in the description of the exemplary embodiment 2, this FIG. 21 differs from FIG. 14 in the points that the video data corresponding to each of the rendering units RU1 through RU4 is distributed from the video distribution server VS, based on the video distribution control packet from the timing server TS to the video distribution server VS, and that the display instruction packet (shown with the gray arrow) is outputted from the timing server TS to each of the rendering units RU1 through RU4, and since the others are the same as FIG. 13, the description of the operation is omitted.

Also, in this exemplary embodiment 4, like the above exemplary embodiment 3, the irregular playback for realizing the advanced video expression (the contents change, PinP, color processing, resolution conversion, and the like) can be attained. In addition, in this exemplary embodiment 4, since the only difference from the exemplary embodiment 2 is that the irregular playback control information for realizing the advanced video expression (the contents change, PinP, color processing, resolution conversion, and the like) is generated in the irregular playback control information generation section 115 provided at the timing server TS side, the detailed description thereof is omitted here.

In addition, in the case of this exemplary embodiment 4, the contents change and PinP can be realized by that the video distribution control information generation section 119 in the timing server TS receives the information which instructs the contents change from the irregular playback control information generation section 115, and sends to the video distribution server VS the video distribution control packet corresponding to this, and thereby, at the video distribution server VS side, the video based on the video distribution control packet sent from the timing server TS is distributed to each of the rendering units RU1 through RU4 or to a certain specific rendering unit.

Moreover, color processing, resolution conversion, and the like can be realized by that the irregular playback control packet generated in the irregular playback control information generation section 115 is distributed to each of the rendering units RU1 through RU4 or to a certain specific rendering unit, and thereby, the video processing control section 126 and the video processing section 127 at the rendering unit side, which received this, carry out the video processing based on the contents of the distributed irregular playback control packet.

In addition, also in this exemplary embodiment 4, like the exemplary embodiment 2, the variable speed playback, the frame forwarding playback, and the counter-playback can be attained, and moreover, it is also possible to combine the irregular playback control for carrying out these variable speed playback, frame forwarding playback, and counter-playback, with the irregular playback control for realizing various kinds of video expressions described in this exemplary embodiment 4.

Moreover, also in this exemplary embodiment 4, like the exemplary embodiment 2, even in the configuration of distributing the video as shown in FIG. 16, namely even when distributing the same video data from the video distribution server VS to all the rendering units RU1 through RU4 by simultaneous transmission, such as broadcast communication, the irregular playback control of the contents change, PinP, color processing, resolution conversion, and the like described in this exemplary embodiment 3 can be attained.

Exemplary Embodiment 5

Figure 22:
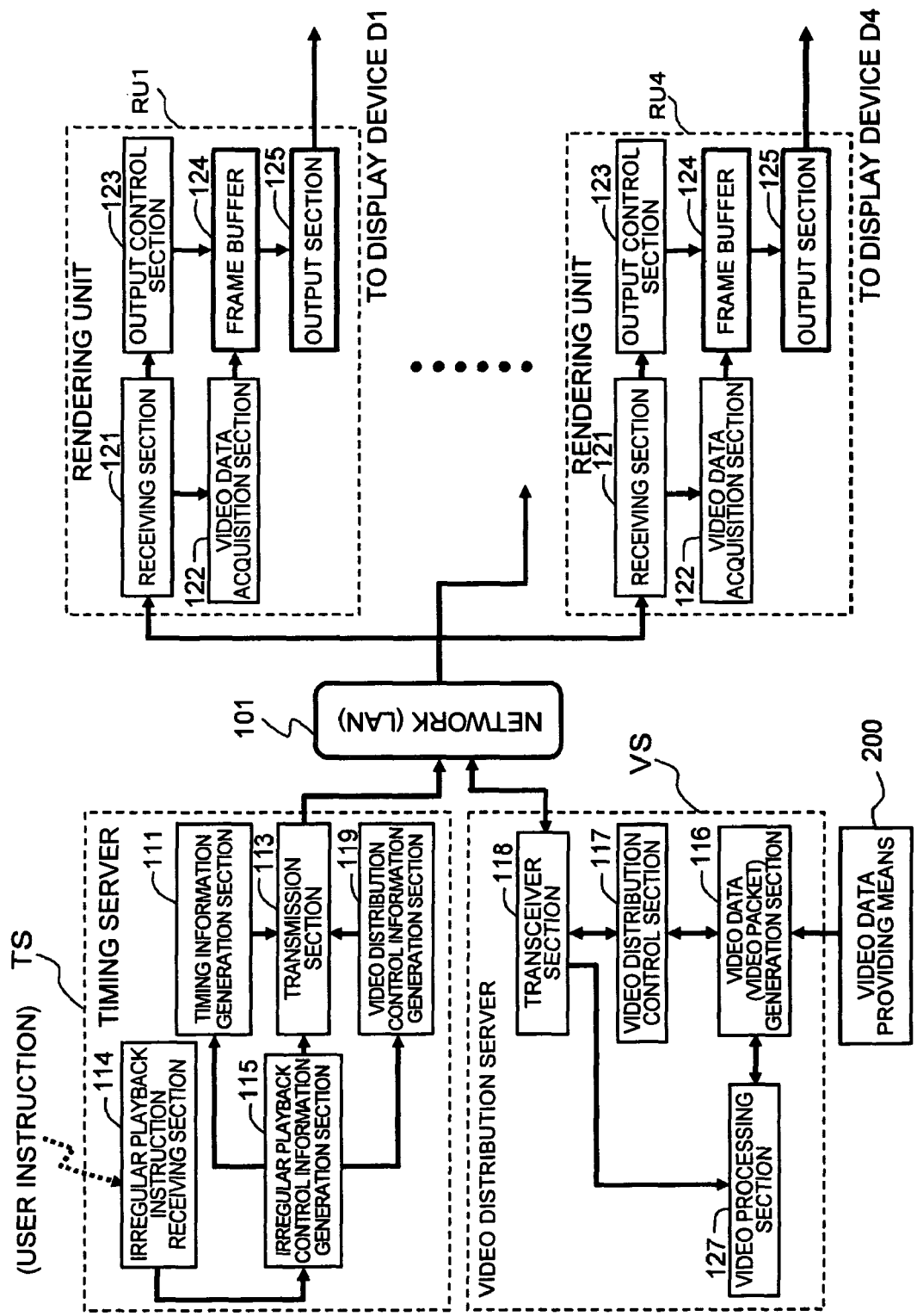
FIG. 22 is a schematic showing the configuration of the video distribution server and the rendering unit of a multi-screen video playback system according to an exemplary embodiment 5.

This exemplary embodiment 5 is an exemplary modification of the above exemplary embodiment 4, and the difference from the exemplary embodiment 4 is that the video processing function for realizing the color processing, the resolution conversion, and the like is given to the video distribution server VS side. In order to realize this, in this exemplary embodiment 5, as shown in FIG. 22, a video processing section 127 is provided at the video distribution server VS side.

Accordingly, in this exemplary embodiment 5, like FIG. 17 described in the exemplary embodiment 3, the configuration of the rendering units RU1 through RU4 includes the receiving section 121, the video data acquisition section 122, the output control section 123, the frame buffer 124, and the output section 125. In addition, the example of the whole system configuration in this exemplary embodiment 5 is the same as that of FIG. 18, and one example of the whole processing flow thereof is the same as that of FIG. 20, and the distribution timing of the video packet and the display instruction packet at the time of the regular playback and the operation of each of the rendering units RU1 through RU4 based on these video packet and display instruction packet are the same as FIG. 21.

Also in this exemplary embodiment 5, like the exemplary embodiment 4, the contents change and PinP can be realized by that the video distribution control information generation section 119 in the timing server TS receives the irregular playback control information which instructs the contents change from the irregular playback control information generation section 115, and sends to the video distribution server VS the video distribution control packet corresponding to this, and thereby, at the video distribution server VS side, the video based on the video distribution control packet sent by the timing server TS is distributed to each of the rendering units RU1 through RU4 or to a certain specific rendering unit.

Moreover, color processing, resolution conversion, and the like can be realized by that the irregular playback control packet generated in the irregular playback control information generation section 115 is distributed to the video distribution server VS, and the video processing section 127 at the video distribution server VS side which receives this carries out video processing based on the contents of the distributed irregular playback control packet. Then, the video distribution server VS distributes the video packet to each rendering unit or to a specific rendering unit, after this video processing.

In addition, also in this exemplary embodiment 5, like the exemplary embodiment 2, a variable speed playback, a frame forwarding playback, and a counter-playback can be attained, and moreover, it is also possible to combine the irregular playback control for carrying out these variable speed playback, frame forwarding playback, and counter-playback, with the irregular playback control for realizing various kinds of video expressions described in this exemplary embodiment 4.

Moreover, also in this exemplary embodiment 5, like the exemplary embodiment 2, even in the configuration of distributing the video as shown in FIG. 14, namely even when distributing the same video data from the video distribution server VS to all the rendering units RU1 through RU4 by simultaneous transmission, such as broadcast communication, the irregular playback control of the contents change, PinP, color processing, resolution conversion, and the like described in this exemplary embodiment 3 can be attained.

According to these exemplary embodiment 4 and exemplary embodiment 5, the same irregular playback control as the exemplary embodiment 2 and the exemplary embodiment 3 can be attained, and also processing load of the video distribution serve VS can be alleviated by that the timing server TS takes care of a part of the function of the video distribution server VS described in the exemplary embodiment 2 and the exemplary embodiment 3. Moreover, since it is also possible for any one of the plurality of rendering units RU1 through RU4 to serve as the timing server TS, an effect that freedom for the configuration is increased is also obtained.

Exemplary Embodiment 6

An exemplary embodiment 6 is constituted, in the multi-screen video playback system 10 concerning each exemplary embodiment described above, such that any one rendering unit of the rendering units RU1 through RU4 serves either or both of the video distribution server VS and the timing server TS.

Thus, as the configuration in which any one of the rendering units RU1 through RU4 serves either or both of the video distribution server VS and the timing server, a certain rendering unit out of the plurality of rendering units RU1 through RU4 is constituted to have the function of the timing server TS, for example, in the multi-screen video playback system 10 concerning the exemplary embodiment 1. Moreover, like the multi-screen video playback system 10 concerning the exemplary embodiment 2 and the exemplary embodiment 3, if the video distribution server VS is the one having the function of the timing server TS, a certain rendering unit out of the plurality of rendering units RU1 through RU4 is constituted to have the function of the video distribution server VS.

Moreover, like the multi-screen video playback system 10 concerning the exemplary embodiment 4 and the exemplary embodiment 5, if the timing server TS is provided separately from the video distribution server VS, one certain rendering unit out of the plurality of rendering units RU1 through RU4 may have either function or both functions of the video distribution server VS and the timing server TS, and moreover, the video distribution server VS and the timing server TS may have a separate rendering unit such that a certain one rendering unit has the function of the video distribution server VS and other certain one rendering unit has the function of the timing server TS.

In this exemplary embodiment 6, an example of the case where one certain rendering unit out of the plurality of rendering units RU1 through RU4 in the multi-screen video playback system 10 concerning the exemplary embodiment 2 and the exemplary embodiment 3 includes the video distribution server VS having the function as the timing server will be described. In addition, in the exemplary embodiment 6, a case where the video distribution server VS is provided in the rendering unit RU1 will be described.

FIG. 23 is a schematic showing the configuration of the multi-screen video playback system 10 concerning the exemplary embodiment 6. The configuration of this FIG. 23 differs from the configuration shown in FIG. 10 in a point that the rendering unit RU1 is constituted to include the function as the video distribution server VS, and since the others are the same as FIG. 10, and the same numeral is given to the same component. In addition, in the exemplary embodiment 6, a portion provided in the rendering unit RU1, which carries out the function as the video distribution server VS, will be referred to as a video distribution server section VS'.

As apparent from FIG. 23, in the exemplary embodiment 6, the rendering unit RU1 is constituted to include the video distribution server section VS' and the portion (this will be referred to as a rendering section R) which carries out the function as the rendering unit described in the exemplary embodiment 2. In addition, the rendering section R has the same configuration as the rendering units RU1 through RU4 described in the above exemplary embodiment 2 (refer to FIG. 11), and includes the receiving section 121, the video data acquisition section 122, the output control section 123, the frame buffer 124, the output section 125, the video processing control section 126, and the video processing section 127.

Figure 24:
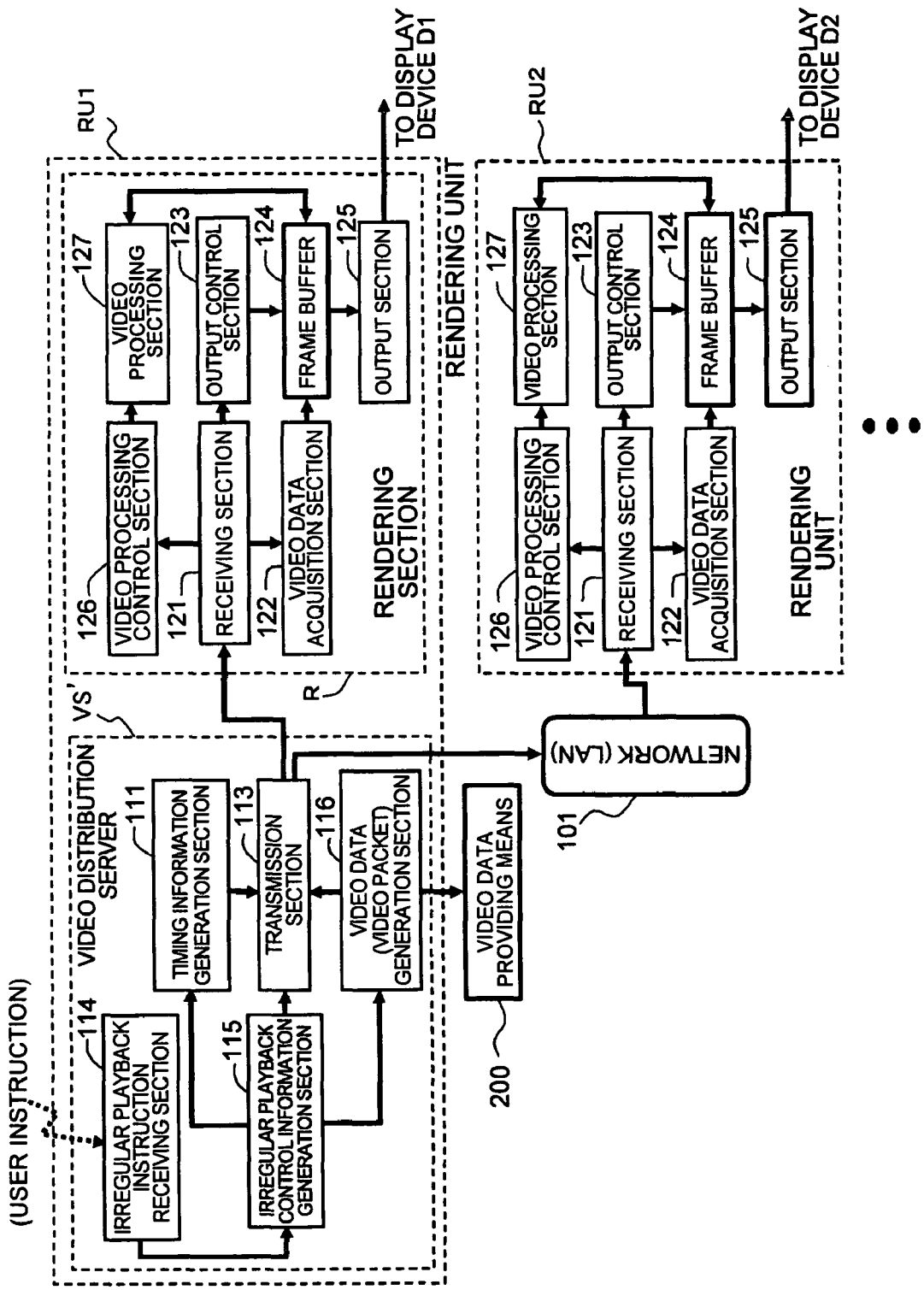
FIG. 24 is a schematic showing the configuration of the rendering unit in the multi-screen video playback system shown in FIG. 23.

FIG. 24 is a schematic showing the configuration of the rendering units RU1 through RU4 in the multi-screen video playback system 10 shown in FIG. 23. In addition, assume the video distribution server VS in FIG. 24 is the video distribution server VS of the multi-screen video playback system 10 concerning the exemplary embodiment 2 (refer to FIG. 11). Accordingly, the video distribution server section VS' provided in the rendering unit RU1 is constituted, like the video distribution server VS shown in FIG. 11, to include the timing information generation section 111, the transmission section 113, the irregular playback instruction receiving section 114, the irregular playback control information generation section 115, and the video data (video packet) generation section 116. Moreover, the configuration of the rendering units RU2 through RU4 except the rendering unit RU1 is the same as FIG. 19.

Thus, when providing the video distribution server section VS' which has the function as the timing server in the rendering unit RU1, the timing information, the video data (video packet), and the irregular playback information from the video distribution server section VS' are distributed to each rendering unit from the transmission section 113 of the video distribution server section VS', however, in the case of the rendering unit RU1, the timing information, the video data (video packet), and the irregular playback control information for carrying out video processing are directly sent to this rendering section R1, and distributed to other rendering units RU2 through RU4 by the LAN 101.

In addition, from the video distribution server section VS', the same video data can be distributed to each of the rendering units RU1 through RU4 (note that the rendering unit RU1 is the rendering section R), and each different video data can be also distributed to each of the rendering units RU1 through RU4 (note that the rendering unit RU1 is the rendering section R). Moreover, the same irregular playback control information can be distributed to each of the rendering units RU1 through RU4 (note that the rendering unit RU1 is the rendering section R), and each different irregular playback control information can be also distributed to each of the rendering units RU1 through RU4 (note that the rendering unit RU1 is the rendering section R).

Figure 25:
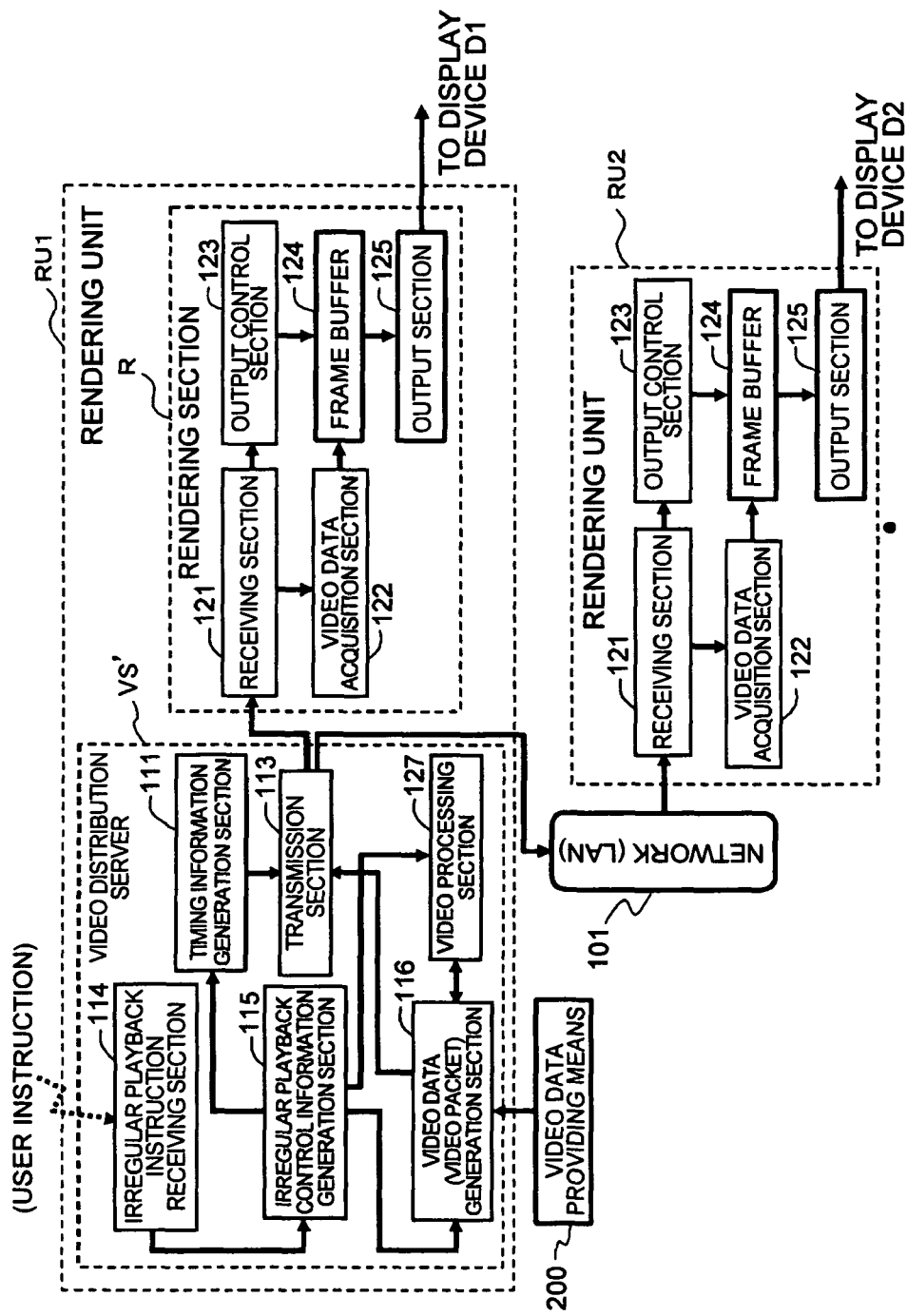
FIG. 25 is a schematic showing another configuration of the rendering unit in the multi-screen video playback system shown in FIG. 23.

FIG. 25 is a schematic showing another example of the configuration of the rendering units RU1 through RU4 in the multi-screen video playback system 10 shown in FIG. 24. The video distribution server VS in this FIG. 25 is the video distribution server VS of the multi-screen video playback system 10 concerning the exemplary embodiment 3 (refer to FIG. 17).

Accordingly, the video distribution server section VS' provided in the rendering unit RU1 is constituted, like the video distribution server VS shown in FIG. 17, to include the timing information generation section 111, the transmission section 113, the irregular playback instruction receiving section 114, the irregular playback control information generation section 115, the video data (video packet) generation section 116, and the video processing section 127. Moreover, the configuration of the rendering units RU2 through RU4 except the rendering unit RU1 is the same as FIG. 19.

According to the multi-screen video playback system 10 concerning the exemplary embodiment 6, the same effect as that of the multi-screen video playback system 10 concerning the exemplary embodiment 2 and the exemplary embodiment 3 is obtained, and in addition, since in this exemplary embodiment 6, the video distribution server section VS' is provided in one certain rendering unit RU1, it is not necessary to prepare the video distribution server VS in a separate form, and the configuration of the multi-screen video playback system 10 can be simplified.

In addition, as described above, also in the case where the timing server TS is separated from the video distribution server VS, it is possible, by the same token, to give the function of the video distribution server VS and the function of the timing server TS to a certain rendering unit. In this case, as described above, it is possible to give the function of the timing server TS and the function of the video distribution server VS to the same rendering unit, and it is also possible to give the function of the timing server TS and the function of the video distribution server VS to a separate rendering unit such as giving the video distribution server VS to the rendering unit RU1, and giving the timing server TS to the rendering unit RU2.

Exemplary Embodiment 7

The multi-screen video playback system 10 according to an exemplary embodiment 7 is an example that each of the display devices D1 through D4 includes the function of the rendering units RU1 through RU4. In addition, in the exemplary embodiment 7, the portion provided in the display devices D1 through D4, which has the function of the rendering units RU1 through RU4, will be referred to as rendering unit sections RU1' through RU4'. Moreover, in this exemplary embodiment 7, the multi-screen video playback system 10 is made including the display devices D1 through D4.

Figure 26:
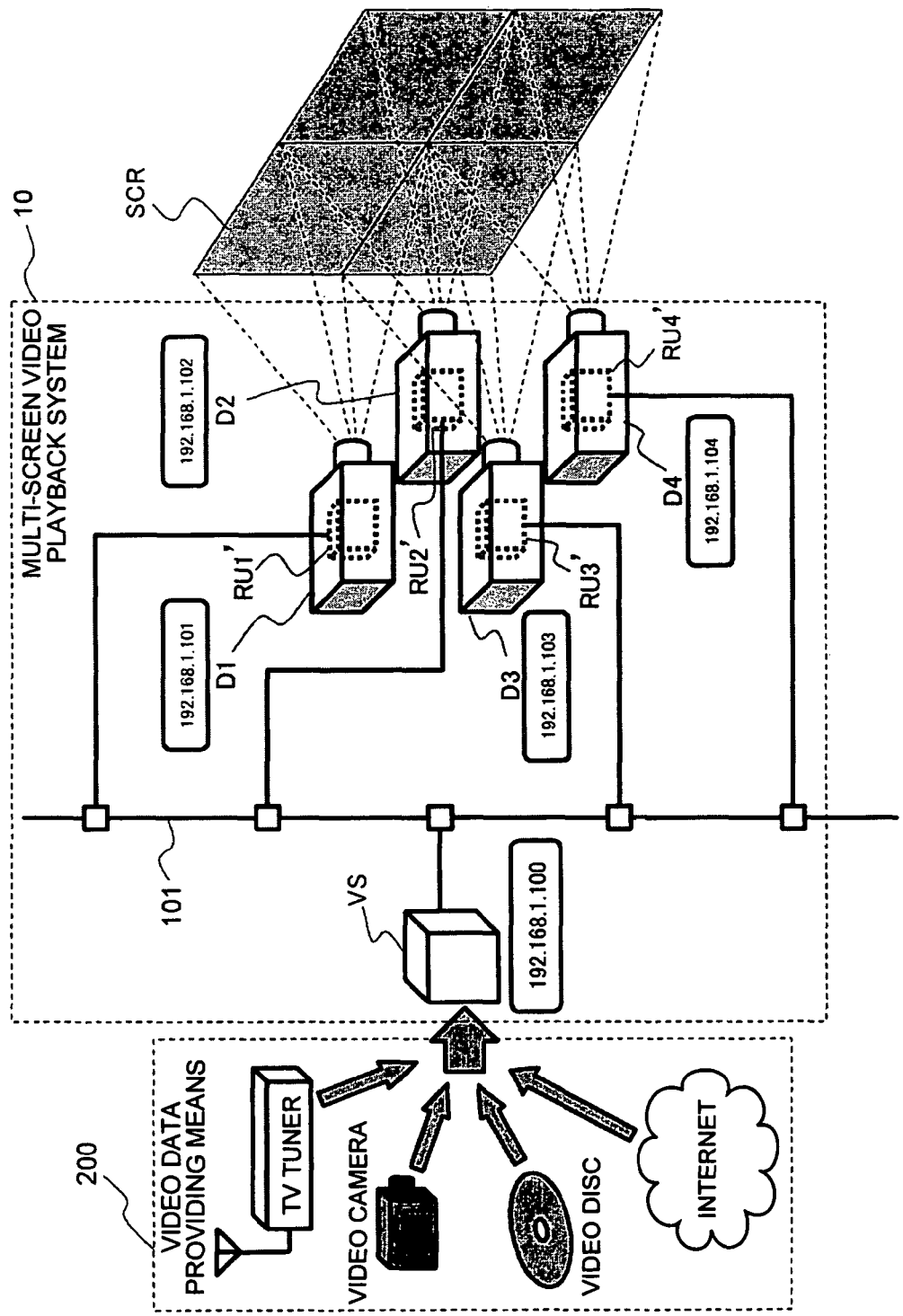
FIG. 26 is a schematic showing the configuration of the multi-screen video playback system regarding an exemplary embodiment 7.

FIG. 26 is a schematic showing the configuration of the multi-screen video playback system 10 concerning the exemplary embodiment 7. The configuration of this FIG. 26 differs from the configuration shown in FIG. 10 in a point that each of the display devices D1 through D4 is constituted to include the rendering unit sections RU1' through RU4', and since the others are the same as FIG. 10, the same numeral is given to the same component. Namely, the multi-screen video playback system 10 of the exemplary embodiment 7 is constituted such that the display device D1 includes the rendering unit section RU1', the display device D2 includes the rendering unit section RU2', the display device D3 includes the rendering unit section RU3', and the display device D4 includes the rendering unit section RU4'.

Figure 27:
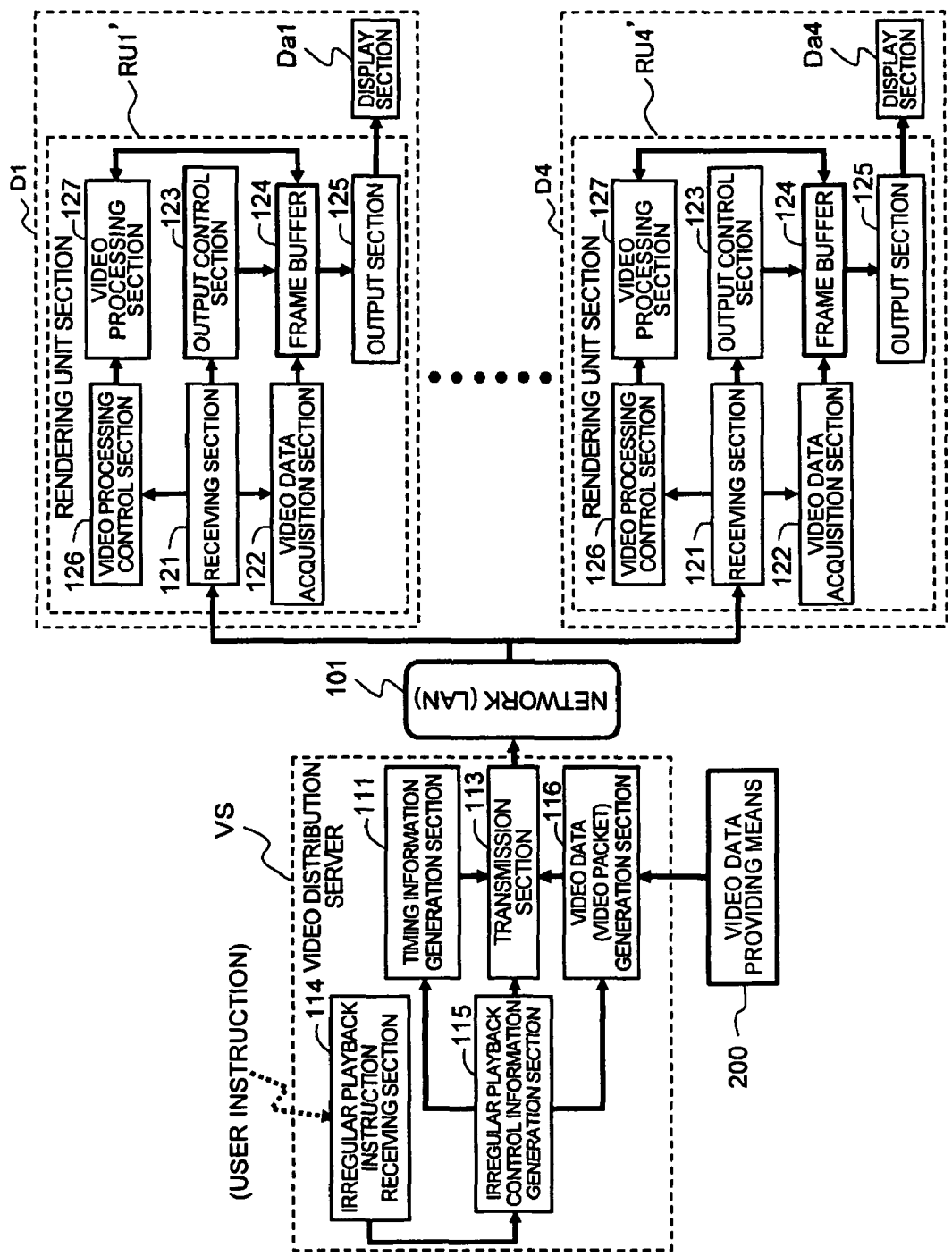
FIG. 27 is a schematic showing the configuration of the video distribution server and the display device in the multi-screen video playback system shown in FIG. 26.

FIG. 27 is a schematic showing the configuration of the video distribution server VS and the display devices D1 through D4 in the multi-screen video playback system 10 shown in FIG. 11. As apparent also from FIG. 27, the video distribution server VS has the same configuration as FIG. 11. Moreover, each of the display devices D1 through D4 includes the rendering unit sections RU1' through RU4', and at the same time includes display sections (these are denoted by Da1 through Da4) having a function to display the video data given from the rendering unit sections RU1' through RU4'. In addition, the configuration of each of the rendering unit sections RU1' through RU4' is the same as that of the rendering units RU1 through RU4 which is shown in FIG. 11.

According to the multi-screen video playback system 10 concerning the exemplary embodiment 7, the same effect as the multi-screen video playback system 10 concerning the exemplary embodiment 1 to the exemplary embodiment 5 is obtained, and in addition, since in this exemplary embodiment 7, the rendering unit sections RU1' through RU4' given to the display devices D1 through D4, it is not necessary to prepare the rendering units RU1 through RU4 in a separate form, and simplification of the system can be attained.

In addition, although the rendering unit sections RU1' through RU4' shown in FIG. 26 and FIG. 27 are the examples using the rendering units RU1 through RU4 explained in the multi-screen video playback system 10 concerning the exemplary embodiment 1, the exemplary embodiment 2, and the exemplary embodiment 4, they may be the rendering units RU1 through RU4 of the configuration shown in the exemplary embodiment 3 and the exemplary embodiment 5.

Moreover, as described in the exemplary embodiment 6, the rendering unit sections RU1' through RU4' may be the ones in which a certain one rendering unit has the function of the video distribution server VS. Moreover, it is also the same in the case where the timing server TS is separated from the video distribution server VS, and in this case, any one of the rendering unit sections RU1' through RU4' may have either or both of the function of the video distribution server VS and the function of the timing server TS, and the function of the timing server TS and the function of the video distribution server VS may be also given to a separate rendering unit.

Exemplary Embodiment 8

In the multi-screen video playback system 10 of each exemplary embodiment described above, the display instruction packet is distributed to each of the rendering units RU1 through RU4 per each frame unit, i.e., per each frame updated cycle of the video data, however, not limited to this, for example, the display instruction packet can be also distributed to the plurality of rendering units RU1 through RU4 per each display timing of one part of frame in the video data.

Figure 28:
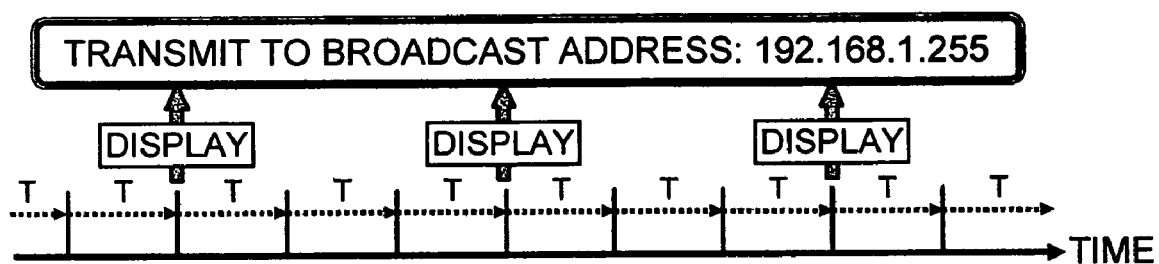
FIG. 28 is a schematic showing the distribution timing of the display instruction packet of the multi-screen video playback system concerning an exemplary embodiment 8.

FIG. 28 is a schematic showing the distribution timing of the display instruction packet of the multi-screen video playback system 10 concerning the exemplary embodiment 6. FIG. 28 is an example of distributing a display instruction packet to each rendering unit by broadcast communication at the rate of once per three frames.

Figure 29:
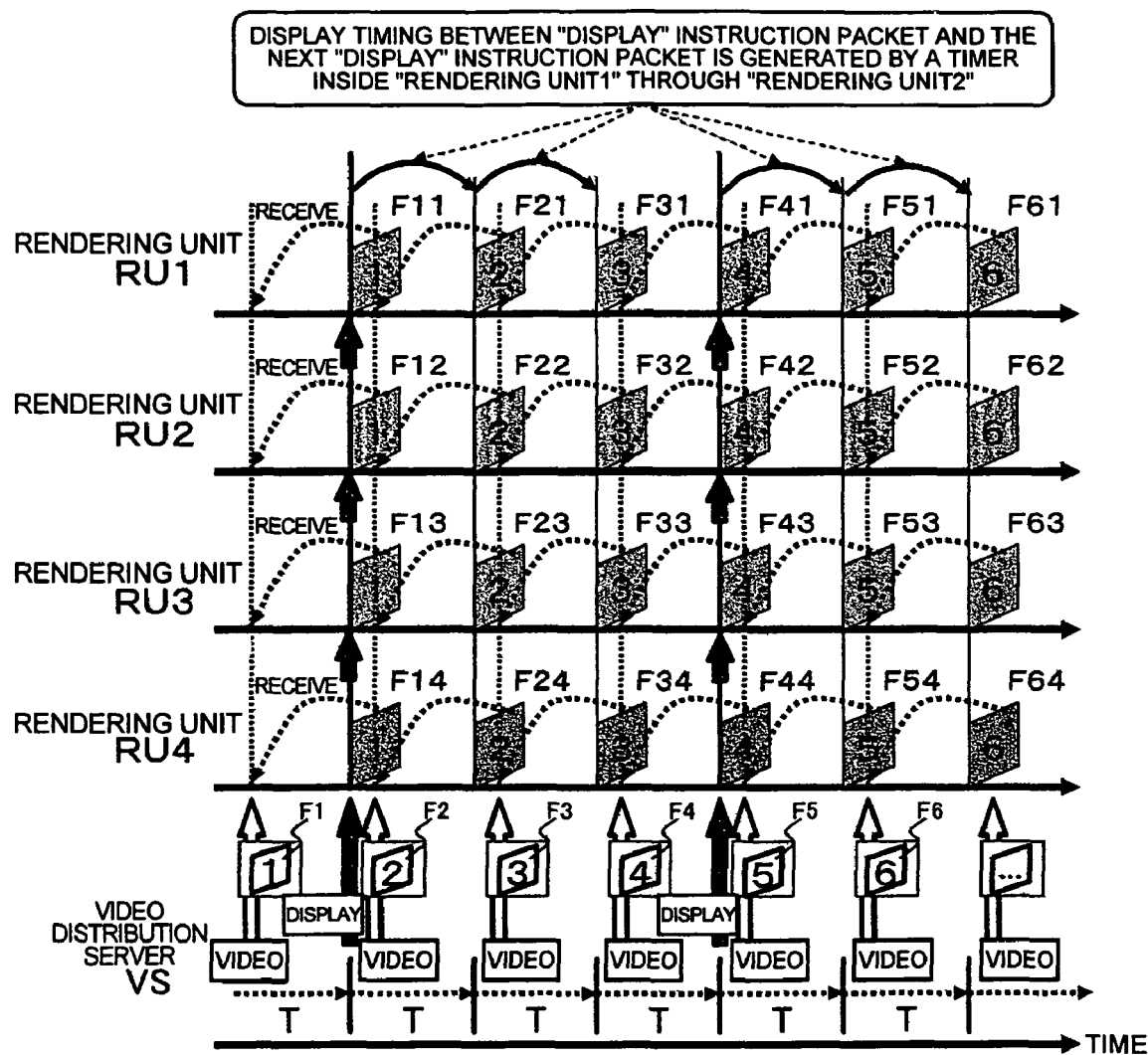
FIG. 29 is a schematic showing the operation of the multi-screen video playback system concerning the exemplary embodiment 8.
Figure 30:
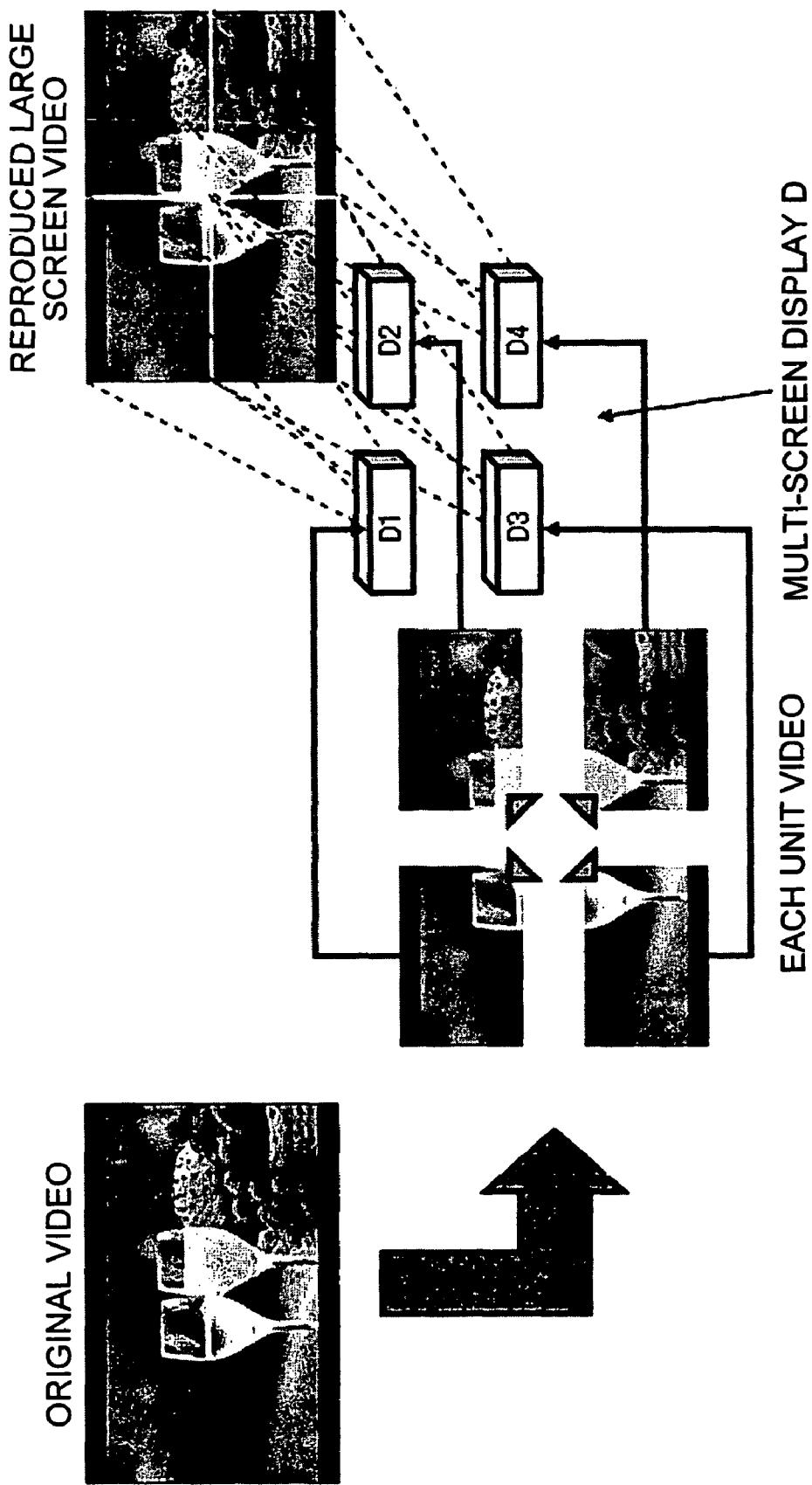
FIG. 30 is a schematic showing a multi-screen display.
Figure 31A:
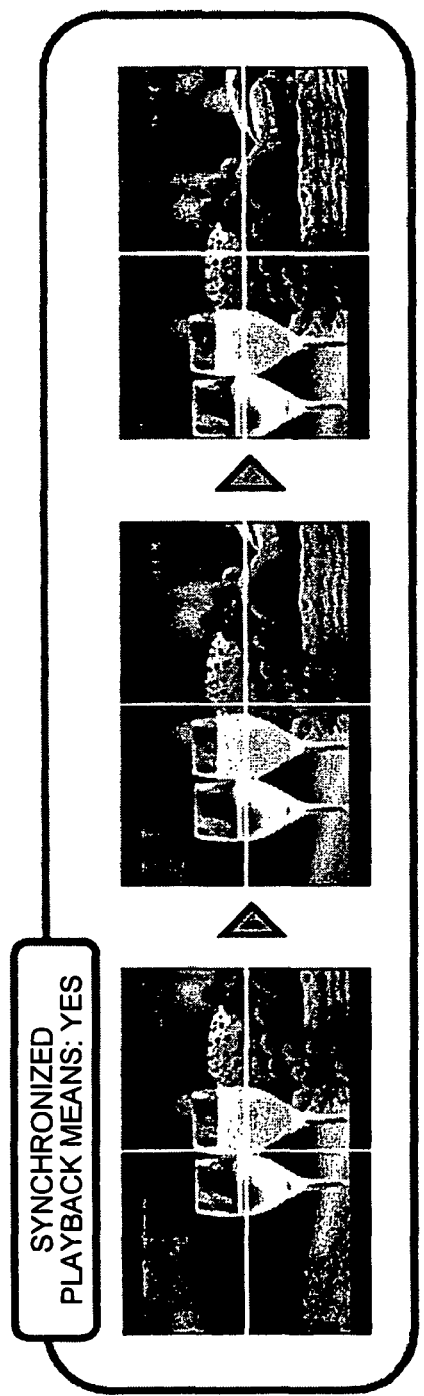
FIGS. 31A-B are schematics showing the necessity of a synchronized playback means in the multi-screen display.
Figure 31B:
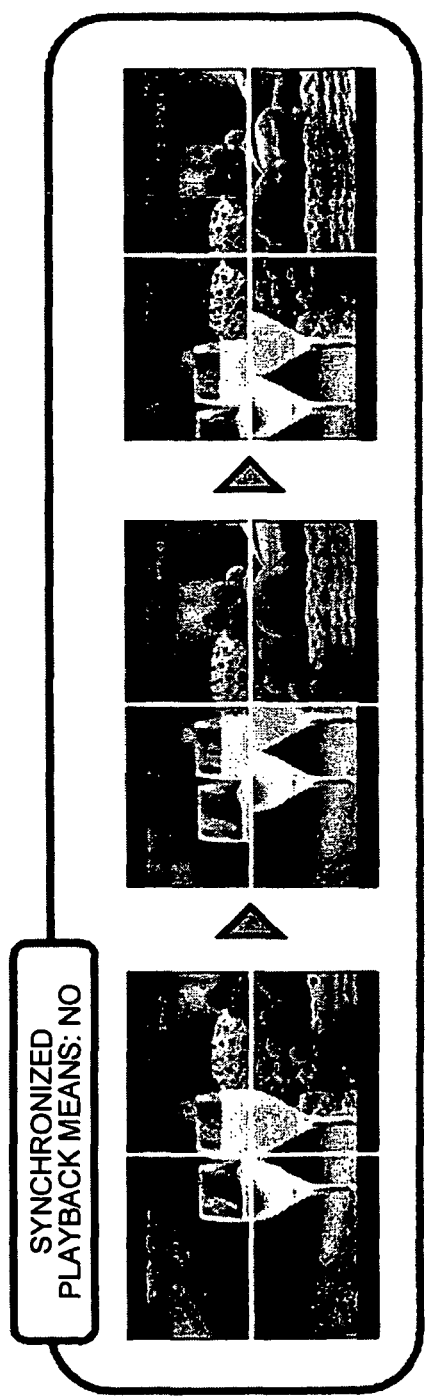
Figure 32A:
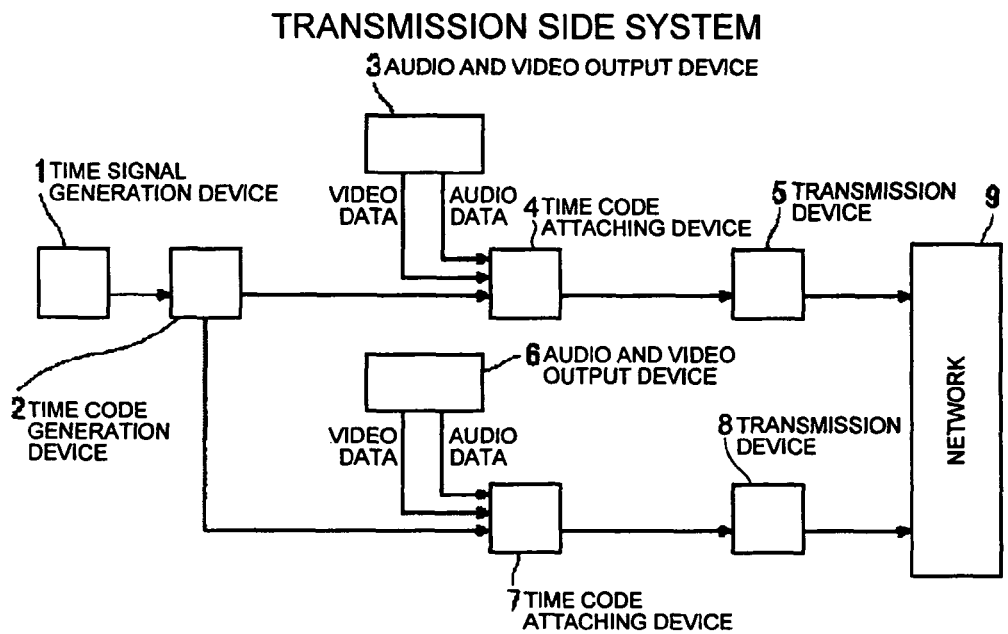
FIGS. 32A-B are schematics showing the related art synchronized playback means.
Figure 32B:
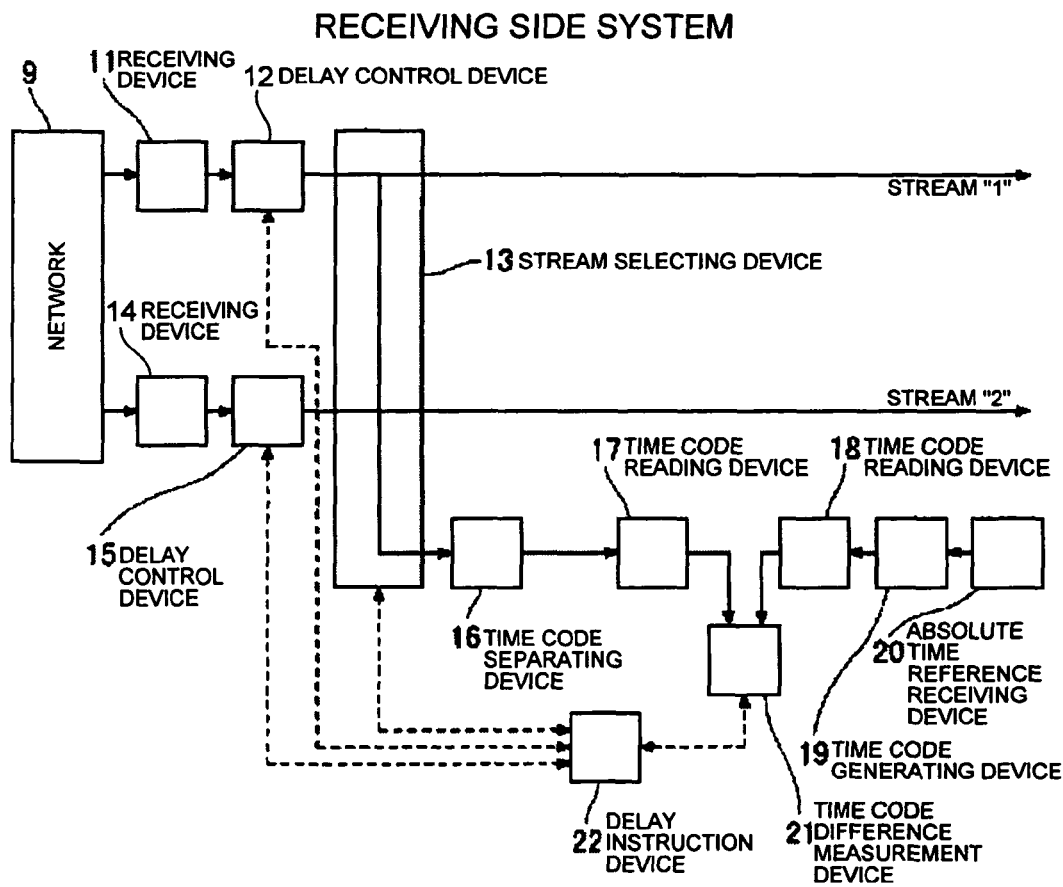
Figure 33:
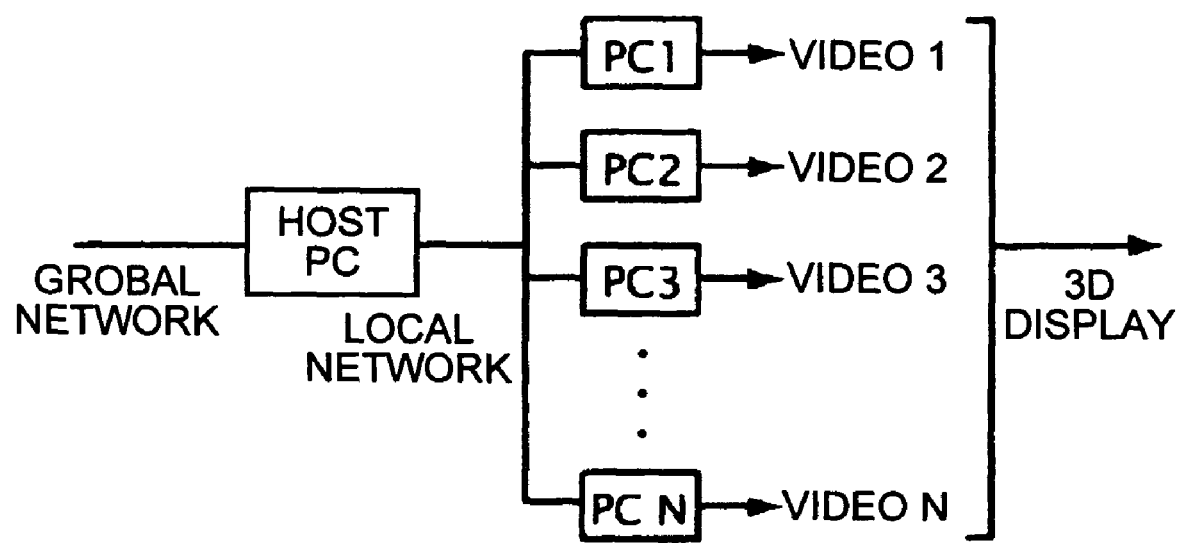
FIG. 33 is a schematic showing another related art synchronized playback device.

FIG. 29 is a schematic showing the operation of the multi-screen video playback system 10 concerning the exemplary embodiment 8. In addition, in FIG. 9, an example that the same video data is distributed to each of the rendering units RU1 through RU4 from the video distribution server VS is shown. Moreover, in FIG. 29, after the display instruction packet to a certain frame (the second frame, in this example) is distributed from the video distribution server VS, next, a display instruction packet is distributed to the 5th frame. In this case, the display instruction timing to the frames except the frames to which the display instruction packet is outputted (the third frame and the fourth frame, in this example) can be generated by a timer which exists inside the rendering units RU1 through RU4.

In addition, also in the 6th frame and the subsequent frames which are not shown in this FIG. 29, the display instruction packet is distributed to each of the rendering units RU1 through RU4 per each predetermined frame in the same way, and the display instruction timing to the frames between each display instruction packet is generated by a timer which each of the rendering units RU1 through RU4 has.

Thus, by distributing the display instruction packet to each of the rendering units RU1 through RU4 per a certain one part of frame, the frequency of distributing the timing information through the LAN 101 can be reduced, and the traffic in the LAN can be reduced.

In addition, in the multi-screen video playback system 10 concerning each exemplary embodiment described above, as the simultaneous transmission, the communication not by broadcast communication but by multicast communication can be also employed. Also in this case, the video distribution server VS can carry out the simultaneous transmission easily to each of the rendering units RU1 through RU4 which are connected to the LAN 101. In addition, when employing the multicast communication, the same multicast address, for example, 224.0.0.1 is given to all the rendering units that constitute the multi-screen video playback system, and the video distribution server VS has only to transmit the display instruction packet which becomes the synchronized signal to this multicast address.

As described above, although the multi-screen video playback system and the video synchronized playback method in the multi-screen video playback system according to exemplary embodiments of the present invention have been described based on each exemplary embodiment described above, exemplary embodiments of the present invention are not limited to the above each exemplary embodiment, but can be implemented in various modes within the scope not changing the substance thereof, and, for example, the following exemplary modifications can be also made.

(1) Although the multi-screen video playback system in each exemplary embodiment described above is constituted including a network, exemplary embodiments of the present invention can be also applied to the one not including the network. In this case, if the network is prepared separately, the multi-screen video playback system in each exemplary embodiment described above can be constituted, and the same effect can be obtained.

(2) Although in the multi-screen video playback system in each exemplary embodiment described above, each rendering unit is constituted separated from each display device, exemplary embodiments of the present invention may be constituted such that each rendering unit may be included in the inside thereof as a component of each display device.

(3) The display instruction timing in each exemplary embodiment described above can also be distributed to the plurality of rendering units per each display timing in all the frames of the video data, and the display instruction timing can also be distributed to the plurality of rendering units per each display timing of a part of frame of the video data.

(4) Although in each exemplary embodiment described above, the video distribution server VS, the timing server TS, and the rendering units RU1 through RU4 have been described as if each is constituted as a separate hardware, these may be an integrated one, and a configuration may be made in which any one of the rendering units RU1 through RU4 serves as the video distribution server VS and as the timing server TS. For example, in case of the exemplary embodiment 1, the configuration may be made in which a certain rendering unit out of the plurality of rendering units RU1 through RU4 has the function of the video distribution server VS, and moreover, in case of the exemplary embodiment 2, a certain rendering unit out of the plurality of rendering units RU1 through RU4 may have either function or both functions of the video distribution server VS and the timing server TS.

Moreover, so as to realize exemplary embodiments of the present invention only with a display device (for example, a projector), it is also possible to make a configuration which incorporates all the video distribution server VS, the timing server TS, and the rendering units RU1 through RU4, and various exemplary embodiments thereof can be considered.

(5) Although in the multi-screen video playback system in each exemplary embodiment described above, the case where one large screen video is reproduced on the multi-screen display of a large screen has been described, as an example, exemplary embodiments of the present invention are not limited to this, and can be applied, for example, also to the case where each of the display devices in the multi-screen display synchronizes and reproduces the video of each different view shot with a different camera, in sports, theaters and the like.

(6) Although in the multi-screen video playback system in each exemplary embodiment described above, the description has been made using four projectors arranged in a matrix form of two lines by two rows, the type, the number, the arranging pattern, and the like of the display devices are not limited to this, not to mention.

(7) In the multi-screen video playback system in each exemplary embodiment described above, with respect to the plurality of display devices D1 view shot D4, for example, an example of the arrangement in the case of constituting the multi-screen display like the tiling display has been described. However, the multi-screen video playback system of exemplary embodiments of the present invention, for example, can be applied also to the case where a plurality of users located in places apart from each other play the same game looking at each display. Accordingly, each of the display devices D1 through D4 may be constituted to be arranged separately.

Moreover, according to exemplary embodiments of the present invention, it is possible to create a video playback program in the multi-screen video playback system, in which the video synchronized playback step in the multi-screen video playback system for realizing exemplary embodiments of the present invention described above are described, and also to record this to the recording medium, such as a floppy disk, an optical disc, and a hard disk. Therefore, exemplary embodiments of the present invention also includes the recording medium in which the video playback program in this multi-screen video playback system is recorded. Moreover, the video playback program in this multi-screen video playback system may be obtained from a network.

What is claimed is:

1. A multi-screen video playback system comprising:
a network;
a plurality of display devices;

a video distribution server connected to the network, the video distribution server adapted to:
receive an irregular playback instruction,
generate first irregular playback control information for video processing and second irregular playback control information for changing a speed of playback based on the irregular playback instruction,
distribute video data and the first irregular playback control information via the network, and
distribute timing information by simultaneous transmission via the network, the timing information being related to a irregular playback frame-rate of the video data;
a plurality of rendering units connected to the network, each rendering unit including a frame buffer and being adapted to receive the video data, the first irregular playback control information and the timing information, carry out color processing and resolution conversion to the received video data, and output the video data to corresponding display device synchronously,
the video data being developed in the frame buffer and the frame buffer including at least a first buffer and a second buffer, the first buffer transmitting and displaying already-developed video data regarding a first frame while the second buffer receives and develops video data regarding a second frame to be displayed next and then the second buffer transmitting and displaying the video data regarding the second frame while the first buffer receives and develops video data regarding a third frame to be displayed next,
the video distribution server including: a video data generation section that generates the video data to be distributed to the plurality of rendering units;
a timing information generation section that generates the timing information and changes a cycle of the timing information based on the second irregular playback control information;
an irregular playback control information generation section that generates the first and second irregular playback control information and can output the first irregular playback control information, according to the contents thereof, to the video data generation section or the rendering unit; and
a transmission section that distributes video data generated in the video data generation section, the timing information generated in the timing information generation section, and the first irregular playback control information, to the plurality of rendering units, and
the rendering unit including: a receiving section that receives the video data that is distributed by the video distribution server, timing information, and the first irregular playback control information, the video data received in the receiving section being developed in the frame buffer;
a video processing section that carries out video processing based on the first irregular playback control information to the video data being developed to this frame buffer; and
an output section that outputs the video data being developed to the frame buffer to the corresponding display device, based on the timing information.

2. The multi-screen video playback system according to claim 1, a certain rendering unit of the plurality of rendering units including the video distribution server function.

3. A multi-screen video playback system, comprising:
a plurality of display devices;
a video distribution server adapted to:
generate a first irregular playback control information for video processing and second irregular playback control information for changing a speed of playback based on the irregular playback instruction,
distribute video data and the first irregular playback control information via the network, and
distribute timing information by simultaneous transmission via the network, the timing information being related to a irregular playback frame-rate of the video data;
a plurality of rendering units connected to the network, each rendering unit including a frame buffer and being adapted to receive the video data, the first irregular playback control information and the timing information, carry out color processing and resolution conversion to the received video data, and output the video data to corresponding display device synchronously,
the video data being developed in the frame buffer and the frame buffer including at least a first buffer and a second buffer, the first buffer transmitting and displaying already-developed video data regarding a first frame while the second buffer receives and develops video data regarding a second frame to be displayed next and then the second buffer transmitting and displaying the video data regarding the second frame while the first buffer receives and develops video data regarding a third frame to be displayed next,
the video distribution server including: a video data generation section that generates the video data to be distributed to the plurality of rendering units;
a timing information generation section that generates the timing information and changes a cycle of the timing information based on the second irregular playback control information;
an irregular playback control information generation section that generates the first and second irregular playback control information and can output the first irregular playback control information, according to the contents thereof, to the video data generation section or the rendering unit; and
a transmission section that distributes video data generated in the video data generation section, the timing information generated in the timing information generation section, and the first irregular playback control information, to the plurality of rendering units, and
the rendering unit including: a receiving section that receives the video data that is distributed by the video distribution server, timing information, and the first irregular playback control information, the video data received in the receiving section being developed in the frame buffer;
a video processing section that carries out video processing based on the first and irregular playback control information to the video data being developed to this frame buffer; and
an output section that outputs the video data being developed to the frame buffer to the corresponding display device, based on the timing information.

4. A multi-screen video playback system, comprising:
a network;
a plurality of display devices;
a video distribution server connected to the network, the video distribution server adapted to receive an irregular playback instruction, adapted to:
generate first irregular playback control information for video processing and second irregular playback control information for changing a speed of playback based on this irregular playback instruction, carry out color processing and resolution conversion to video data, distribute the video data and the first irregular playback control information via the network, and distribute timing information by simultaneous transmission via the network, the timing information being related to a irregular playback frame-rate of the video data;

a plurality of rendering units connected to the network, each rendering unit including a frame buffer and being adapted to receive the video data, the first irregular playback control information and the timing information, carry out color processing and resolution conversion to the received video data, and output the video data to corresponding display device synchronously, the video data being developed in the frame buffer and the frame buffer including at least a first buffer and a second buffer, the first buffer transmitting and displaying already-developed video data regarding a first frame while the second buffer receives and develops video data regarding a second frame to be displayed next and then the second buffer transmitting and displaying the video data regarding the second frame while the first buffer receives and develops video data regarding a third frame to be displayed next, the video distribution server including: a video data generation section that generates the video data to be distributed to the plurality of rendering units;

a timing information generation section that generates the timing information and changes a cycle of the timing information based on the second irregular playback control information;

an irregular playback control information generation section that generates the first and second irregular playback control information and outputs the first irregular playback control information, according to the contents thereof, to the video data generation section or the rendering unit; and a transmission section that distributes video data generated in the video data generation section, the timing information generated in the timing information generation section, and the first irregular playback control information, to the plurality of rendering units, and the rendering unit including: a receiving section that receives the video data that is distributed by the video distribution server, timing information, and the first irregular playback control information, the video data received in the receiving section being developed in the frame buffer;

a video processing section that carries out video processing based on the first irregular playback control information to the video data being developed to this frame buffer; and an output section that outputs the video data being developed to the frame buffer to the corresponding display device, based on the timing information.

5. The multi-screen video playback system according to claim 4, wherein the video processing section carries out video processing to enable the irregular playback of the video data to be distributed;

the irregular playback control information generation section generates the first and second irregular playback control information and outputs the first irregular playback control information, according to the contents thereof, to the video data generation section or the video processing section; and the receiving section receives the timing information and the video data that is distributed by the transmission section.

6. A multi-screen video playback system comprising:

a plurality of display devices;

a video distribution server adapted to receive an irregular playback instruction, adapted to:

generate first irregular playback control information for video processing and second irregular playback control information for changing a speed of playback based on the irregular playback instruction, carry out color processing and resolution conversion to video data, distribute the video data and the first irregular playback control information via the network, and distribute timing information by simultaneous transmission via the network, the timing information being related to a irregular playback frame-rate of the video data;

a plurality of rendering units connected to the network, each rendering unit including a frame buffer and being adapted to receive the video data, the first irregular playback control information and the timing information, carry out color processing and resolution conversion to the received video data, and output the video data to corresponding display device synchronously, the video data being developed in the frame buffer and the frame buffer including at least a first buffer and a second buffer the first buffer transmitting and displaying already-developed video data regarding a first frame while the second buffer receives and develops video data regarding a second frame to be displayed next and then the second buffer transmitting and displaying the video data regarding the second frame while the first buffer receives and develops video data regarding a third frame to be displayed next, the video distribution server including: a video data generation section that generates the video data to be distributed to the plurality of rendering units;

a timing information generation section that generates the timing information and changes a cycle of the timing information based on the second irregular playback control information;

an irregular playback control information generation section that generates the first and second irregular playback control information and can output the first irregular playback control information, according to the contents thereof, to the video data generation section or the rendering unit; and a transmission section that distributes video data generated in the video data generation section, the timing information generated in the timing information generation section, and the first irregular playback control information, to the plurality of rendering units, and the rendering unit including: a receiving section that receives the video data that is distributed by the video distribution server, timing information, and the first irregular playback control information, the video data received in the receiving section being developed in the frame buffer;

a video processing section that carries out video processing based on the first irregular playback control information to the video data being developed to this frame buffer; and an output section that outputs the video data being developed to the frame buffer to the corresponding display device, based on the timing information.

* * * * *